(12) United States Patent
Iles et al.

(10) Patent No.: US 12,343,943 B1
(45) Date of Patent: Jul. 1, 2025

(54) METHOD AND APPARATUS FOR FORMING A WINDOW/DOOR SCREEN FRAME AND MESH ASSEMBLY WITHOUT ADHESIVE

(71) Applicant: The RiteScreen Company, LLC, Hialeah, FL (US)

(72) Inventors: Thomas Randall Iles, State College, PA (US); John C. St. Clair, Ashville, PA (US); John Joseph Keller, Newtown, PA (US); John France, Mantua, OH (US); Christopher Seebode, Basking Ridge, NJ (US); Varadarajan Swamydashu, Millersburg, PA (US)

(73) Assignee: THE RITESCREEN COMPANY, LLC, Elizabethville, PA (US)

( * ) Notice: Subject to any disclaimer, the term of this patent is extended or adjusted under 35 U.S.C. 154(b) by 594 days.

(21) Appl. No.: 17/691,152

(22) Filed: Mar. 10, 2022

Related U.S. Application Data

(63) Continuation-in-part of application No. 17/150,383, filed on Jan. 15, 2021, which is a continuation-in-part
(Continued)

(51) Int. Cl.
*B29C 65/48* (2006.01)
*B29C 65/10* (2006.01)
(Continued)

(52) U.S. Cl.
CPC .......... *B29C 65/4845* (2013.01); *B29C 65/10* (2013.01); *B29C 65/524* (2013.01);
(Continued)

(58) Field of Classification Search
None
See application file for complete search history.

(56) References Cited

U.S. PATENT DOCUMENTS

| 78,541 A | 7/1868 | McCluskey |
| 246,153 A | 8/1881 | Koch |

(Continued)

FOREIGN PATENT DOCUMENTS

JP H04306392 A 10/1992

*Primary Examiner* — Michael N Orlando
*Assistant Examiner* — Abhishek A Patwardhan
(74) *Attorney, Agent, or Firm* — Thomas A. O'Rourke; James Bongiorno; O'ROURKE IP LAW PLLC

(57) ABSTRACT

A screen making machine includes a table, welder assembly, and actuation assembly. The welder assembly includes: first and second nozzles, a pump that pumps air through each nozzle, and a roller. The first nozzle, second nozzle, and roller are positioned in line and spaced apart. The actuation system moves the welder assembly along each side of the frame. Hot air from the first nozzle elevates a temperature of the mesh and adjacent frame to a first elevated temperature, and subsequent flow of hot air from the second nozzle elevates them to a second elevated temperature, being above a melt temperature of the surfaces of the mesh and frame. The roller presses the melted mesh surface against the melted frame surface, to melt fuse them together. A top surface of the table is heated to thereby heat a second side of the frame, facilitating better welds.

10 Claims, 62 Drawing Sheets

Related U.S. Application Data of application No. 15/850,159, filed on Dec. 21, 2017, now Pat. No. 11,125,012.

(60) Provisional application No. 63/159,593, filed on Mar. 11, 2021, provisional application No. 62/961,778, filed on Jan. 16, 2020, provisional application No. 62/473,764, filed on Mar. 20, 2017, provisional application No. 62/473,749, filed on Mar. 20, 2017, provisional application No. 62/440,463, filed on Dec. 30, 2016.

(51) Int. Cl.
*B29C 65/52* (2006.01)
*B29L 31/00* (2006.01)

(52) U.S. Cl.
CPC ............. *B29C 2793/0027* (2013.01); *B29K 2995/0013* (2013.01); *B29L 2031/737* (2013.01)

(56) References Cited

U.S. PATENT DOCUMENTS

| | | |
|---|---|---|
| 266,246 A | 11/1882 | Willer |
| 268,491 A | 12/1882 | Hubbell |
| 514,654 A | 2/1894 | Higgin |
| 690,662 A | 1/1902 | Perrin |
| 724,682 A | 4/1903 | Eastman |
| 792,833 A | 6/1905 | Lee |
| 1,010,700 A | 12/1911 | Steger |
| 1,025,256 A | 5/1912 | Faber |
| 1,038,367 A | 9/1912 | Henry |
| 1,042,380 A | 10/1912 | Baker |
| 1,047,828 A | 12/1912 | Morgner |
| 1,058,616 A | 4/1913 | Maze |
| 1,135,352 A | 4/1915 | Bunger |
| 1,178,219 A | 4/1916 | Gramer |
| 1,187,402 A | 6/1916 | Traut |
| 1,260,589 A | 3/1918 | Steger |
| 1,423,021 A | 7/1922 | Reynolds |
| 1,436,858 A | 11/1922 | Burhen |
| 1,653,184 A | 12/1927 | Kolumbus |
| 1,678,941 A | 7/1928 | Helman |
| 1,697,768 A | 1/1929 | King |
| 1,733,877 A | 10/1929 | Higgin |
| 1,736,688 A | 11/1929 | Yerby |
| 1,745,818 A | 2/1930 | Trombly |
| 1,760,612 A | 5/1930 | Trott |
| 1,794,956 A | 3/1931 | Heath |
| 1,807,425 A | 5/1931 | McCalmon |
| 1,824,897 A | 9/1931 | Johnson |
| 1,856,323 A | 5/1932 | Feaster |
| 1,879,377 A | 9/1932 | McNeely |
| 1,947,307 A | 2/1934 | Rafton |
| 1,959,136 A | 5/1934 | Miller |
| 1,977,165 A | 10/1934 | Williams |
| 1,997,713 A | 4/1935 | Boehm |
| 1,997,740 A | 4/1935 | Nickerson |
| 2,052,467 A | 8/1936 | Hermann |
| 2,079,718 A | 5/1937 | Sgritta |
| 2,082,513 A | 6/1937 | Roberts |
| 2,126,544 A | 8/1938 | Everhard |
| 2,204,761 A | 3/1939 | Lang |
| 2,197,489 A | 4/1940 | Trulock |
| 2,265,375 A | 12/1941 | Julien |
| 2,274,700 A | 3/1942 | Jenks |
| 2,297,729 A | 10/1942 | Thomas |
| 2,444,288 A | 6/1948 | Gilson |
| 2,511,239 A | 6/1950 | Behnke |
| 2,523,383 A | 9/1950 | Majkrzak |
| 2,532,886 A | 12/1950 | Bianchi |
| 2,537,109 A | 1/1951 | Willett |
| 2,598,770 A | 6/1952 | Drozt |
| 2,612,947 A | 10/1952 | Jenks |
| 2,619,168 A | 11/1952 | Leverence |
| 2,625,217 A | 1/1953 | Spiller |
| 2,670,079 A | 2/1954 | Betts |
| 2,695,664 A | 11/1954 | Delegard |
| 2,702,596 A | 2/1955 | Morrow |
| 2,720,950 A | 10/1955 | Rick |
| 2,722,978 A | 11/1955 | Frisk |
| 2,723,032 A | 11/1955 | Gisler |
| 2,759,538 A | 8/1956 | Long |
| 2,774,477 A | 12/1956 | Pollitz |
| 2,797,750 A | 7/1957 | Van Dette |
| 2,835,325 A | 5/1958 | Gilbert |
| 2,897,889 A | 8/1959 | Kessler |
| 2,902,165 A | 9/1959 | Imershein |
| 2,914,123 A | 11/1959 | Deuble |
| 2,989,788 A | 6/1961 | Kessler |
| 3,002,557 A | 10/1961 | Roth |
| 3,057,401 A | 10/1962 | Gomory |
| 3,107,991 A | 10/1963 | Taussig |
| 3,176,843 A | 4/1965 | Hoskins |
| 3,214,314 A | 10/1965 | Rowbottom |
| 3,220,469 A | 11/1965 | Oehmig |
| 3,255,810 A | 6/1966 | Rowbattam |
| 3,276,513 A | 10/1966 | Lemelson |
| 3,321,885 A | 5/1967 | Pratt |
| 3,341,013 A | 9/1967 | Moulton |
| 3,374,597 A | 3/1968 | Whitener |
| 3,455,367 A | 7/1969 | Tarte |
| 3,477,574 A | 11/1969 | Malfroy |
| 3,679,057 A | 7/1972 | Perez |
| 3,716,138 A | 2/1973 | Lumsden |
| 3,760,860 A | 9/1973 | Kelarakis |
| 4,033,865 A | 7/1977 | Derrick |
| 4,232,310 A | 11/1980 | Wilson |
| 4,311,183 A | 1/1982 | Herbst |
| 4,502,260 A | 3/1985 | Machler |
| 4,568,455 A | 2/1986 | Huber |
| 4,570,406 A | 2/1986 | DiFazio |
| 4,968,366 A | 11/1990 | Hukki |
| 5,032,210 A | 7/1991 | Hukki |
| 5,039,246 A | 8/1991 | Woodruff |
| 5,046,546 A | 9/1991 | Benedyk |
| 5,090,469 A | 2/1992 | Boulanger |
| 5,137,622 A | 8/1992 | Souter |
| 5,151,149 A | 9/1992 | Swartz |
| 5,469,906 A | 11/1995 | Cason |
| 5,540,019 A | 7/1996 | Beske |
| 5,547,011 A | 8/1996 | Dotson |
| 5,594,418 A | 1/1997 | Martin |
| 5,666,773 A | 9/1997 | Librande |
| 5,718,791 A | 2/1998 | Spengler |
| 5,775,400 A | 7/1998 | Wilkinson |
| 5,787,657 A | 8/1998 | Librande |
| 5,794,328 A | 8/1998 | Simone |
| 5,794,528 A | 8/1998 | Gronig |
| 5,797,223 A | 8/1998 | Shoup |
| 5,851,393 A | 12/1998 | Carr |
| 6,073,675 A | 6/2000 | Dannaher |
| 6,108,997 A | 8/2000 | Blais |
| 6,149,762 A * | 11/2000 | Kobzan ............... B29C 65/103 |
| | | 156/499 |
| 6,276,426 B1 | 8/2001 | Polak |
| 6,279,644 B1 | 8/2001 | Wylie |
| 6,331,223 B1 * | 12/2001 | Wylie ............... E06B 9/52 |
| | | 160/371 |
| 6,450,345 B1 | 9/2002 | Adams |
| 6,565,698 B1 | 5/2003 | Adams |
| 6,669,985 B2 | 12/2003 | Adams |
| 6,736,270 B2 | 5/2004 | Adams |
| 6,742,565 B2 | 6/2004 | Badley |
| 6,977,021 B2 | 12/2005 | Annacchino |
| 6,991,693 B2 | 1/2006 | Wylie |
| 7,007,735 B1 | 3/2006 | Lake |
| 7,740,048 B2 | 6/2010 | Wilson |
| 7,861,473 B1 | 1/2011 | Green |
| 8,042,598 B2 | 10/2011 | Bredemus |
| 8,056,602 B1 | 11/2011 | Green |
| 8,191,606 B2 | 6/2012 | Edlin |
| 8,871,050 B2 | 10/2014 | Blot |

(56) References Cited

U.S. PATENT DOCUMENTS

| | | | |
|---|---|---|---|
| 8,919,826 B2 | 12/2014 | Small | |
| D727,539 S | 4/2015 | Alexander | |
| 9,157,271 B2 | 10/2015 | Burton | |
| 9,234,388 B2 | 1/2016 | Altieri | |
| D748,818 S | 2/2016 | Shen | |
| D757,299 S | 5/2016 | Altier | |
| 9,631,417 B2 | 4/2017 | Massey | |
| 10,994,492 B2 | 5/2021 | Kraus | |
| 2003/0029546 A1* | 2/2003 | Wylie | E06B 9/52 156/308.2 |
| 2004/0094576 A1* | 5/2004 | Martinez | B29C 65/12 222/146.5 |
| 2004/0140067 A1 | 7/2004 | Kelley | |
| 2005/0056389 A1 | 3/2005 | Kelley | |
| 2006/0048467 A1 | 3/2006 | Martineau | |
| 2006/0054286 A1 | 3/2006 | Woodward | |
| 2006/0231221 A1 | 10/2006 | Chen | |
| 2014/0290160 A1 | 10/2014 | Altieri | |
| 2014/0290880 A1 | 10/2014 | Altieri | |
| 2016/0158999 A1* | 6/2016 | Cloud | B29C 66/8362 156/60 |

* cited by examiner

FIG. 4I
Screen Mesh = M
Adhesive = A
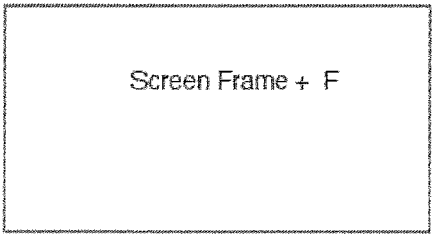
Screen Frame + F
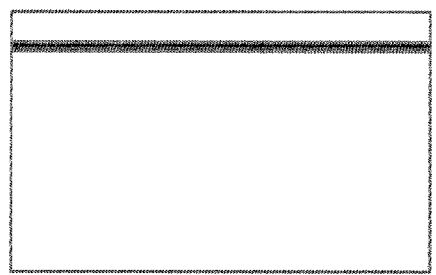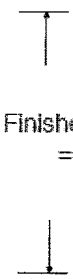
Finished Unit = U

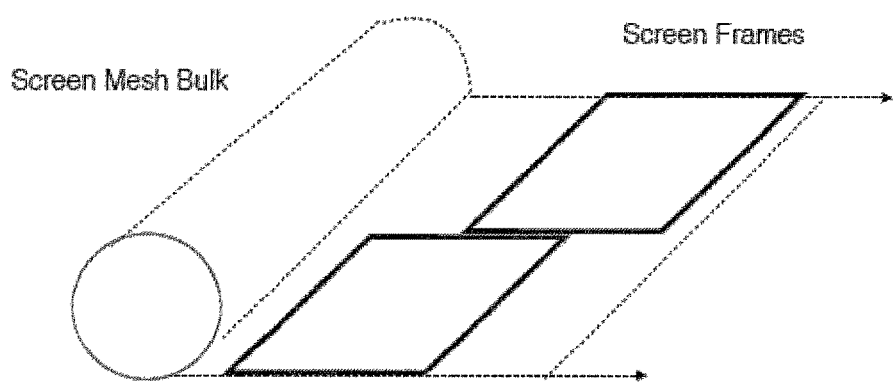
FIG. 5G
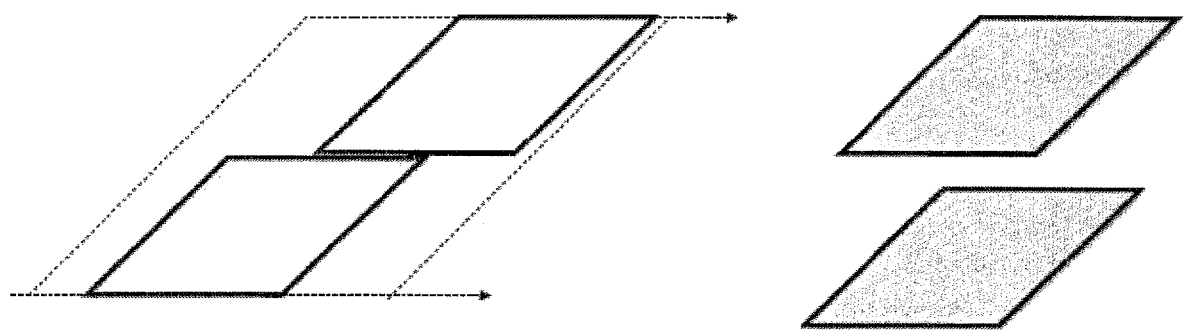
FIG. 5H  FIG. 5I

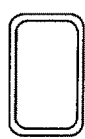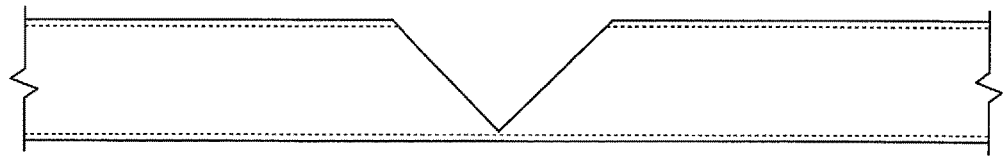
FIG. 7B    FIG. 7A
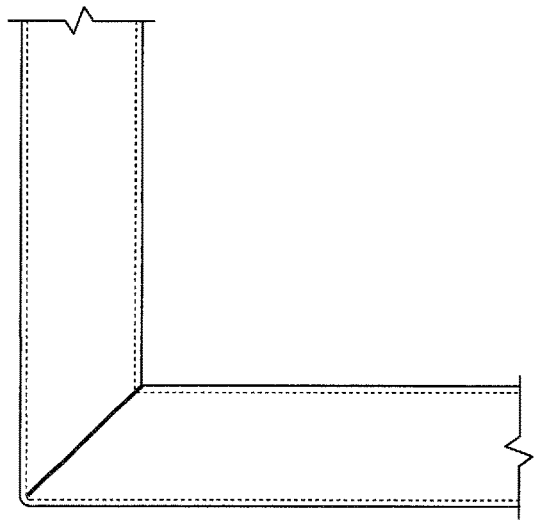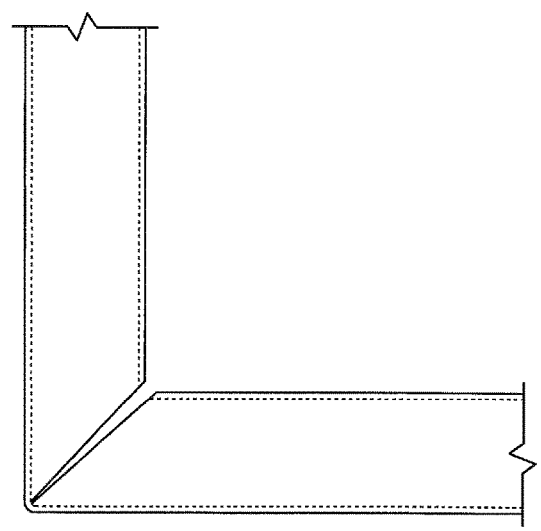
FIG. 7C    FIG. 7D

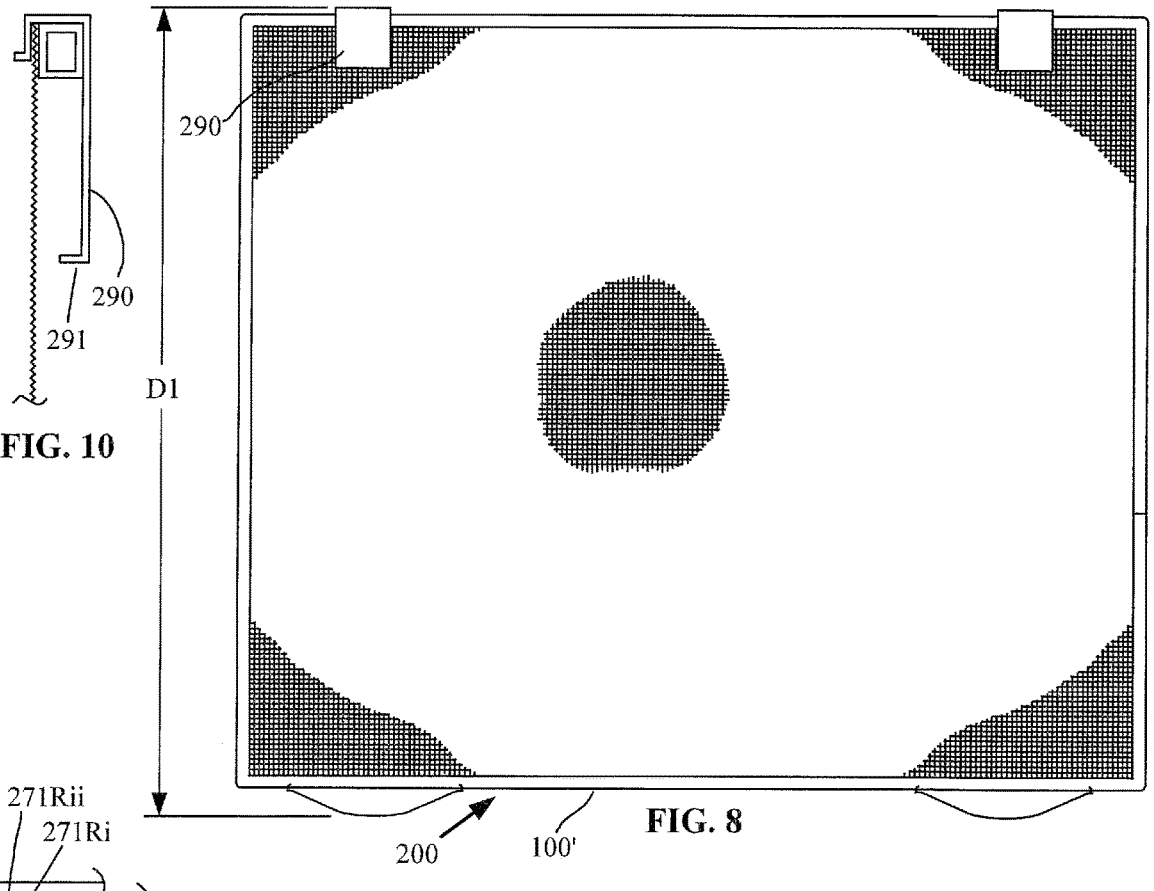
FIG. 10
FIG. 8
FIG. 9
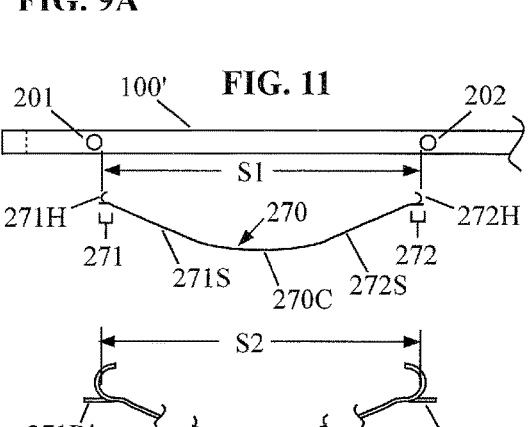
FIG. 9A
FIG. 11
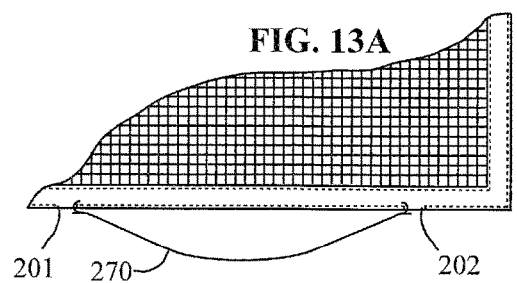
FIG. 13A
FIG. 13B
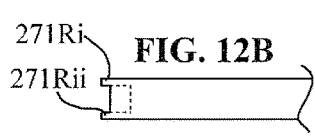
FIG. 12A
FIG. 12B FIG. 31  FIG. 32
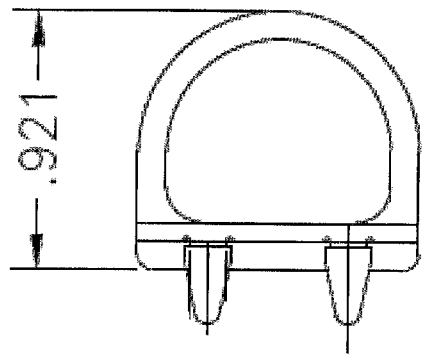
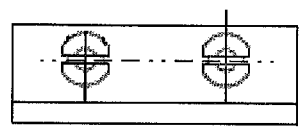
FIG. 33
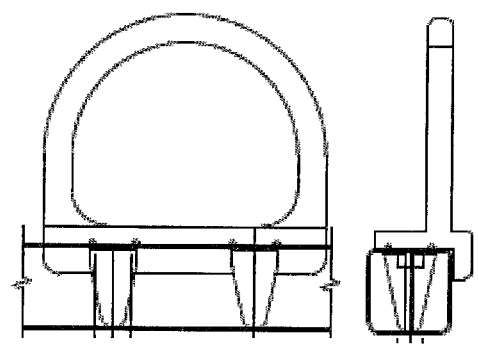
FIG. 34  FIG. 35

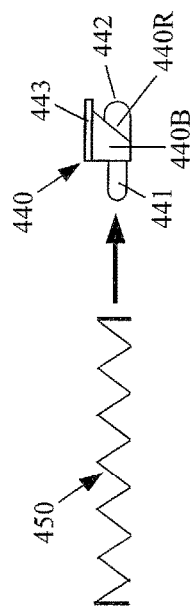
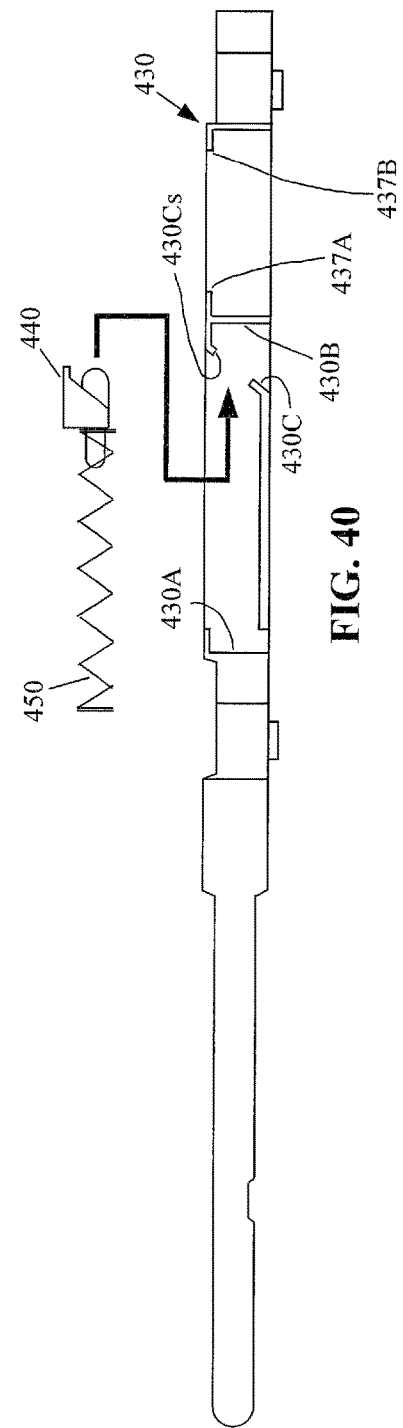
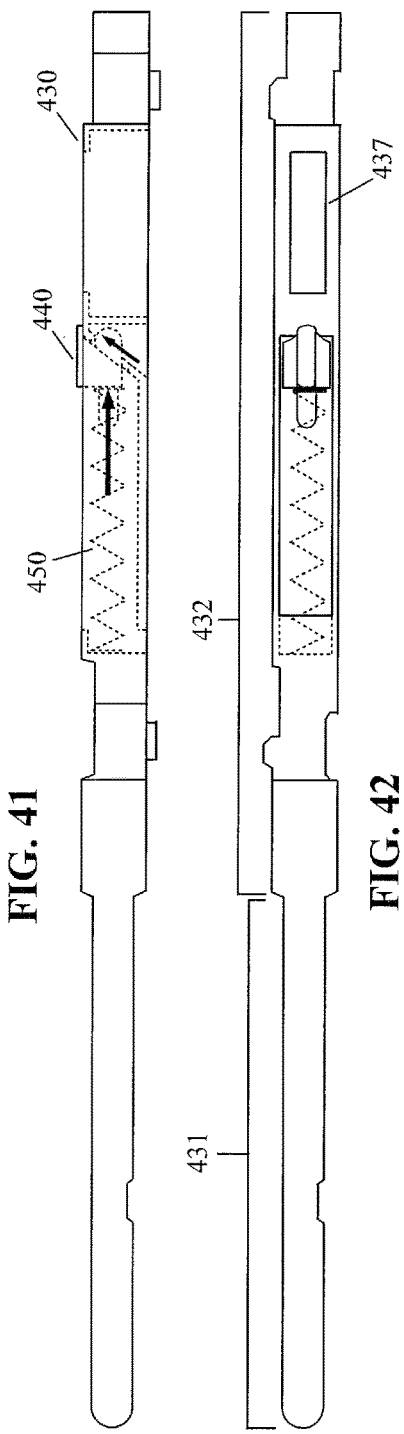
FIG. 39
FIG. 40
FIG. 41
FIG. 42

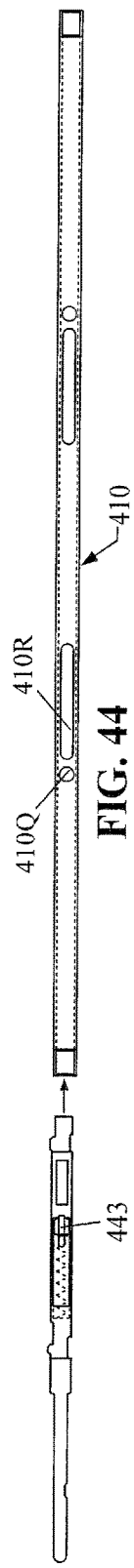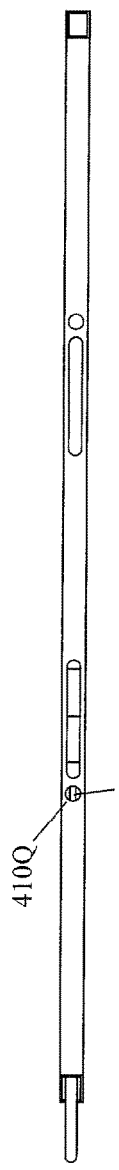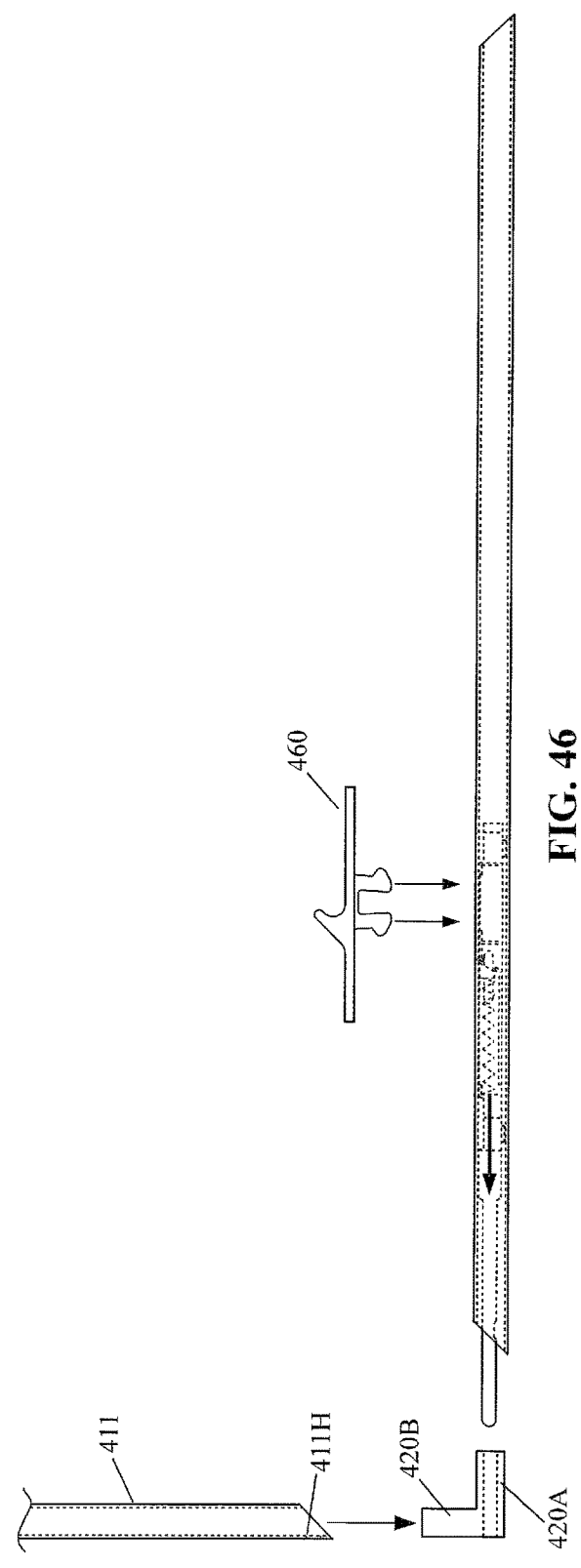

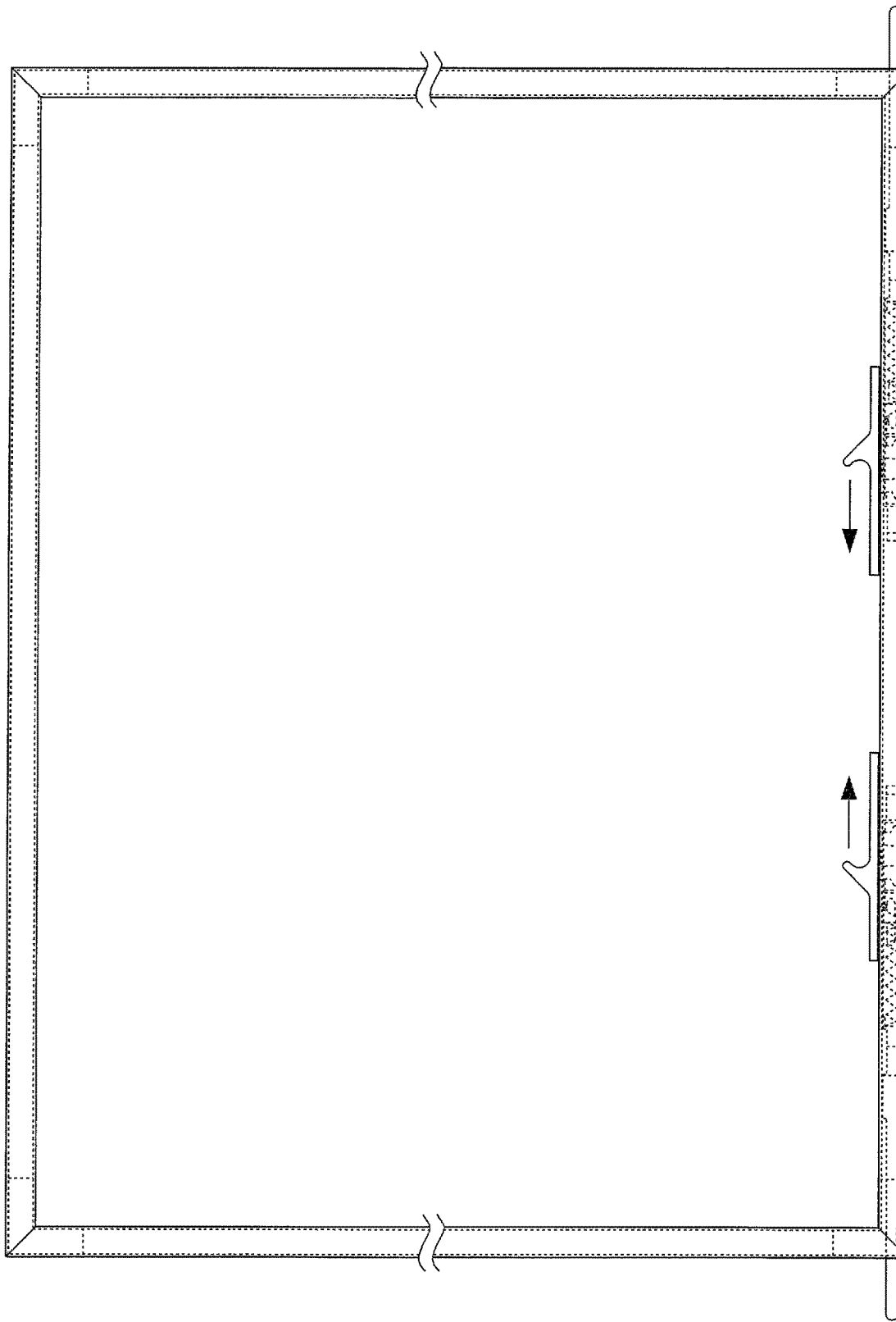

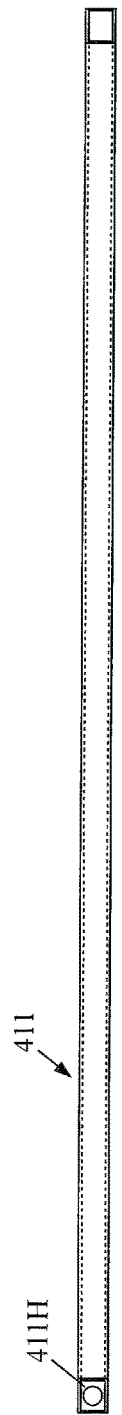
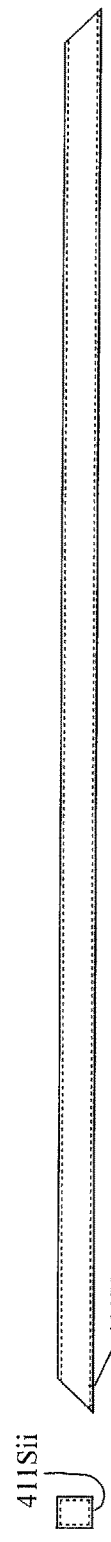
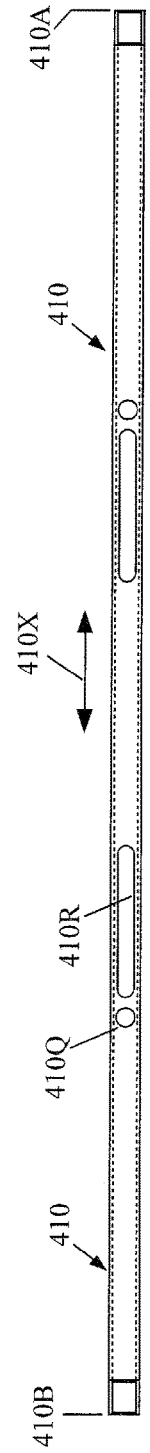
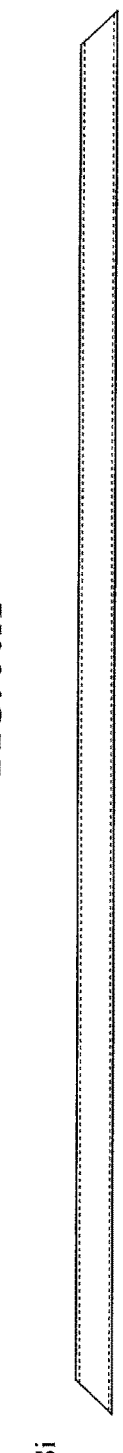
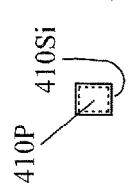

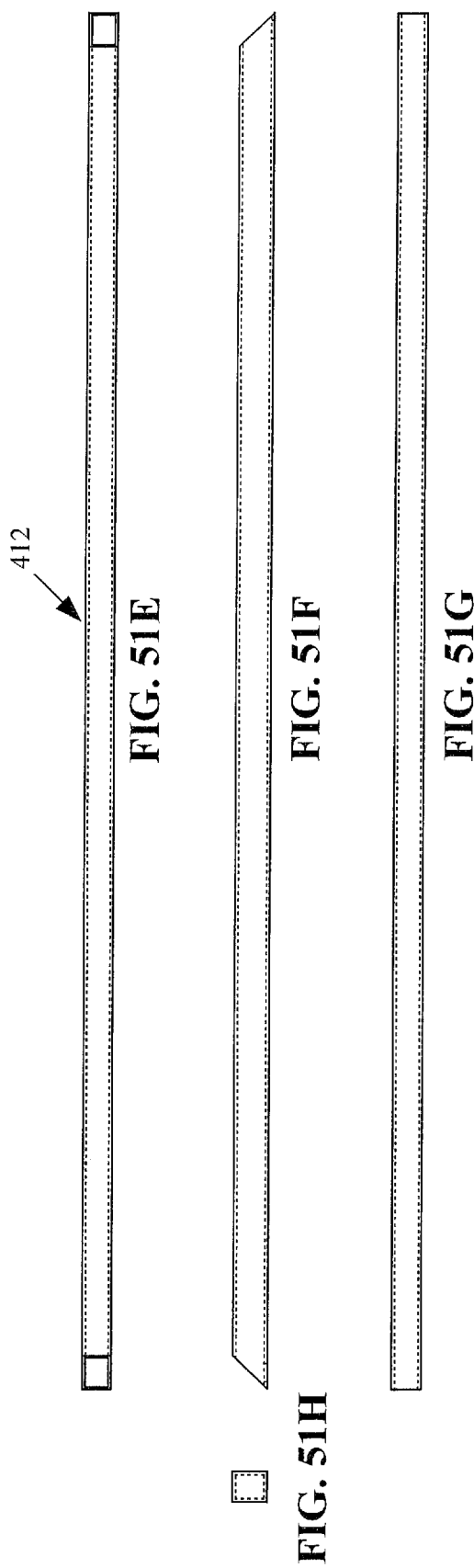

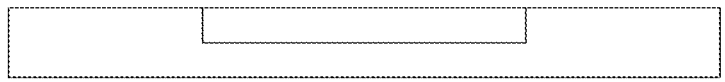
FIG. 59B
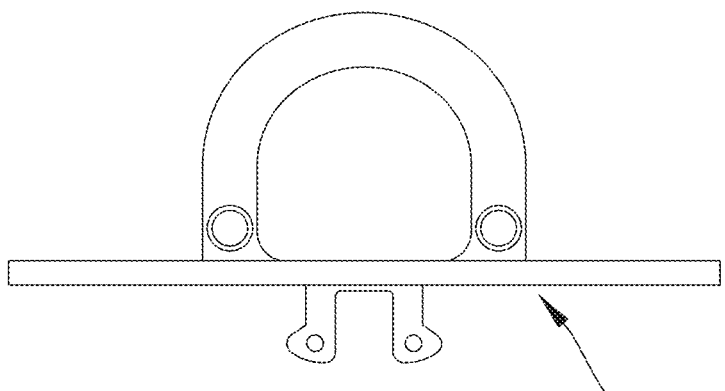 
FIG. 59A    FIG. 59C
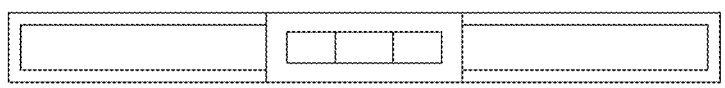
FIG. 59D (Stage 1)

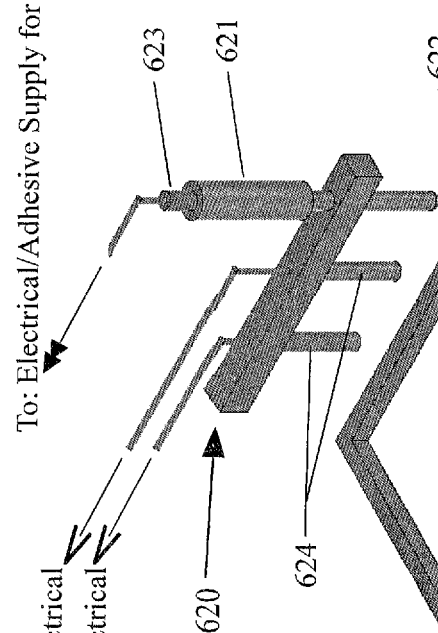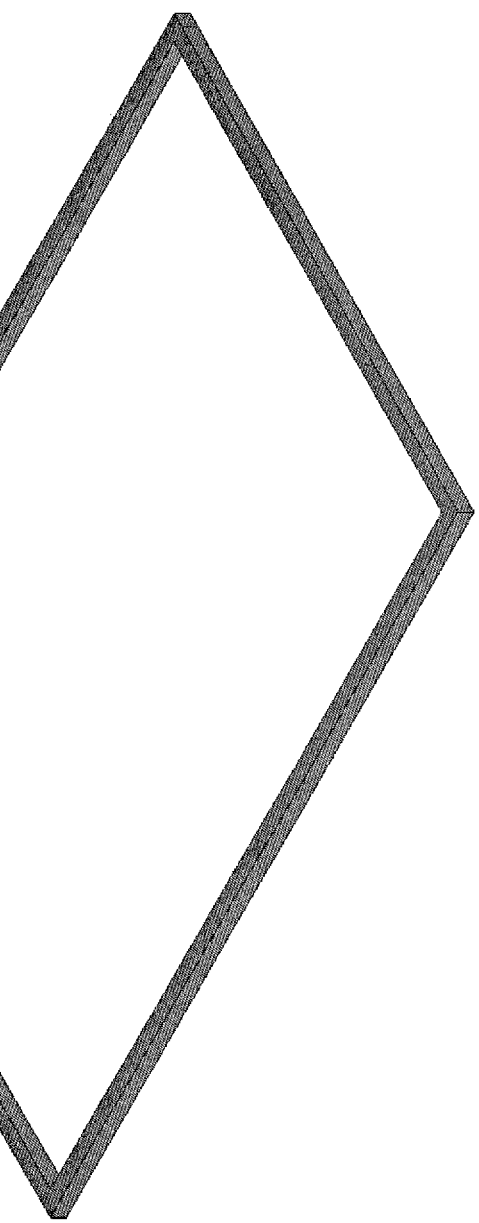
FIG. 61

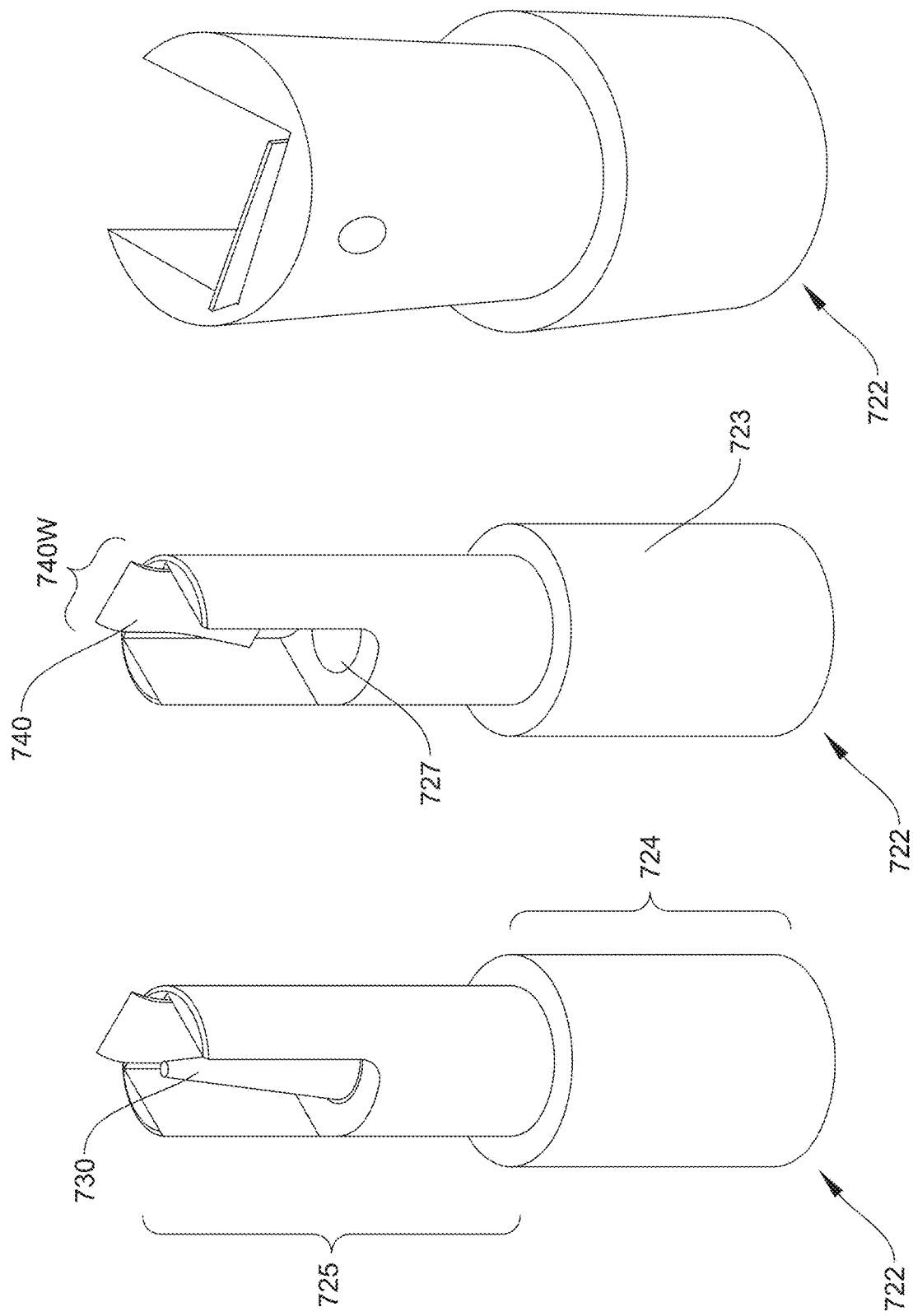

Step 1: Home position of the screen on the table before the screening process starts.

Step 2: Claim 1 moves toward the screen placed on the table to detect the size of the screen.

Step 8: Adhesive nozzle + LED light moves from Point C to Point D.

METHOD AND APPARATUS FOR FORMING A WINDOW/DOOR SCREEN FRAME AND MESH ASSEMBLY WITHOUT ADHESIVE

CROSS REFERENCES TO RELATED APPLICATIONS

This application claims priority on U.S. Provisional Patent Application Ser. No. 63/159,593, filed on Mar. 11, 2021. This application is also a continuation-in-part of U.S. patent application Ser. No. 17/150,383, filed on Jan. 15, 2021, which claims priority on U.S. Provisional Patent Application Ser. No. 62/961,778, filed on Jan. 16, 2020; and U.S. application Ser. No. 17/150,383 is also a continuation-in-part of U.S. application Ser. No. 15/850,159, filed on Dec. 21, 2017, which claims priority on: U.S. Provisional Patent Application Ser. No. 62/440,463 filed on Dec. 30, 2016, on U.S. Provisional Patent Application Ser. No. 62/473,749 filed on Mar. 20, 2017, and on U.S. Provisional Patent Application Ser. No. 62/473,764 filed on Mar. 20, 2017. All disclosures of these applications are incorporated herein by reference.

FIELD OF THE INVENTION

The present invention relates to improvements in a removable screen that may be used for windows and doors, and more particularly to improved methods of manufacturing a screen assembly, whereby the mesh and the frame are joined without an adhesive.

BACKGROUND OF THE INVENTION

Although there may have been analogous apparatus used in ancient civilizations, early modern reference to use of wire mesh for a door/window "screen" is found in the 1923 periodical the "American Farmer," as "Wove Wire for Window Screens." An advertisement for window screens was placed in Boyd's Blue Book in 1836, and two window screens were displayed at an Exhibition in Boston in 1839. One of the earliest screen-related U.S. patents, U.S. Pat. No. 79,541, was issued to Bayley and McClusky in 1868 for "Improvements in Railroad Car Ventilators," which included a "wire netting screen . . . as applied to the windows to prevent sparks, cinders, dust, etc., from entering the car or boat through the window when open." Numerous other patents have since been issued for various developments relating to the implementation of a screen with respect to a door or window, particularly for a home.

Typical screen construction utilizes a rectangular frame with a groove cut into one side of its entire periphery. A mesh material is cut to be somewhat larger than the extent of the peripheral groove, and is then overlaid onto that side of the screen. A flexible vinyl "spline" is next overlaid on the screen above the groove, and is pressed into the grove, forcing the mesh therein. The diameter of the spline, typically 3.6 mm to 4.8 mm, is sized to be retained within the groove, in combination with the thickness of mesh used, in a friction fit. Any protruding excess mesh material may then be trimmed away. The present invention offers improvements over such construction, and that which is shown by other prior art patents.

OBJECTS OF THE INVENTION

It is an object of the invention to enhance the aesthetic appearance of a window or door.

It is another object of the invention to provide a screen that has a rigid frame to support a durable screen to prevent accidental outward egress therethrough, but which has a significantly narrowed frame dimension that may only appear as a slight shadow on a window upon which it is installed.

It is an object of the invention to provide a screen that eliminates or minimizes the need for exact color matching of the screen frame to the vinyl or other material used for the master frame of the window/door.

It is another object of the invention to provide a screen frame design that provides an overall reduction of screen inventory SKUs needed for matching of the screen to the windows/doors.

It is a further object of the invention to provide a screen having a reduction of screen frame substrate mass per screen, with a corresponding reduction in raw material costs.

It is also an object of the invention to provide a durable window screen frame that is perceived to be, and has the feel of, a rigid conventional frame, but which decreases the screen sight line of the typical frame by 60 percent, and decreases the sight line of traditional wide frame screens by 90 percent.

It is a further object of the invention to provide a screen that eliminates the use of a spline to prevent cloth pull out during job site handling or customer handling, and to reduce labor costs.

It is another object of the invention to provide a method of producing a screen that reduces the manufacturing floor space required.

It is an object of the invention to use of a high strength adhesive and process for securing the mesh to the screen frame that provides a pull out strength tested to be at least 150 percent of the standard requirements promulgated by the Screen Manufacturers Association, in its Specification for Insect Screens for Windows, Sliding Doors and Swinging Doors.

It is a further object of the invention to provide an assembly process that eliminates heat damage to the surface of the cloth mesh or the screen frame.

It is another object of the invention to provide a frame that is laser welded or sonically welded at only one location, or at each corner, to eliminate the use of corner keys, and eliminates the requirement for color-matched corners.

It is a further object of the invention to provide a screen frame and associated hardware that prevents racking, and remains square.

It is also an object of the invention to provide unique installation hardware with the screen frame that may automatically center the screen in the window/door frame, to provide a more uniform appearance.

It is another object of the invention to provide a low-profile screen frame that may be utilized in combination with any premium screen cloth material.

It is a further object of the invention to provide a screen frame manufacturing process that may reduce or eliminate one or more of the traditional steps of screen construction, including: cutting, punching, staking, rolling of the spline, trimming, assembly steps, and wasted material.

It is a further object of the invention to provide a low-profile frame for a screen with a reduced sight line that incorporates a plunger within the reduced profile frame.

It is yet a further object of the invention to provide a low-profile frame for a screen with a reduced sight line that establishes a location for a plunger by laser cutting the required hole.

It is another object of the invention to provide a low-profile screen frame with a plunger housed therein, that may be easily installed and removed.

It is a further object of the invention to assemble a low-profile screen frame and mesh material using an adhesive that may be cured with ultra violet light.

It is yet a further object of the invention to assemble a low-profile screen frame and mesh material using an adhesive that may be cured with multiple spectrums of light.

It is another object of the invention to provide a machine for automated assembly-line production of a plurality of screens with low profile frames and light-cured adhesive-bonded parts.

It is yet another object of the invention to utilize laser edge trimming of excess screen fabric.

It is a further object of the invention to eliminate the use of an adhesive from the process of securing the mesh to the screen frame.

It is another object of the invention to secure a mesh to a screen frame to produce a screen assembly by melt fusing of the mesh to the frame.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the present invention, a reduced visibility screen, for use in a master frame of a window or a door, may broadly include a particularly formed narrow profile frame, and a mesh that is also particularly formed and applied to the narrow profile frame. The narrow profile frame may be a frame formed from a single elongated cross-sectional member having a first end and a second end, and may be bent at least at three corners (i.e., to form a triangular shape), or at four corners to form four sides, and to position the first end adjacent to the second end. The first end may be fixedly secured to the second end by being welded thereto using a sonic welding process, a laser welding process, or other welding/joining process.

An adhesive may be applied to a side surface of the narrow profile frame, and a mesh may then be applied over the adhesive. The mesh may be configured to extend to a distal end of the side surface of each of the four sides of the narrow profile frame.

Another embodiment of a reduced visibility screen may also broadly include a leaf spring that may be used in combination with the narrow profile frame, and may be configured to bias and center the screen within the master frame. In one embodiment, at least a portion of the leaf spring may have a curved shape, which curve may be an arc, a portion of an ellipse, a portion of a parabola, or any other suitable curve. The narrow profile frame, which may be hollow, may have one of its outwardly disposed surfaces of one side of its four sides be formed with a first hole and a second hole, being spaced a particular distance apart. The leaf spring may have a first end formed into a hook shape, and a second end also formed into an opposingly shaped hook. In another embodiment the leaf spring may have a first straight portion between the first end and a curved centrally positioned portion, and a second straight portion between the second end and the centrally positioned curved portion, which may better facilitate biasing and centering of the screen within a correspondingly shaped recess in the master window frame, as discussed hereinafter, The leaf spring may also be formed with a selective length, such that the hook at the first end of the leaf spring and the hook at the second end of the leaf spring may be respectively received within the spaced apart first and second holes in the side of the narrow profile frame, when the leaf spring is deformed to be substantially straight, and the hooks may also be respectively engaged upon opposite sides of the first and second holes when the deformed leaf spring is allowed to return to its undeformed shape.

Another embodiment of a reduced visibility screen may also broadly include a third hole formed in the narrow profile frame, being formed substantially mid-way between the first and second holes; a plunger pin; and a handle. The plunger pin may be slidably disposed in the third hole, and may have a first end fixedly secured to the leaf spring, being substantially centered between the first and second ends of the leaf spring. The handle member may have a cam surface, and may be movably secured to the second end of the plunger pin, and may be member movable between first and second positions using the cam surface positioned against a side portion of the screen frame, to actuate the plunger pin to respectively actuate the leaf spring between being deformed and undeformed. The cam surface may be configured such that it may be actuated to deform the leaf spring and retain the leaf spring in the deformed condition, after removal of the actuating force that placed the leaf spring into the deformed condition.

Another embodiment of a reduced visibility screen may also broadly include one or more clips secured to any of the four sides of the frame, which clip(s) may be used for handling of the screen during installation into the master frame and removal therefrom. In one embodiment, the clip may be secured to a side of the frame being on an opposite side from which the holes and leaf spring are secured. The clip may include a small return flange configured for easy handling of the screen.

BRIEF DESCRIPTION OF THE DRAWINGS

The description of the various example embodiments is explained in conjunction with appended drawings, in which:

FIG. 4I schematically illustrates the thickness buildup of the frame, mesh and adhesive used to form the screen;

FIG. 5G illustrates a seventh step in the process of forming the frame of the reduced visibility screen shown in FIG. 1;

FIG. 5H illustrates an eighth step in the process of forming the frame of the reduced visibility screen shown in FIG. 1;

FIG. 5I illustrates a ninth step in the process of forming the frame of the reduced visibility screen shown in FIG. 1;

FIG. 7A shows an enlarged detail view of an alternate embodiment of the frame, being formed with a V-shaped notch prior to being bent;

FIG. 7B shown a cross-sectional view of the frame of FIG. 7A;

FIG. 7C shows the notched frame of FIG. 7A, after being bent;

FIG. 7D shows the notched frame of FIG. 7A, after being bent, but where the notch was formed to leave a gap between the bent-up adjacent frame sections;

FIG. 8 illustrates a side view of a reduced visibility screen formed in accordance with a second embodiment of the present invention;

FIG. 9 is a bottom view of the reduced visibility screen shown in FIG. 8;

FIG. 9A is an enlarged bottom view showing an alternate embodiment of leaf spring being used on the frame of the reduced visibility screen shown in FIG. 8;

FIG. 10 is a cross-sectional view through an upper portion of the reduced visibility screen shown in FIG. 8;

FIG. 11 shows an enlarged portion of the bottom view of FIG. 9, with the leaf spring shown prior to installation into the holes in the side of the frame, and with the leaf spring shown rotated ninety degrees to expose its hooked ends;

FIG. 12A is an enlarged view of one end of the leaf spring shown in FIG. 11;

FIG. 12B is a front view of the leaf spring shown in FIG. 12A;

FIG. 13A shows an enlarged portion of the screen embodiment shown in the side view of FIG. 8, with the leaf spring shown in an undeformed, generally curved condition;

FIG. 13B is the side view of FIG. 13A, but is shown with the leaf spring deformed to be substantially straight to be extended to substantially its maximum length;

FIG. 31 is a side view of a pull tab usable with the reduced visibility screen shown in FIG. 1 and FIG. 3;

FIG. 32 is an end view of the pull tab of FIG. 31;

FIG. 33 is a bottom view of the pull tab of FIG. 31;

FIG. 34 is a side view showing the pull tab of FIG. 31 installed within the frame of a reduced visibility screen in accordance with the present invention;

FIG. 35 is a cross-sectional view through the pull tab and frame, as shown in FIG. 34;

FIG. 39 is an exploded side view of the helical compression spring and holder member of FIG. 37, shown prior to being coupled together;

FIG. 40 is an exploded side view of the helical compression spring and holder member of FIG. 37 shown after being coupled together, and shown prior to being inserted within the plunger housing;

FIG. 41 is the side view of FIG. 40, but shown after the joined helical compression spring and holder member are inserted within the plunger housing, with the dual-biasing spring shown biasing a protrusion of the holder member to be disposed outside of the plunger housing;

FIG. 42 is a top view of the joined helical compression spring, holder member and plunger housing as shown in FIG. 41;

FIG. 44 is a top view of the assembled compression spring, holder member, and plunger housing, shown just prior to being inserted into the bottom frame portion;

FIG. 45 is a top view of FIG. 44, but is shown just after the assembled compression spring, holder member, and plunger housing have been inserted into the bottom frame portion, with the protrusion of the holder member being biased into the hole of the bottom frame portion to releasably couple the holder member to the bottom frame portion;

FIG. 46 is the side view of FIG. 43, but is shown just after the assembled compression spring, holder member, and plunger housing have been inserted into the bottom frame portion;

FIG. 49A is the side view of FIG. 48, but shown after the pull tab has been inserted into the left side plunger housing, and after the right side plunger assembly, the right side frame portion and the upper frame portion have been similar assembled;

FIGS. 50A-50D are a top view, a front view, a bottom view, and an end view of the bottom frame portion shown in FIGS. 36-37;

FIGS. 51A-51D are a top view, a front view, a bottom view, and an end view of the side frame portion shown in FIGS. 36-37;

FIGS. 51E-51H are a top view, a front view, a bottom view, and an end view of the top frame portion shown in FIGS. 36-37;

FIGS. 59A-59D are a front view, a bottom view, a top view, and an end view of a fifth embodiment of a pull tab that provides for greater area that may be grasped by a user;

FIG. 61 is an enlarged perspective view of one of the fixtures shown in FIG. 60 that includes an adhesive nozzle and LED spot lights usable for applying and curing of the glue that secures the screen mesh material to the screen frame, as the fixture moves along the frame of the window screen assembly positioned on the manufacturing table;

FIG. 69A is an enlarged bottom perspective view of the nozzle assembly of the adhesive delivery system of FIG. 67;

FIG. 69B is the enlarged bottom perspective view of the nozzle assembly of FIG. 69A, shown prior to installing of the nozzle therein;

FIG. 70 is another bottom perspective view of the nozzle assembly of FIG. 67;

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference.

Furthermore, the described features, advantages, and characteristics of any particular embodiment disclosed herein, may be combined in any suitable manner with any of the other embodiments disclosed herein.

It is further noted that any use herein of relative terms such as "top," "bottom," "upper," "lower," "vertical," and "horizontal" are merely intended to be descriptive for the reader, based on the depiction of those features within the figures for one particular position of the screen, and such terms are not intended to limit the orientation with which the screen of the present invention may be utilized.

Figure 1:
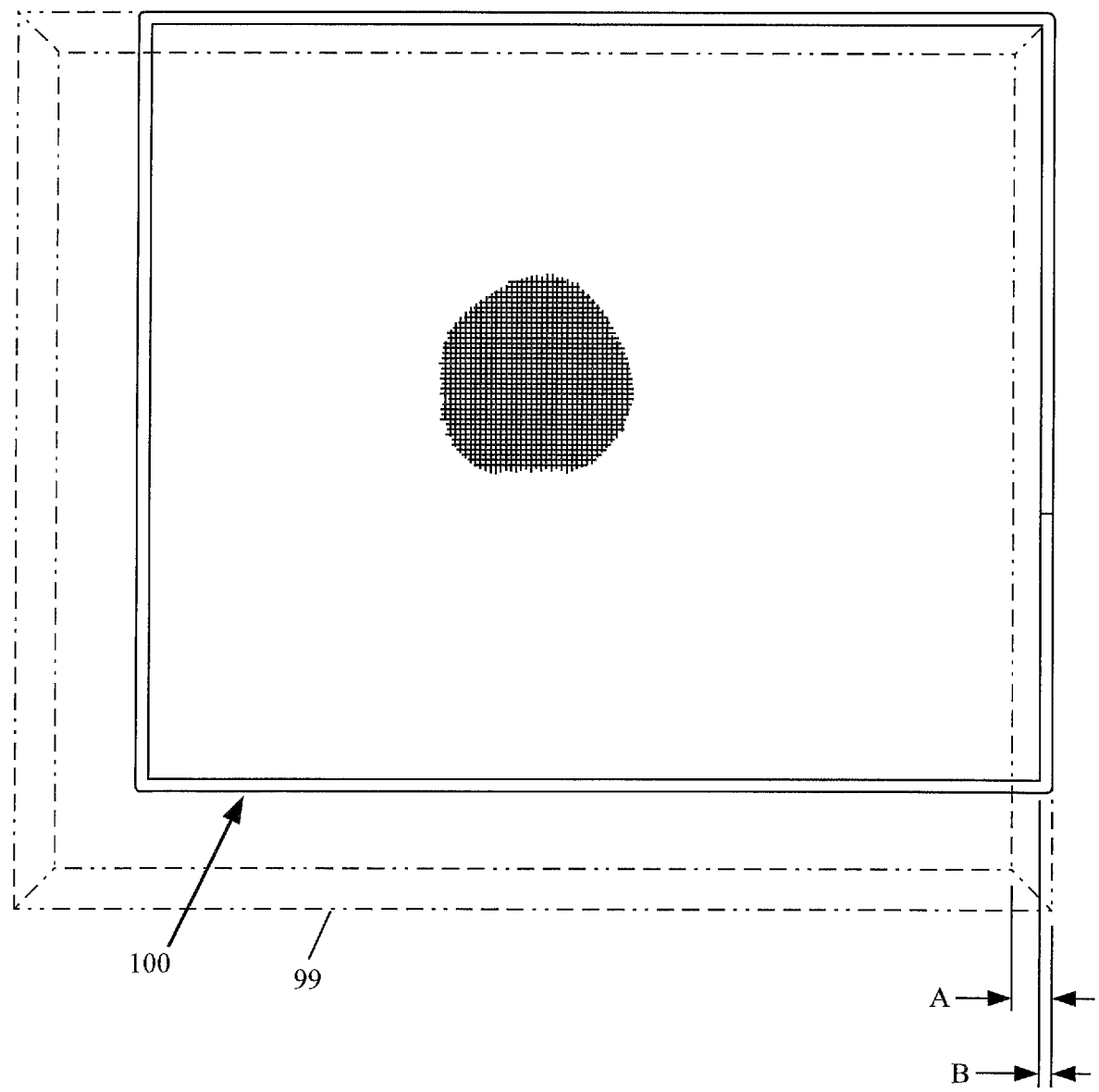
FIG. 1 is a side view showing a reduced visibility screen formed in accordance with a first embodiment of the present invention overlaid upon a prior art screen.
Figure 3:
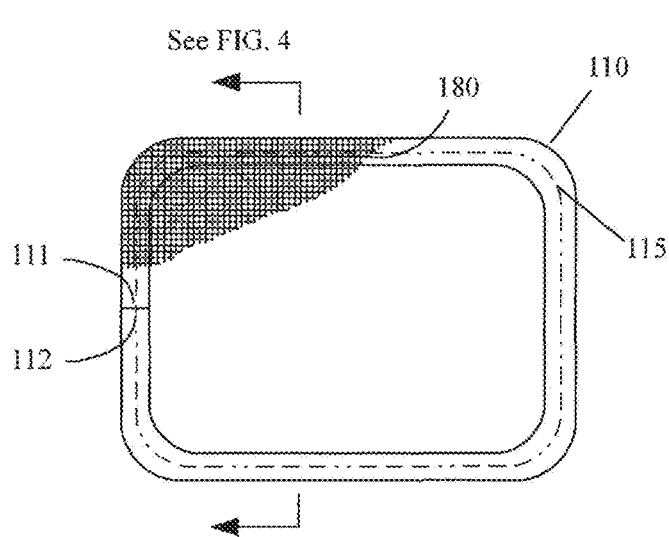
FIG. 3 illustrates a side view of the reduced visibility screen shown in FIG. 1, shown with generously radiused outside corners.
Figure 4:
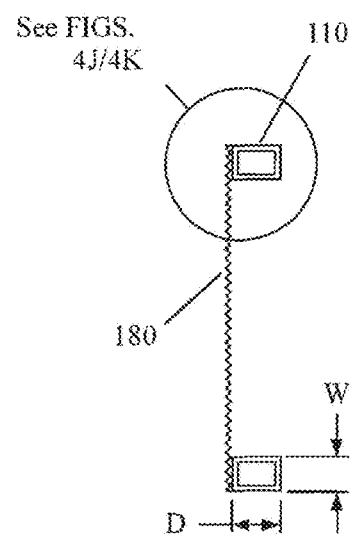
FIG. 4 is a cross-sectional view taken through the reduced visibility screen shown in FIG. 1.

FIG. 1 illustrates a side view showing a reduced visibility screen 100 formed in accordance with a first embodiment of the present invention, being overlaid upon a prior art screen 99. As seen therein, the configuration for the screen 100 and the manufacturing processes utilized permits the reduced visibility screen to have a width dimension B that may be 60 percent less than the width A of a conventional frame, and which may be 90 percent less than the width of a traditional wide frame screen. A corner of the screen 100 is illustrated in the perspective view of FIG. 2. A view showing the corners/bends of the frame 110 of screen 100 is shown in FIG. 3, having a mesh 180 applied thereto. A cross-sectional view of the screen 100 is shown in FIG. 4. Note that the outer corners illustrated within FIG. 3 may in one embodiment be so small as to at least approach being a squared-off corner.

FIGS. 5A through 5I illustrate a first embodiment of a process that may be used for forming the screen 100.

Figure 3A:
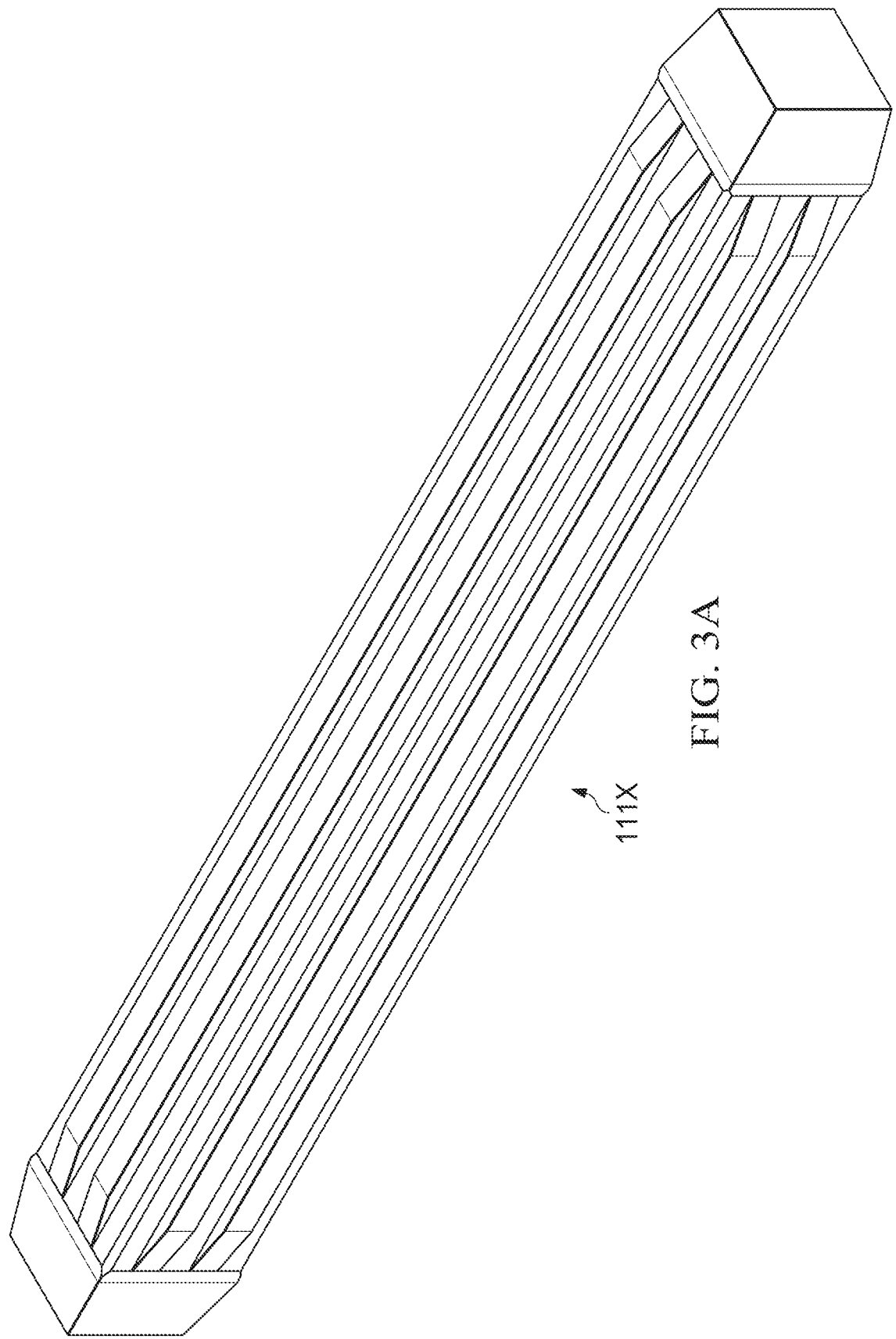
FIG. 3A illustrates a connector member that may be received into each of the joined ends of the frame of FIG. 3.
Figure 5A:
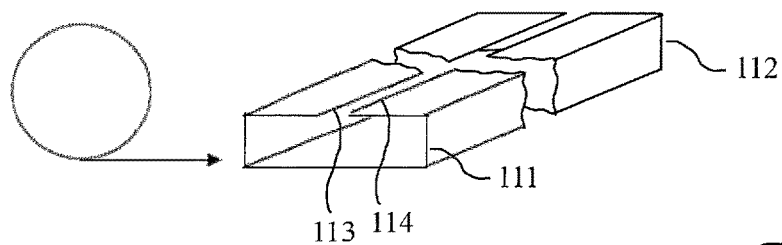
FIG. 5A illustrates a first step in the process of forming the frame of the reduced visibility screen shown in FIG. 1.
Figure 5B:
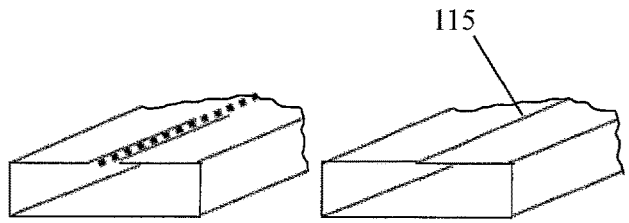
FIG. 5B illustrates a second step in the process of forming the frame of the reduced visibility screen shown in FIG. 1.

In a first step of the process shown in FIG. 5A, the raw material for the frame may be formed into an elongated member, having a first end 111 and a second end 112. The elongated member may be formed by rolling a first side 113 of an elongated flat raw stock material toward a second side 114, to have four interior corners forming an enclosed shape that may preferably have a rectangular cross-section, with said first side adjacent to said second side forming a seam 115 along a length of said elongated member, between the first end 111 and the second end 112, as shown in FIG. 5B and FIG. 3. FIG. 3A illustrates a connector member 111X that may be received into each of the ends 111/112 of the frame to provide additional structural support for the joint, which may be done using an adhesive (note the elongated grooves formed by protrusions that provide a conduit for the adhesive), and may be instead of or in addition to welding of the joint. In other embodiments, the raw material may be rolled to form an elongated member that may have a cross-sectional shape in the form of a triangle, or a parallelogram, or a trapezoid, or a square, or polygonal shape, or any other suitable cross-sectional shape, each of which may have at least one flat surface to which the mesh may be bonded.

In the second step shown in FIG. 5B, the adjacent sides 113 and 114 of the elongated member may be may joined, as shown on the left side therein, using any suitable manufacturing process to produce the elongated cross-sectional shape shown on the right side therein. The joining process may include, but is not limited to, being spot welded by a sonic welder, laser welding, overlap knurling, dimple crimping, etc. Some other exemplary cross-sectional shapes that may be formed from the raw material are shown in FIGS. 4J and 4K.

The raw material for the screen frame may be roll formed steel, roll formed aluminum, or could alternatively be extruded aluminum, including alloys (e.g., various forms of stainless steel), all forms of plastics, such as including, but not limited to, PVC, fiberglass, composites, and even wood, or possibly a suitable combination of such materials, or such material that will at least maintain stability sufficient to function for the screen frame.

Figure 5C:
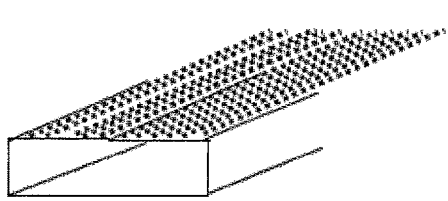
FIG. 5C illustrates a third step in the process of forming the frame of the reduced visibility screen shown in FIG. 1.

The raw material used for the frame may be appropriately colored, or alternatively the elongated cross-sectional shape may be colored or shaded as required during the process step shown in FIG. 5C. The color of the adhesive and the color of the frame may be selected to generally match the color of the master window frame. It is intended that the reduced sightline of the frame formed herein, when used in conjunction with the corresponding socket formed in the window/door, reduces the exposed portion of the frame that protrudes from the socket of the master frame, as discussed hereinafter, thereby minimizing the extent to which exact color matching is required, as the exposed frame may appear to fall within the shadow of the master frame of the window/door. This may serve to reduce the inventory of screen SKUs needed for sufficiently close matching of the screen frame to the master frame of the windows/doors. Therefore, the coloring agents and pigmentations used are not limiting factors. Any and all shading and coloring are intended to be utilized in tandem with the frame of the reduced visibility screen 100 described herein, so as so achieve a pleasing and virtually indistinguishable sight line for the screen frame, and to focus the viewers eye to a smooth transition of screen mesh material to the master frame of the window/door.

Figure 5D:
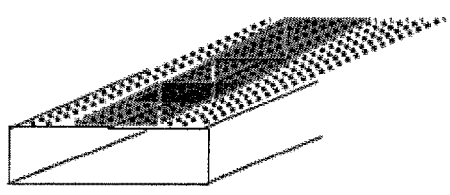
FIG. 5D illustrates a fourth step in the process of forming the frame of the reduced visibility screen shown in FIG. 1.

The screen raw material must also be capable of receiving an appropriate adhesive and screen mesh material. One approach for application of the adhesive is shown in FIG. 5D, which step may alternatively be performed before, during, or after the bending step. The adhesive may be applied using a roll coater. An in-line adhesive application process may be used in lieu of the roll coating processes.

Figure 5E:
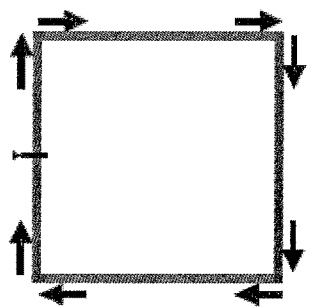
FIG. 5E illustrates a fifth step in the process of forming the frame of the reduced visibility screen shown in FIG. 1.
Figure 7:
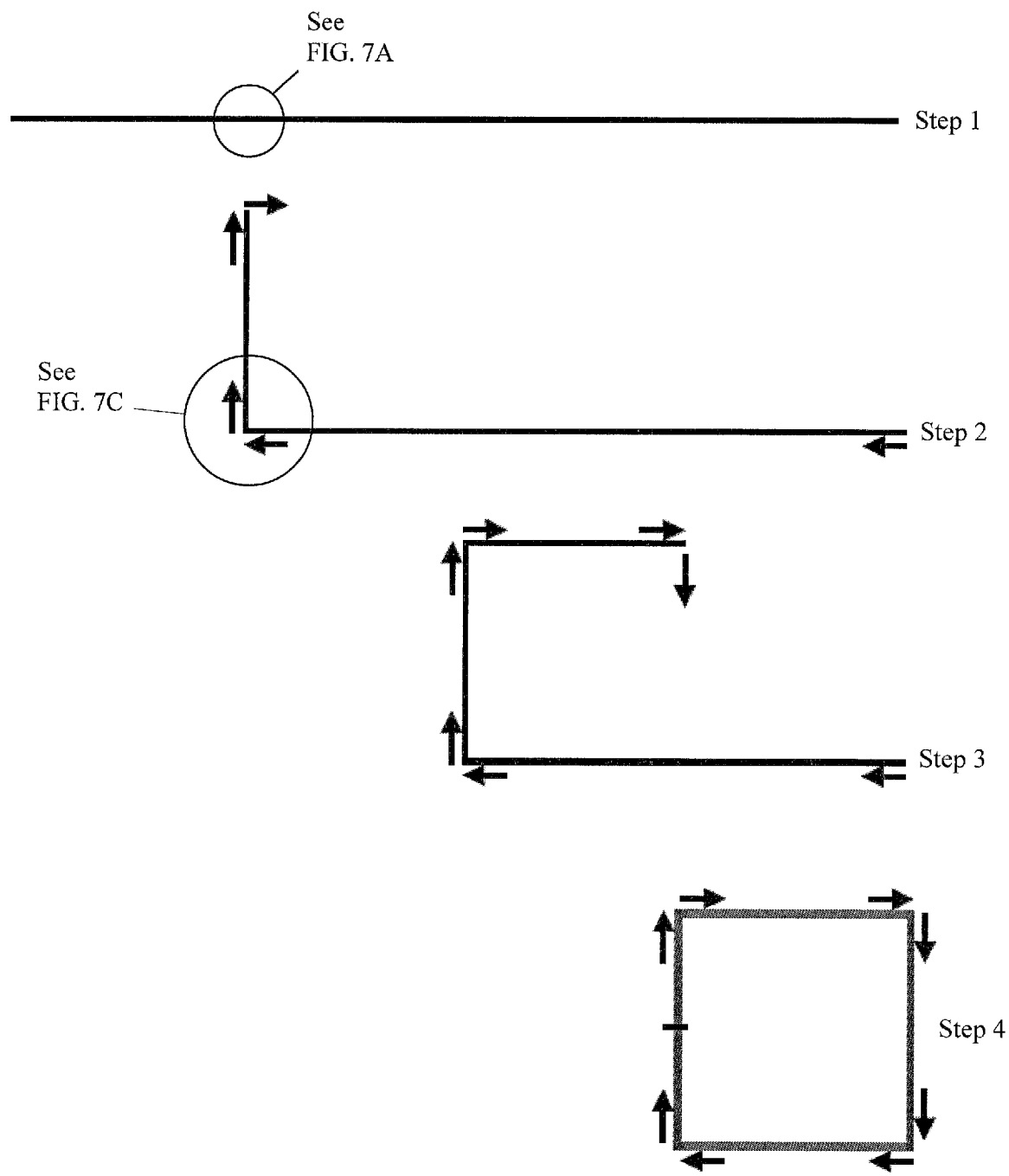
FIG. 7 illustrates the process of bending an elongated member to form the four-sided frame shown in FIG. 5E, each corner of which may be individually laser welded.
Figure 7E:
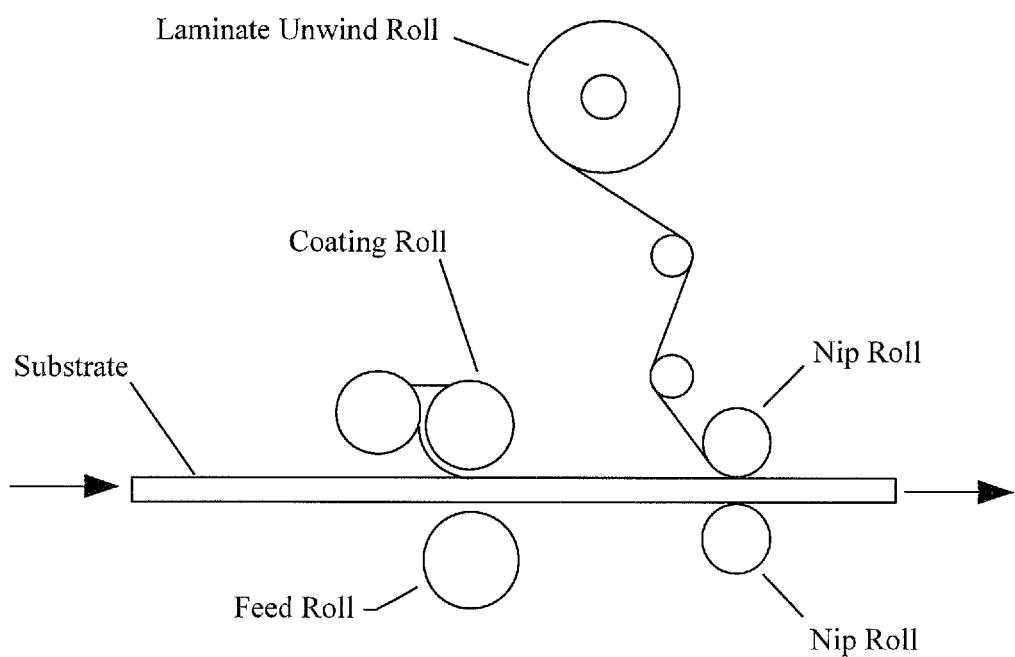
FIG. 7E illustrates a roller arrangement for unwinding a roll of adhesive or a laminate onto the screen frame substrate.

The bending step is shown in the overall process within FIG. 5E, and is shown in more detail in the four steps illustrated in FIG. 7. As seen therein, the four steps begin with the elongated cross-sectional shape having the appropriate length for the finished screen dimensions, a length that takes into account the bend radius or radii. The elongated cross-sectional shape undergoes a "cartwheel" forming process. During the cartwheel forming process, a first bend is formed at step 2 shown in FIG. 7, then the elongated cross-sectional member may be fed to the bending apparatus for another bend to be formed, and so on for the member to be bent at as many corners as needed to form the desired shape (e.g., four corners to form a four sided rectangular-shaped frame), and to position the first end 111 adjacent to the second end 112. (Note a three-sided triangular-shaped frame, or an octagonal-shaped frame, or any other shaped frames may alternatively be formed as desired). Also, the bending process may alternatively be incorporated into the roll forming sequence so as to achieve a throughput efficiency with minimal handling. In one embodiment, the elongated cross-sectional shape may be bent at each location with sufficiently large bend radii to accommodate the bending process without causing cracks to form in the bent-up cross-sectional shape. In another embodiment, shown in FIG. 7A, a notch may first be formed in the elongated cross-sectional shape at each bend location to form multiple sections, but leaving at least a portion of one of the walls of the elongated cross-sectional shape intact. Once bent, the end of one of the sections that were cut to form the notch may be adjacent to or actually contacting another such section, as seen in FIG. 7C, and those ends may then be fixedly joined together. In another embodiment, shown in FIG. 7D, a larger notch may be formed so as to leave a gap between the ends of each of the sections, which gap may be angled. The gap may be used to facilitate welding of the sections together.

Figure 5F:
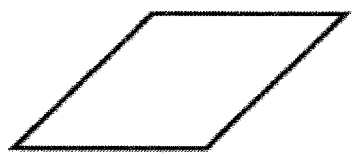
FIG. 5F illustrates a sixth step in the process of forming the frame of the reduced visibility screen shown in FIG. 1.

The first end 111 may similarly be fixedly joined/secured to the second end 112 using any suitable joining process to thereby form the continuous frame structure with only a single lateral joint (and possibly the seam along the length of the elongated member), as shown in FIG. 5F, which joining process may include, but is not limited to being: welded, fused, glued, mechanically fastened, etc. The joint may be located at any position on the perimeter of the frame. The joint may be strengthened by being filled, in addition to the joining process used. Also, the corner locations may similarly be filled to strengthen the corners from racking, twisting, or loosening. Also, notching and material removal may be incorporated at the corner locations. Note that rather than the above notching and bending approach for forming the frame, the corner key type of construction may instead be utilized, as disclosed at least by U.S. Pat. Nos.: 514,654 to Higgin; U.S. Pat. No. 1,038,367 to Henry; U.S. Pat. No. 1,187,402 to Traut; U.S. Pat. No. 2,989,788 to Kessler; U.S. Pat. No. 3,321,885 to Pratt; U.S. Pat. No. 4,502,260 to Machler; U.S. Pat. No. 4,570,406 to DiFazio; U.S. Pat. No. 5,547,011 to Dotson; and U.S. Pat. No. 9,631,417 to Massey.

Use of the term adhesive herein is intended to broadly indicate all possible types of bonding agents or bonding means or material, including, but not limited to: super glue (also known as cyanoacrylate adhesives); pressure sensitive adhesives (PSA); spray adhesives; liquid white glues such as polyvinyl acetate (PVA); epoxy; polyurethane; white craft glue; yellow wood glue/vinyl acetate polymers; organic solvent adhesives; wet bonding adhesives; contact adhesives; polymer dispersions/emulsions; plastisols; water based adhesives/glues; phenol-formaldehyde resins; two-component adhesives such as two-part epoxies, methyl methacrylate, silicone adhesive, urethanes; one part epoxies such as silicones, anaerobic cyanoacrylates, heat cured types, moisture cured types, radiation cured types; sealants, a reactive hot melt adhesive, pressure sensitive adhesive tape, double sided adhesive tape, single sided adhesive tape, reinforced tape, unsupported tape, etc. The adhesive may require a secondary, in-line or off-line, curing step, such as the application of infrared light or ultra violet light. In one embodiment, the adhesive used may be the adhesive sold under the trade name of Rapidex®1011, which is manufactured by HB Fuller. In another embodiment, the adhesive may be a marine adhesive, and may thus be capable of strong bonds even when exposed to rain or when fully submersed in water. In an embodiment where a marine adhesive is used, the adhesive may be, for example, the adhesive sold under the trade name of Marine Adhesive Sealant 5200 Fast Cure, which is manufactured by 3M™ Corp.

The amount of adhesive used and the method of application of the adhesive may be different in various embodiments. In one embodiment, the thickness of the adhesive used may vary based on the thickness of the mesh material, and some exemplary mesh materials and thicknesses are as follows:

9×9 0.013 VENT MESH—0.016-0.017 mil
18×14 0.011—0.012-0.013 mil

Figure 4A:
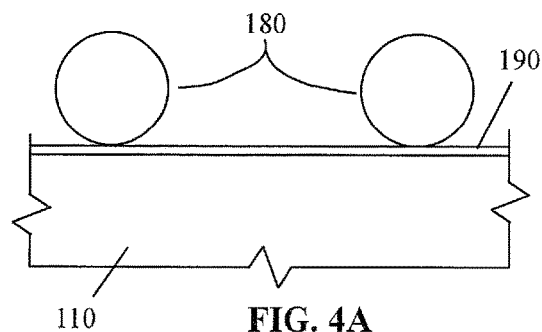
FIG. 4A is an enlarged cross-sectional view showing portions of the mesh being joined to the frame of the screen using a thin layer of adhesive applied to the frame.
Figure 4B:
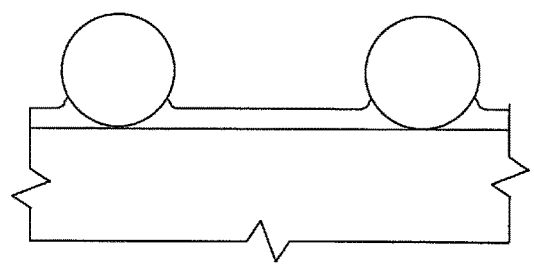
FIG. 4B is the enlarged cross-sectional view of FIG. 4A, but is shown with the portions of the mesh having been pressed into the adhesive to be in contact with the frame of the screen.
Figure 4C:
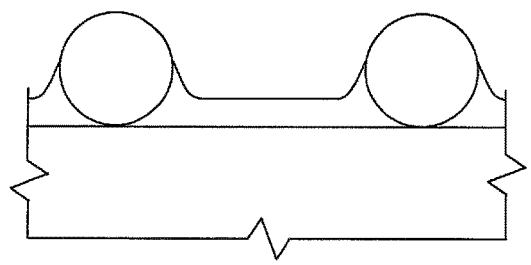
FIG. 4C is the enlarged cross-sectional view of FIG. 4B, but is shown with a thicker layer of adhesive applied to the frame.
Figure 4D:
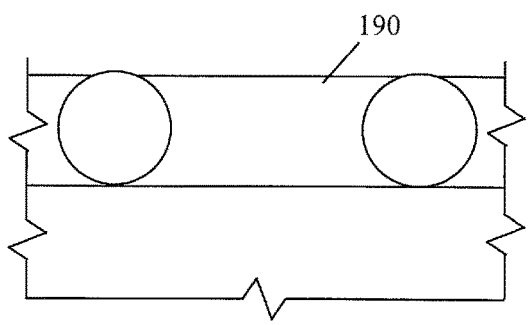
FIG. 4D is the enlarged cross-sectional view of FIG. 4C, but is shown with an even thicker layer of adhesive that encompasses the majority of the exterior surface of the mesh, but does not cover the portion of the mesh that is most distal from the frame of the screen.

18×14 0.013—0.015-0.016 mil
18×16 0.011 Std.—0.012-0.013 mil
18×18 0.007 UV—0.008-0.009 mil
18×18 0.008 BV—0.010-0.011 mil
20×20 0.013—0.015-0.016 mil
20×30 0.013—0.018-0.019 mil
17×13 0.013 TSCREEN—0.022-0.023 mil
18×18 0.013 TSCREEN—0.019-0.020 mil
18×22 0.013 TSCREEN—0.019-0.020 mil
17×10 0.025 PET SCR.—0.032-0.033 mil
17×14 0.025 SUNTEX 80—0.031-0.032 mil
23×16 0.025 SUNTEX 90—0.034-0.035 mil
57×16 SUNSCREEN—0.020-0.021 mil
57×19 SUNSCREEN—0.019-0.020 mil In one embodiment, a thin layer of adhesive 190 may be used, and the layer may be applied to the frame 110, as shown in FIG. 4A. The layer of adhesive may separate the mesh 180 material from the frame. Alternatively, as shown in FIG. 4B, the mesh may be pressed sufficiently into the adhesive to be in contact with the frame. Depending upon the properties of the adhesive (e.g., the extent to which it may flow), as the mesh is pressed into the thin adhesive layer, such contact from the mesh may cause an amount of the adhesive layer to wrap around a portion of the cross-section of the screen, which may be between 5 percent and 25 percent of the distance that the screen protrudes away from the flat surface of the frame. As seen in FIG. 4C, where a is thicker layer of adhesive has been applied to the frame, as the mesh is pressed into the thicker layer, it may result in the adhesive locally wrapping around a portion of the side of the mesh, and may reach between 25 percent to 75 percent of the distance that the screen protrudes away from the flat surface of the frame. A substantially thicker layer of adhesive may be used such that it may encompass the majority of the exterior surface of the mesh at the frame, but does not cover the portion of the mesh that is most distal from the frame of the screen, as shown in FIG. 4D. In this embodiment, the adhesive may reach between 75 percent and 99 percent of the distance that the screen protrudes away from the flat surface of the frame. (Note, although a circular cross-section is shown for the mesh, which may be formed from drawn wire, other cross-sectional shapes may also be used, such as a square shape, or another polygonal shape, etc.).

Figure 4E:
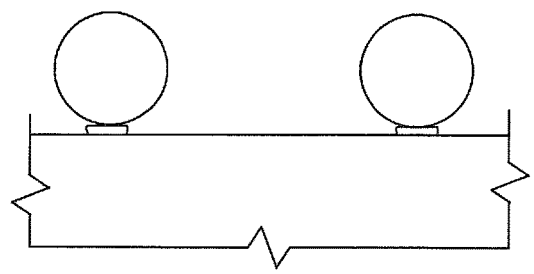
FIG. 4E is an enlarged cross-sectional view showing portions of the mesh being joined to the frame of the screen using a thin layer of adhesive applied to the mesh.
Figure 4F:
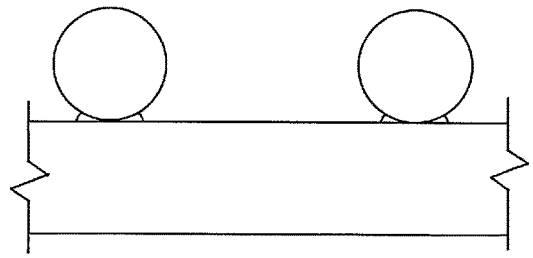
FIG. 4F is the enlarged cross-sectional view of FIG. 4E, but is shown with the portions of the mesh having been pressed into the adhesive to be in contact with the frame of the screen.
Figure 4G:
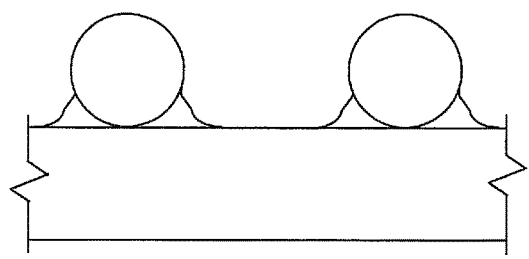
FIG. 4G is the enlarged cross-sectional view of FIG. 4F, but is shown with a thicker layer of adhesive having been applied to the mesh.
Figure 4H:
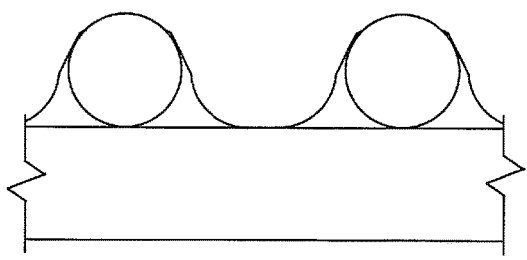
FIG. 4H is the enlarged cross-sectional view of FIG. 4G, but is shown with an even thicker layer of adhesive having been applied to the mesh that encompasses the majority of the exterior surface of the mesh, but does not cover the portion of the mesh that is most distal from the frame of the screen.
Figure 4J:
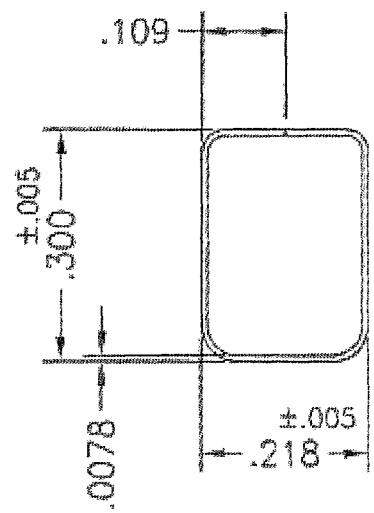
FIG. 4J is an enlarged detail view of a first embodiment of a cross-sectional shape that may be used for the reduced visibility screen shown in FIG. 1 and FIGS. 3-4.
Figure 4K:
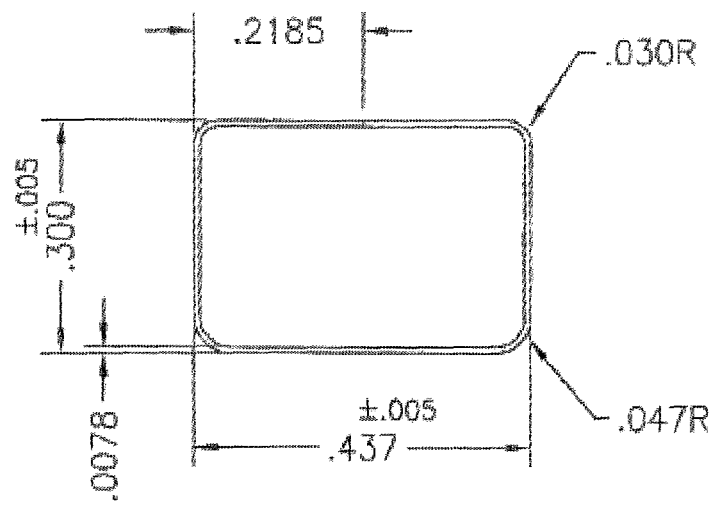
FIG. 4K is an enlarged detail view of a second embodiment of a cross-sectional shape that may be used for the reduced visibility screen shown in FIG. 1 and FIGS. 3-4.

In another embodiment, a thin layer of adhesive may be used, and the layer may be applied to the mesh, as shown in FIG. 4E, and which mesh may also be pressed to be in contact with the frame, as shown in FIG. 4F. As seen in FIG. 4G, where a thicker layer of adhesive has been applied to the mesh, as the mesh is pressed into contact with the frame, the adhesive may tend to wrap around a portion of the side of the mesh. With an even thicker layer of adhesive having been applied to the mesh, it may tend to encompass the majority of the exterior surface of the mesh, when pressed into contact with the frame, as seen in FIG. 4H; however, the amount of adhesive used should be limited to prevent it from covering the portion of the mesh that is most distal from the frame of the screen. It is noted that the mesh material 180 may preferably be bonded to an entire side of the frame 110 (see FIG. 4), which side is a flat surface across the width W of the frame, with the flat surface being without any recesses, channels or indentations along its circuitous length, and which side is generally parallel to its opposite surface of the cross-sectional shape. In one embodiment, this securing of the mesh 180 to the frame 110 is accomplished solely through the use of the adhesive, and no other means of securing the mesh to the frame is used other than the adhesive. In another embodiment, this securing of the mesh 180 to the frame is accomplished substantially solely through the use of the adhesive, as one or more pieces of tape and/or one or more staples on each side may be used to temporarily support and stretch the mesh across the frame until the adhesive has set.

FIG. 4I schematically illustrates the thickness buildup of the frame, mesh and adhesive used to form the screen. Where the mesh is not pressed into the adhesive (e.g., FIGS. 4A and 4E), the thickness of the finished screen unit may be the sum of the thicknesses of the frame, the adhesive, and the mesh (i.e., $U=M+A+F$). Where the mesh is pressed into the adhesive, the thickness of the finished screen unit would be less than the sum of the thicknesses of the frame, the adhesive, and the mesh (i.e., $U<M+A+F$). Where the mesh is pressed into the adhesive to be in contact with the frame (e.g., FIGS. 4B and 4C) and there is not any crushing/deformation of the mesh, the thickness of the finished screen unit would be the sum of the thicknesses of the frame and the mesh, because the thickness of the mesh is greater than the thickness of the adhesive (i.e., $U=M+F$, because $M>A$).

FIG. 5G illustrates placement of mesh material onto the adhesive covered side of the frame. The mesh material may be precut to size, or alternatively, as shown in FIG. 5G, may be applied from a roll of mesh material, and may be trimmed during the unrolling of the mesh onto the frame. A pinch roller or a pair of pinch rollers may be used to firmly embed the mesh within the adhesive layer.

The thickness of the layer of adhesive applied may therefore be such that it may be present on the side of the mesh that contacts the frame, and the sides that are laterally oriented with respect to the frame, but the adhesive should not be so thick as to extend above the outwardly facing surface of the mesh, so as to not be excessive, as seen in FIGS. 4D and 4H.

Figure 2:
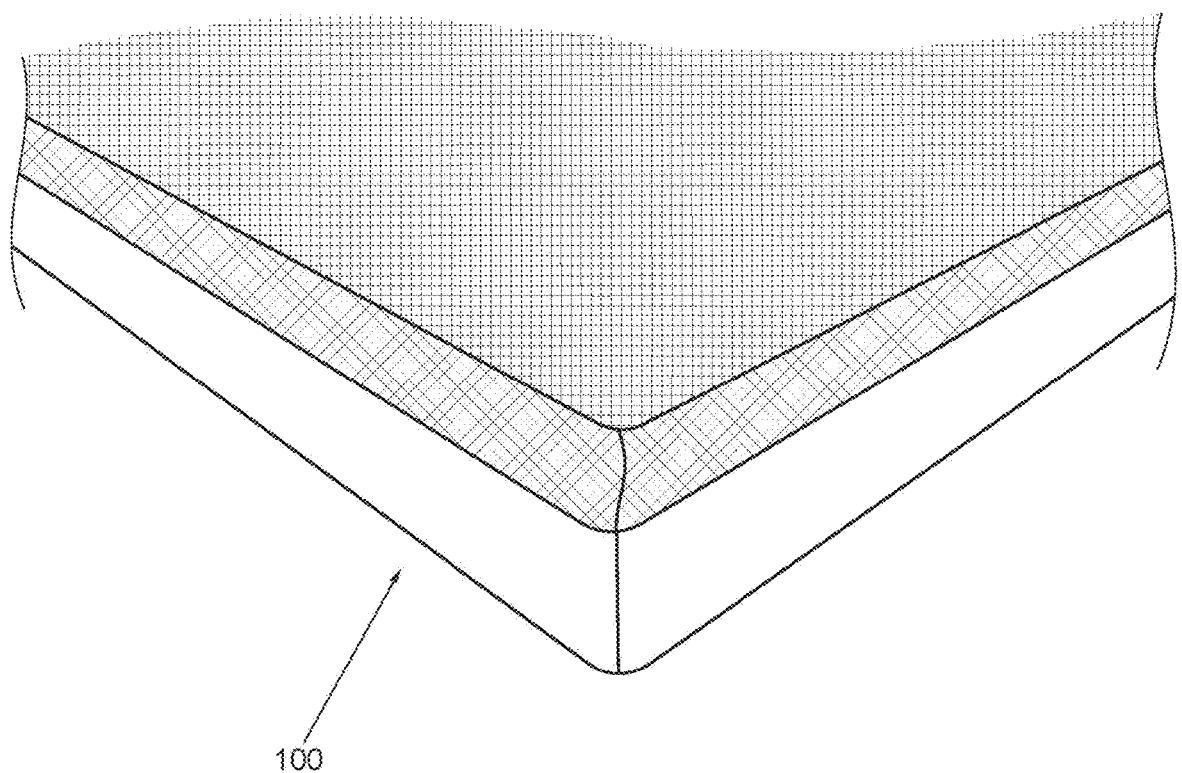
FIG. 2 illustrates a perspective view of one corner of the reduced visibility screen shown in FIG. 1.

FIG. 5H illustrates a trimming operation configured so that the mesh terminates at the distal end of the adhesive covered side of the frame, as shown in FIG. 2. The final trimming operation may occur after the adhesive has cured. The adhesive and the mesh may be applied to the frame as either an outer screen mesh placement or an inner screen mesh placement. The adhesive and mesh material may be overlaid upon the seam for increased strength and/or rigidity. The completed frame 100 is shown in FIG. 5I.

Figure 6:
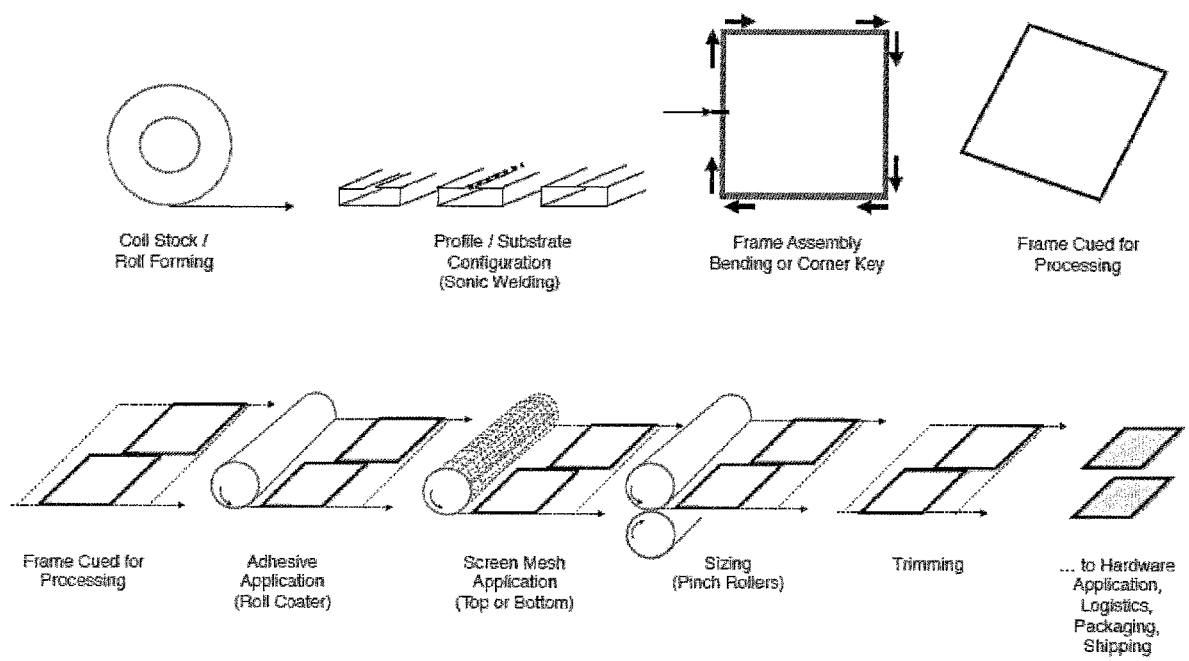
FIG. 6 illustrates an alternative series of steps for forming the frame of the reduced visibility screen shown in FIG. 1.

FIG. 6 illustrates an alternative series of steps for forming the frame of the reduced visibility screen 100, and which shows the pinch rollers being used. Note that one roller (or other device) may be used to press the mesh into the adhesive, with the opposite side of the frame of the screen being retained against and supported by a table or other rigid body.

FIG. 8 illustrates a side view of a reduced visibility screen 200 formed in accordance with a second embodiment of the present invention. The reduced visibility screen 200 may utilize a modified version of the screen 100 described hereinabove. The profile width of the reduced visibility screen 100 may typically be about ⅜ of an inch, and may be as small as 0.3 inches, which yields such a small confined internal space that does not readily accommodate a coil spring for biasing of a conventional plunger pin.

Therefore, the reduced visibility screen 100 may have a curved leaf spring secured thereto to create a reduced visibility screen 100'. In one embodiment, the leaf spring may have a curved shape, which curve may be an arc, a portion of an ellipse, a portion of a parabola, or any other suitable curve. In one embodiment, the leaf spring may be secured to holes formed in its frame. In another embodiment, the leaf spring 270 may have a first straight portion 271S between a first end 271 and a curved centrally positioned portion 270C, and a second straight portion 272S between a second end 272 and the centrally positioned curved portion, as shown in FIG. 11, which may better facilitate centering of the screen within a correspondingly shaped recess in the master window frame, as discussed hereinafter. The particular leaf spring arrangement utilized may be added not only to bias the screen within the master frame, but to also center the screen within a correspondingly shaped socket formed in a recess of the master frame. A single leaf spring, which may generally have a curved shape, may be suitably used on the frame. Alternatively, as shown in FIG. 8, two (or even more) such leaf springs may be installed thereon, and may be disposed towards opposite ends of one side of the frame (or may be equally spaced thereon or spaced as required/desired).

As shown in FIGS. 8-11, the outwardly disposed surface of one side of the reduced visibility screen 100 may have a first hole 201 and a second hole 202 formed therein, to create the reduced visibility screen 100', which holes 201/202 may be spaced a particular distance S1 apart. The leaf spring 270 may have a first end 271 and a second end 272, where the first end of the leaf spring may be formed with a first hook 271H, and the second end of the leaf spring may be formed with a second hook 272H. The leaf spring 270 may be formed with an overall length, as seen in FIG. 13B, being configured for the first hook 271H at the first end 271 of the leaf spring and the second hook 272H at the second end 272 of the leaf spring to be respectively received within the spaced apart first and second holes 201/202 in the one side of the narrow profile frame, when the leaf spring is deformed to be substantially straight. The overall length of leaf spring 270 may be selected so that when formed into its curved shaped, it may have a selective length S2, as seen in FIG. 12A, between the most distal interior positions of the hooks, so that the selective length S2 of the leaf spring may be configured for the first hook 271H and the second hook 272H to be selectively positioned with respect to the spaced apart first and second holes, when the leaf spring is undeformed (FIG. 13A). In one embodiment, the selective length S2 of the leaf spring may be slightly larger than the distance S1 (e.g., being 1% to 5% larger), such that the first hook 271H and the second hook 272H would not clamp-up onto the inside surfaces of the frame 100' formed by the two holes 201/202. In another embodiment, the selective length S2 of the leaf spring 270 may be substantially the same as the distance S1, such that the first hook 271H and the second hook 272H would each be immediately adjacent to the respective inside surfaces of the frame 100' formed by the two holes 201/202. In yet another embodiment, the selective length S2 of the leaf spring 270 may be slightly less than the distance S1 (e.g., S2 being 1% to 5% smaller than S1), such that the first hook 271H and the second hook 272H would each engage and clamp-up on the respective inside surfaces of the frame 100' formed by the two holes 201/202, when the deformed leaf spring is returned to its undeformed shape.

As the leaf spring is actuated from its undeformed position shown in FIG. 13A, during installation of the screen 200 into the socket of the master frame of the window/door, the ends 271/272 of the spring could tend to be drawn into the hollow interior of the frame 100', and could potentially be jammed therein with the spring remaining in a deformed position. Therefore, in another embodiment of the leaf spring, each of the hooks may be formed from a central portion of the end of the leaf spring raw material, leaving behind a pair of short straight sections on each end (e.g., 271Ri and 271Rii in FIG. 12B, and 271Ri and 272Rii in FIG. 12A). The pair of short straight sections on each end may contact the bottom surface of the frame 100', as seen in FIG. 9A, and may prevent the end of the leaf spring from being drawn into the hollow of the frame.

A variation of the screen 200 embodiment may also include at least one clip 290 secured to any of the four sides of the frame 100'. The clip 290 may wrap over the top of the frame and over the mesh material 280, and may have a return flange 291. The clip 290 may therefore be configured for handling of the screen 200 during installation into the master frame and removal therefrom.

Figure 14:
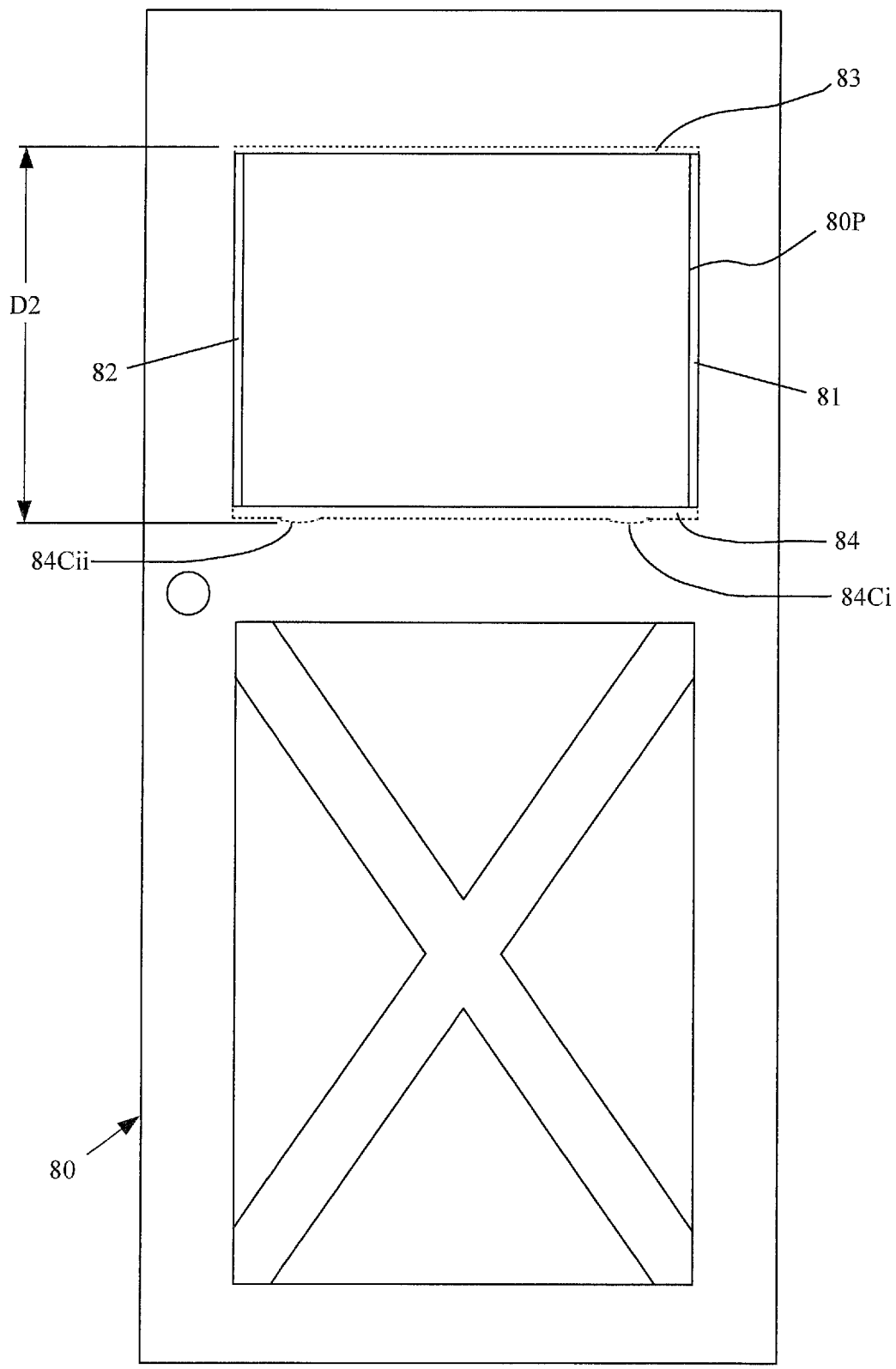
FIG. 14 is a side view of an interior side of a door with an opening formed therein that is configured to receive the reduced visibility screen of FIG. 8.

FIG. 14 is a side view of an interior side of an exemplary door 80 with an opening 80P formed therein, and being configured to receive the reduced visibility screen 200 of FIG. 8. The opening 80P may create in a pair of flanges 81/82 that may be initially contacted by the frame 100' as the screen 200 is installed into the socket (see FIG. 15A), and which flanges may subsequently provide support for two sides of the frame of the screen, after it is installed in the socket. The opening 80P may create an upper socket portion 83, and a lower socket portion 84, each having a selective depth related to the extent of the screen 200 (e.g., D2 shown in FIG. 14 for the socket may be slightly less than D1 shown in FIG. 8 for the corresponding screen extent, being at least one percent to ten percent less in one embodiment, and ten percent to twenty percent less in another embodiment). The lower socket portion 84 may also have a curved recess 84Ci formed therein that may generally correspond to the shape of the leaf spring 270 used on the screen 200, and may be appropriately positioned laterally in the lower socket 84 to suitably position/center the screen therein. Where two such leaf springs 270 may be used on screen 200, a pair of curved recesses 84Ci and 84Cii may be formed in the lower socket 84. In one embodiment, the simpler, curved leaf spring may be used. Where the plain curved leaf spring is used, the extreme edges of the curved recesses 84Ci and 84Cii may have an outside corner radius formed thereon, to prevent any tendency of the leaf spring to snag thereon. Also, for better centering, the radius of curvature of the leaf spring may preferably be formed to be within 10 percent of the radius of curvature of the curved recesses (84Ci and 84Cii). For better seating of the leaf spring in the recess, the radius of curvature of the curved recess is more preferably formed to be within 5 percent of the radius of curvature of the curved recesses. Seating may also be improved if the radius of curvature of the leaf spring is smaller than the radius of curvature of the corresponding recess. Lastly, for optimal seating, the radius of curvature of the curved recess is most preferably formed to be less than 3 percent larger than the radius of curvature of the leaf spring.

However, to assure even better centering of the frame, and movement of the leaf spring with respect to the curved recesses 84Ci and 84Cii, the leaf spring 270 formed with the first and second straight portion 271S and 272S on opposite sides of the curved central portion 270C may instead be used.

Figure 15A:
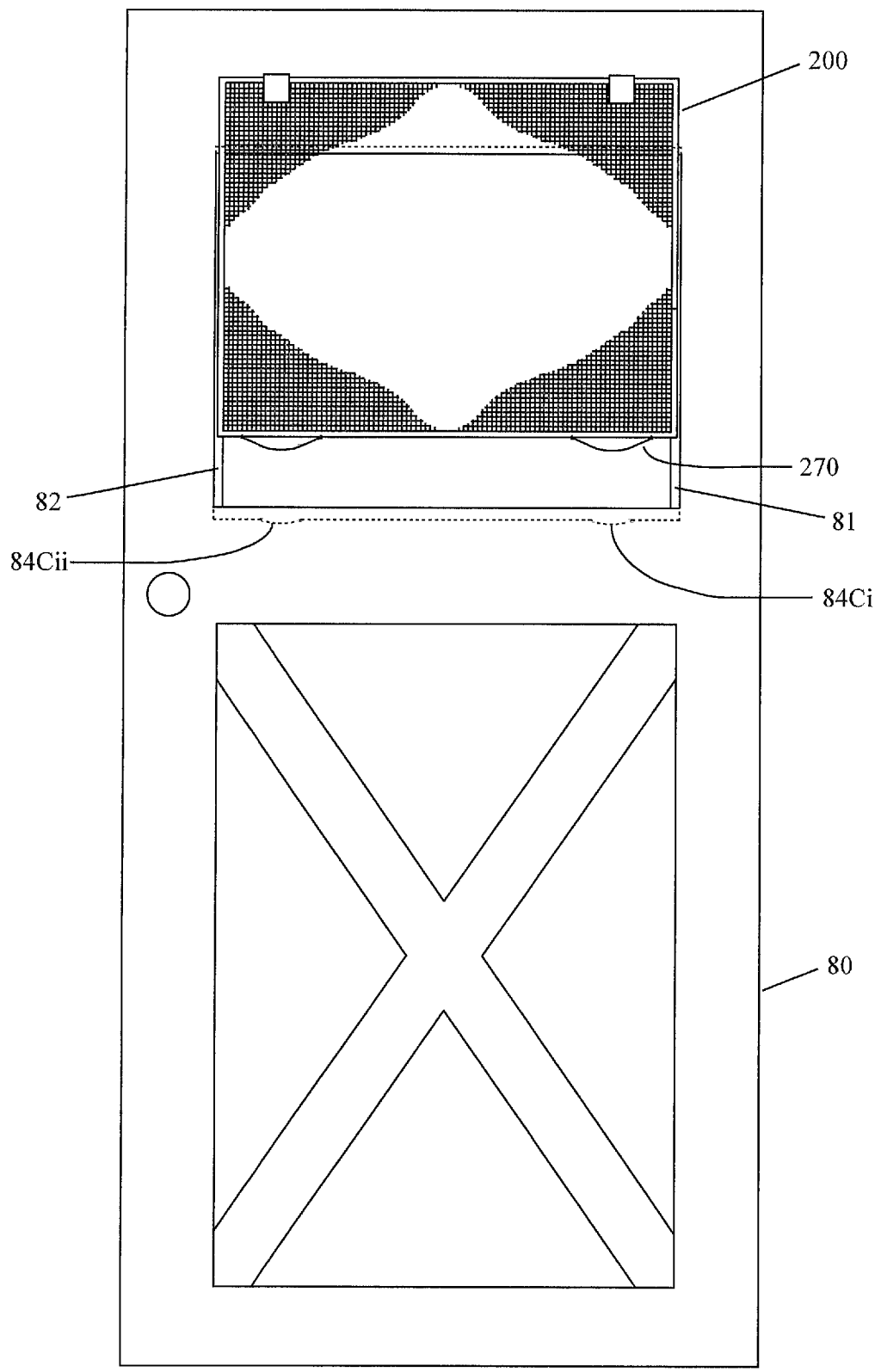
FIG. 15A illustrates the side view of the door of FIG. 14, with the reduced visibility screen of FIG. 8 in the process of being installed in the recess in the door.
Figure 15B:
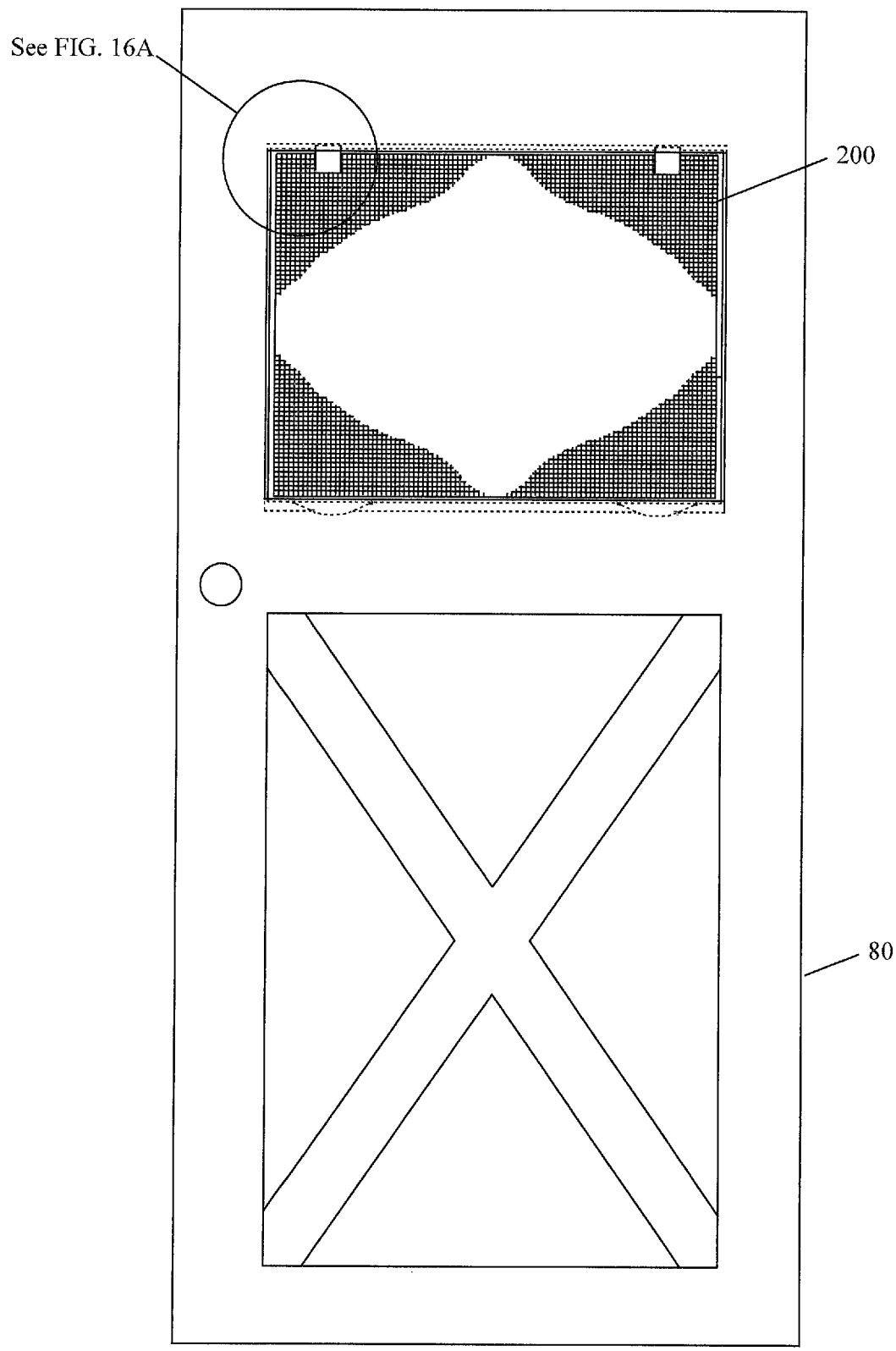
FIG. 15B is the side view of FIG. 15A, shown after the reduced visibility screen of FIG. 8 is installed in the recess in the door.

FIG. 15A illustrates the lower end of screen 200 being placed into contact with the flanges 81/82 of the frame of the door 80 (note that a door is used in the example merely to be exemplary, and installation into a master frame of window may proceed in a similar manner). As the screen 200 is lowered for its bottom end to enter the lower socket 84, the leaf spring(s) 270 would center the screen therein through contact with the curved recesses 84Ci and 84Cii. A force may be applied to the top end of the screen 200 to deform the leaf spring(s) 270 sufficiently to allow the top of the frame 100' to enter the opening, and once inserted therein, the springs may bias the top of the frame into contact with the upper surface of the upper socket 83, as shown in FIG. 15B, and the enlarged views of FIGS. 16A-16D. As seen in those figures, where a clip 290 is used, it would be in contact with the upper surface of the upper socket 83, and where a clip 290 is not used, the top of the frame 100' would instead be in contact with the upper surface of the upper socket 83.

Figure 16A:
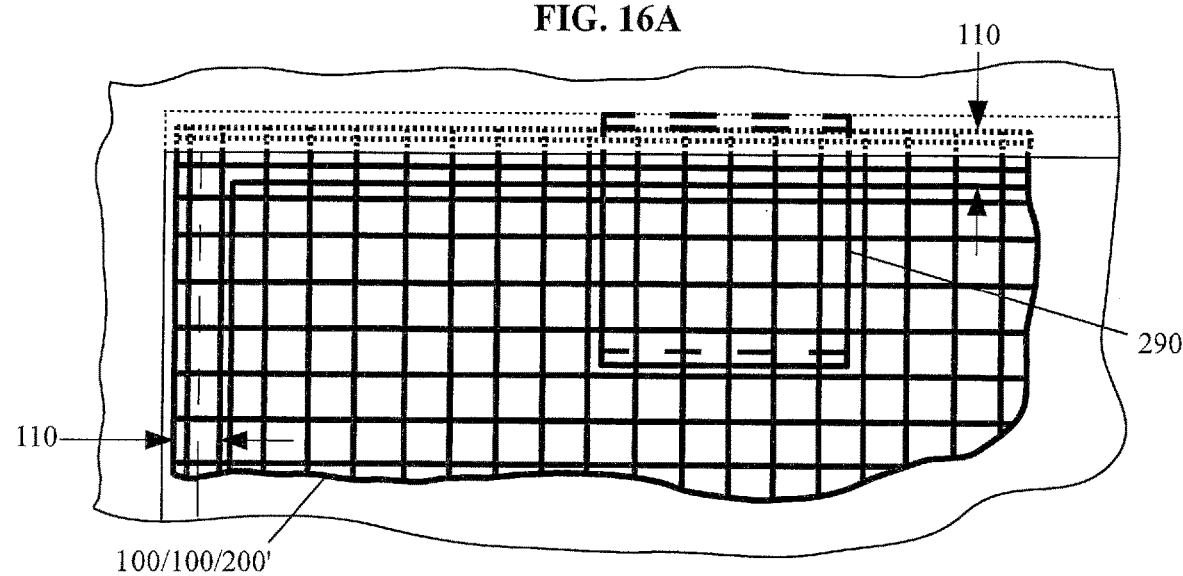
FIG. 16A is an enlarged detail view of one end of the reduced visibility screen installed within the door, as shown in FIG. 15B.
Figure 16B:
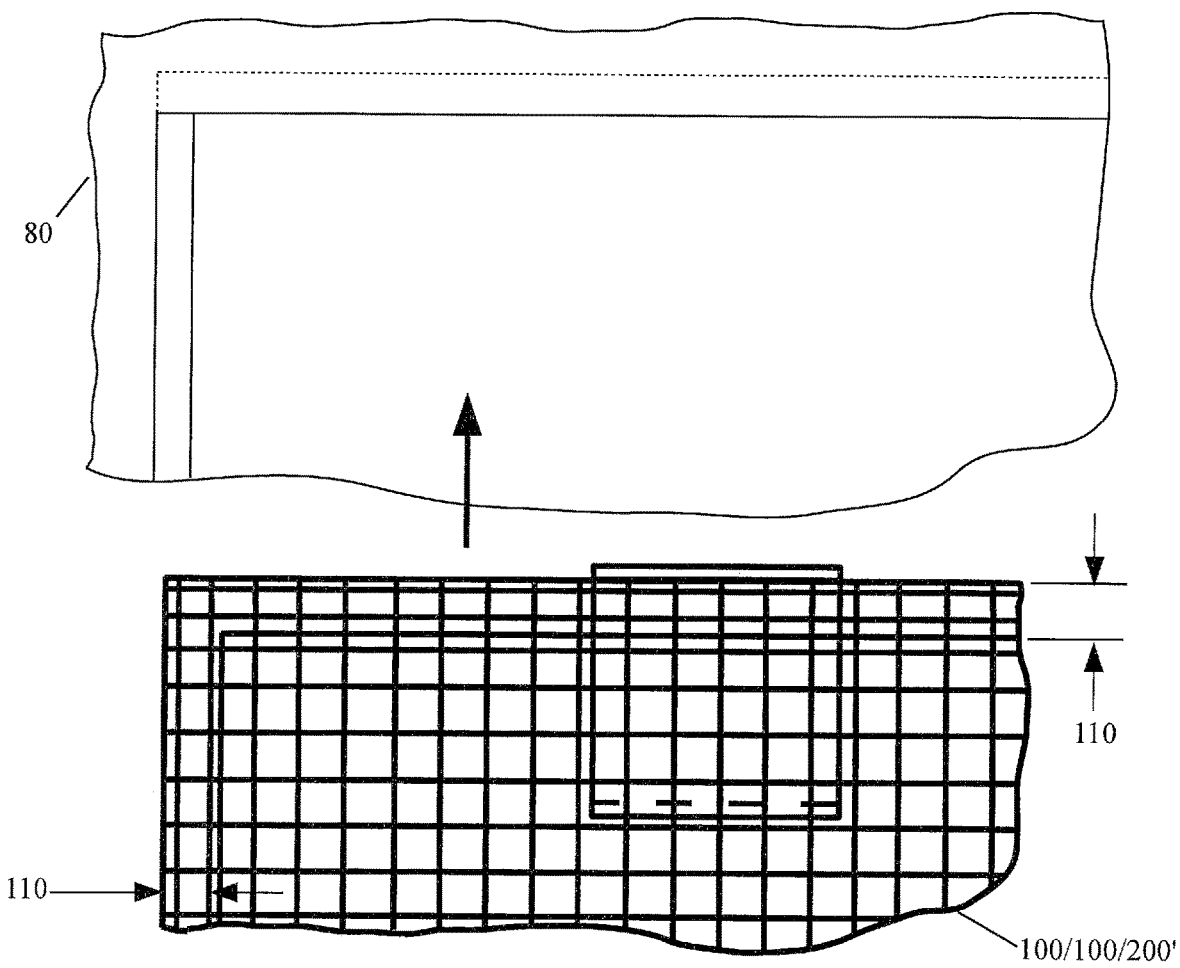
FIG. 16B is the enlarged detail view of FIG. 1, but is shown with the screen prior to installation into the door.
Figure 16C:
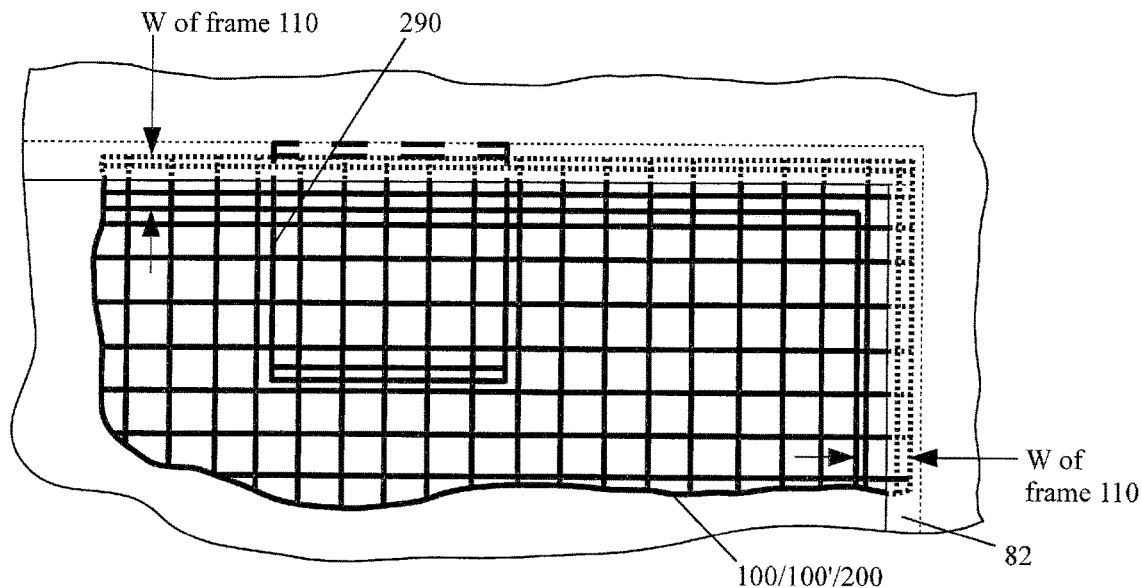
FIG. 16C is the enlarged detail view of FIG. 16A, but is mirrored to show the exterior facing side of the door and screen.

FIG. 16C is the enlarged detail view of the installed screen 200 shown in FIG. 16A, but shows the reverse, exterior facing side of the door and screen, and gives an indication of the reduced sightline described hereinabove produced by the combination of the reduced profile of the frame 100' and the particularly formed socket on the master frame of the door/window. The exposed portion of the reduced sightline frame 100' is indicated by the hatching 100H shown in FIG. 16D, which is otherwise the same as FIG. 16C.

The reduced sightline frame construction disclosed herein (e.g., frame 100, frame 100', etc.) is particularly devised to result in the width W of the frame (see FIG. 4) to be less than two times its depth D. In another embodiment, the width W of the frame is preferably less than 1.75 times the depth D, and in yet another embodiment, it is more preferably less than 1.5 times the depth D, and in yet a further embodiment the width W is most preferably about 66% of the depth D, as shown for the cross-section in FIG. 4J. When the frame (e.g., frame 100, frame 100', etc.) that is so constructed is inserted into the master frame of a corresponding door/window, the portion P of the narrow width W that is exposed beyond the master frame (see hatching 100H in FIG. 16D) is preferably less than three-quarters of that width W, and is more preferably less than one-half of that width W, and is most preferably less than one-quarter of the width W.

Figure 16D:
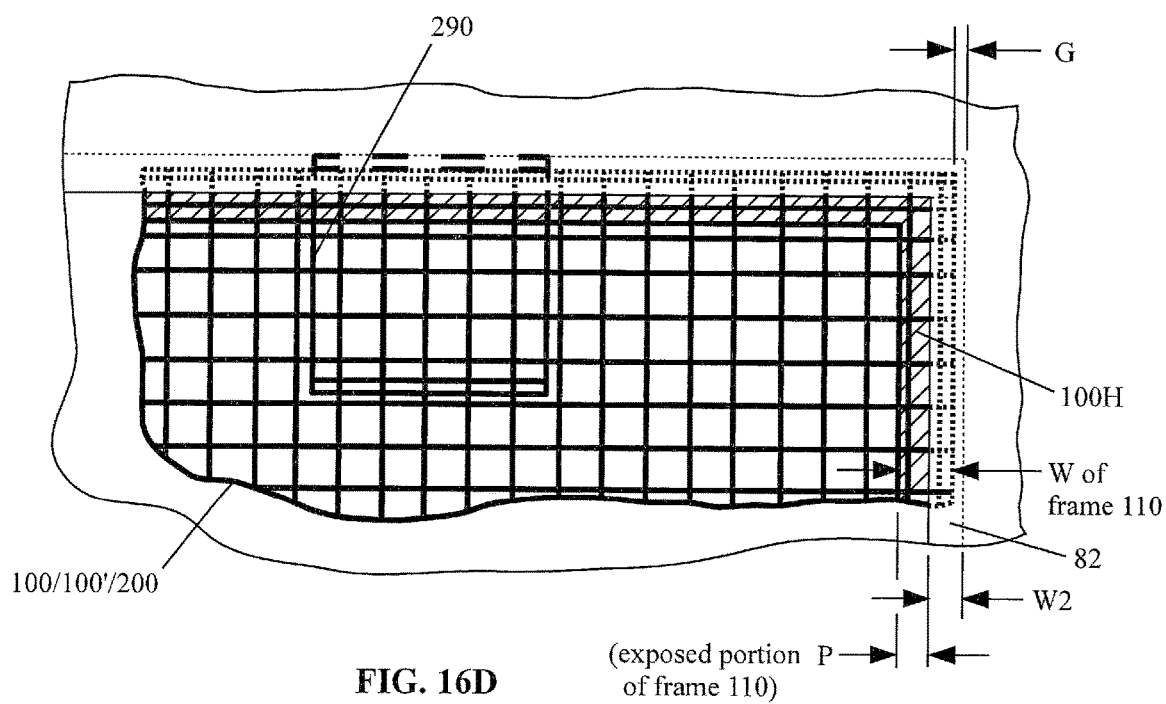
FIG. 16D is the detail view of FIG. 16C, but shows the exposed portion of the frame of the screen with hatching.

As seen in FIG. 16D, there may be a small gap G between each side of the frame 110 and the shoulder where the lateral flanges 81/82 begin, or in another embodiment there may be no gap at all (i.e., a slight friction fit may be formed therebetween).

The reduced sightline frame construction disclosed herein (e.g., frame 100, frame 100', etc.) is also particularly devised in combination with the master frame of the door/window to result in the width W of the frame to be less than two times the width W2 of the flange 81/82 (see FIG. 16D). In another embodiment, the width W of the frame is less than 1.75 times the width W2 of the flange 81/82, and in yet another embodiment it is less than 1.5 times the width W2 of the flange 81/82, and in yet a further embodiment the width W is about the same as the width W2 of the flange 81/82.

Figure 17:
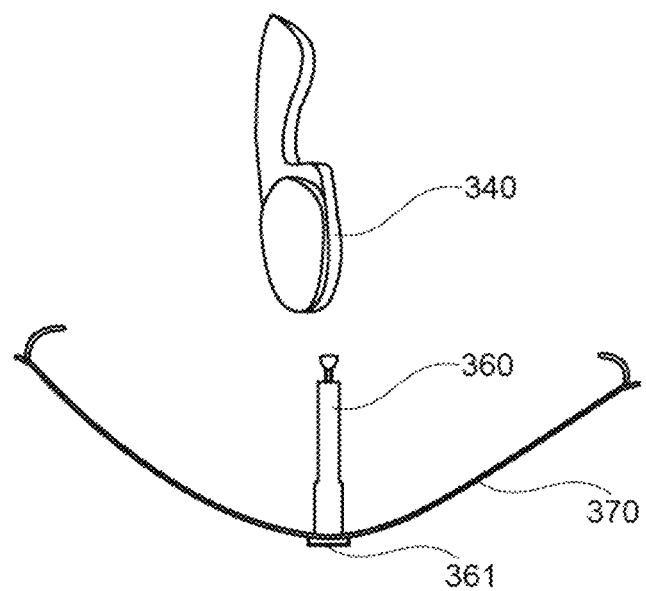
FIG. 17 is an exploded side view of a leaf spring, a plunger pin, and a handle member that may be movably secured to an end of the plunger pin, and which handle member has a cam surface selectively positioned thereon.
Figure 18:
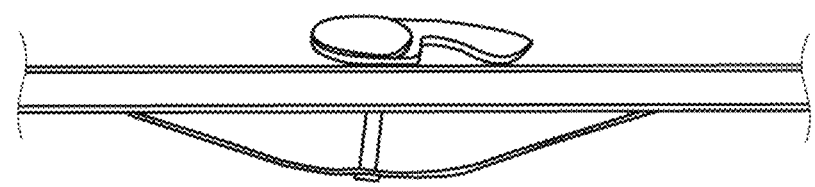
FIG. 18 shows a side view of the leaf spring, plunger pin, and handle of FIG. 17 after being assembled with respect to the frame of a reduced visibility screen formed in accordance with the present invention, and with the handle positioned for the leaf spring to be in an undeformed position.
Figure 19:
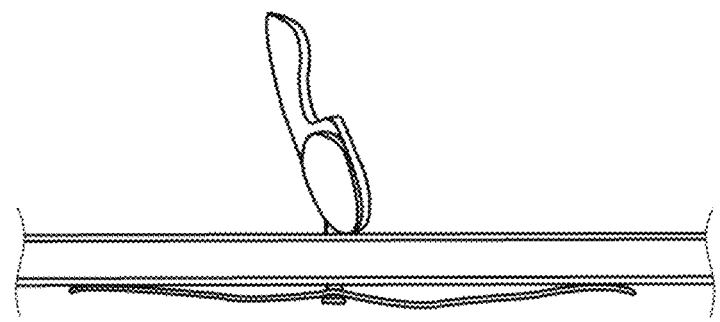
FIG. 19 is the side view of FIG. 18, but is shown with the handle member pivoted to deform the leaf spring to be substantially straightened.
Figure 20:
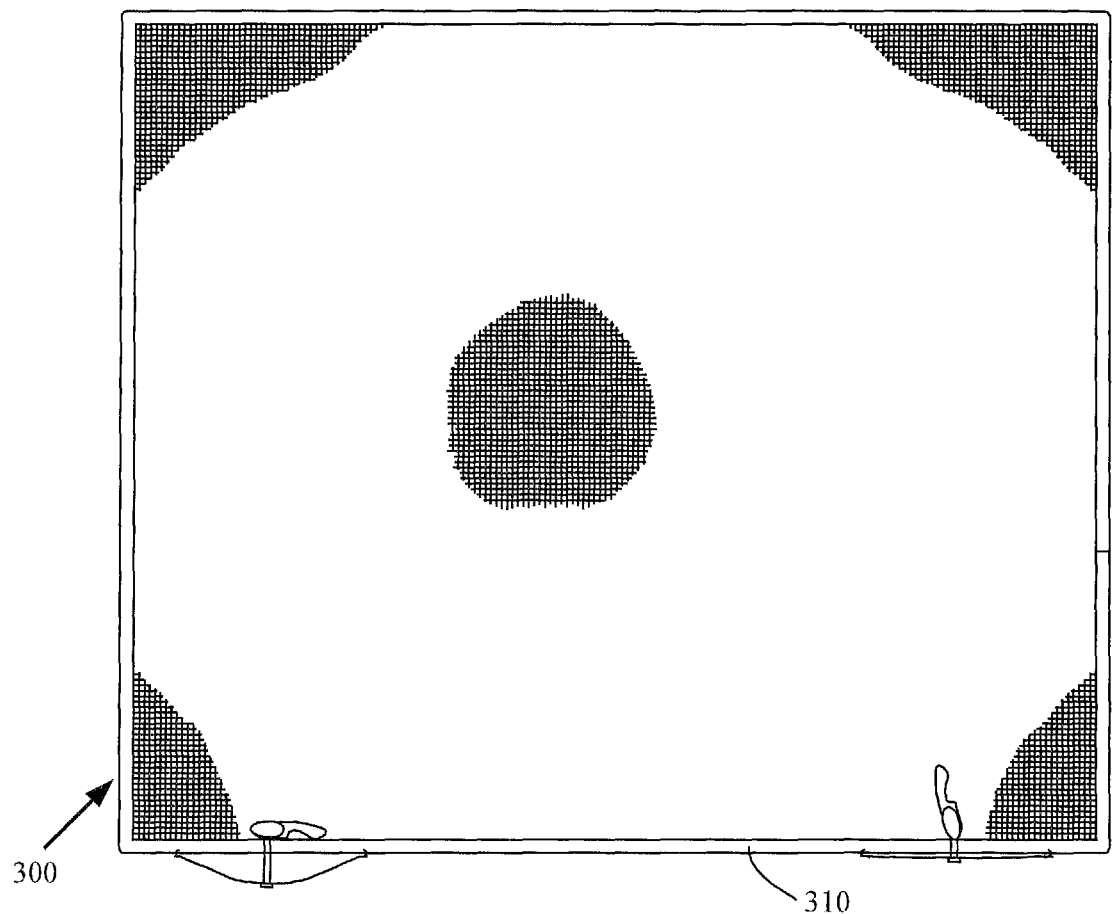
FIG. 20 is a side view showing two sets of leaf springs, plunger pins, and handles according to FIG. 17, after being assembled with respect to two portions of the frame of a reduced visibility screen in accordance with the present invention.

In yet another embodiment, a reduced sightline screen 300, shown in FIG. 20, may be formed from the screen 200, but which may also have a mechanical arrangement particularly designed for actuation of the leaf spring. FIG. 17 shows an exploded side view of the leaf spring 370, with a plunger pin 360 coupled thereto, and a handle member 340. One end of the plunger pin 360 may be secured to the leaf spring 370, in any suitable manner. It may be welded or otherwise permanently secured thereto. Alternatively, the plunger pin 360 may be formed with a head 361, and a hole may be formed at a central position of the leaf spring 370, so that the plunger pin may be fed through the hole until the head contacts the lower side of the leaf spring, as shown in FIG. 17. The narrow profile frame 310 may be formed the same as frame 100, except that it may also be formed with a third hole being formed substantially mid-way between the first and second holes 201/202. The leaf spring 370 with plunger pin 360 coupled thereto may be installed on the frame 310 by inserting the free end of the plunger pin through the third hole, and by coupling the handle 340 to the exposed end of the pin. The handle member 340 may be movably secured to the upper end of the plunger pin 360, and the handle member may have a cam surface for particular contact with one side of the frame 310. As seen in FIGS. 18-19 and in FIG. 20, the handle member 340 may be movable between first and second positions using the cam surface to actuate the plunger pin to respectively move the leaf spring between being deformed and undeformed. The cam surface of the handle member 340 may be configured to hold the leaf spring 370 in the deformed positon shown in FIG. 19 without being maintained thereat by the user. With the handle member 340 actuated to be maintained in the deformed (i.e., straightened position), the screen 300 may be more easily removed from the socket of the master frame of the window/door.

Figure 21:
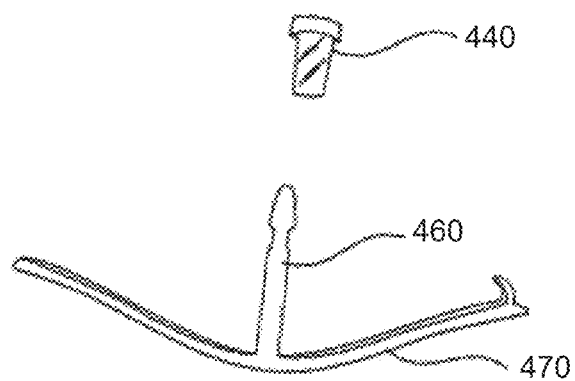
FIG. 21 illustrates an exploded view of an alternate embodiment of the leaf spring, plunger pin, and handle member of FIG. 17.

FIG. 21 illustrates an exploded view of an alternate embodiment, which includes a leaf spring member 470 and a plunger pin 460 that are formed as a single unitary part, and handle member 440 that may be threadably attached to the plunger pin to be rotated to actuate the leaf spring between its deformed and undeformed positions.

Figure 22:
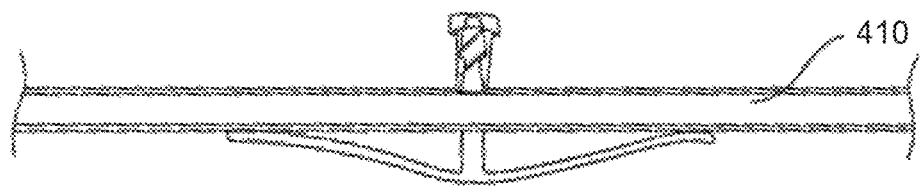
FIG. 22 illustrates the alternate embodiment of the leaf spring, plunger pin, and handle member of FIG. 21, after being assembled with respect to the frame of a reduced visibility screen formed in accordance with the present invention, and with the handle positioned for the leaf spring to be in an undeformed position.
Figure 23:
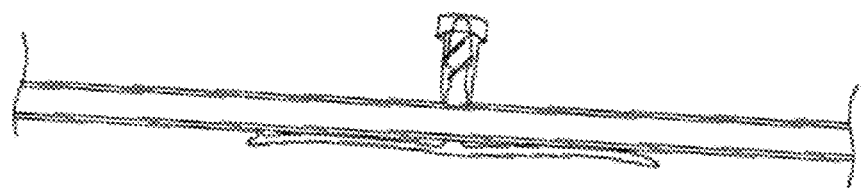
FIG. 23 illustrates the side view of FIG. 22, but is shown with the handle member moved to deform the leaf spring to be substantially straightened.
Figure 24:
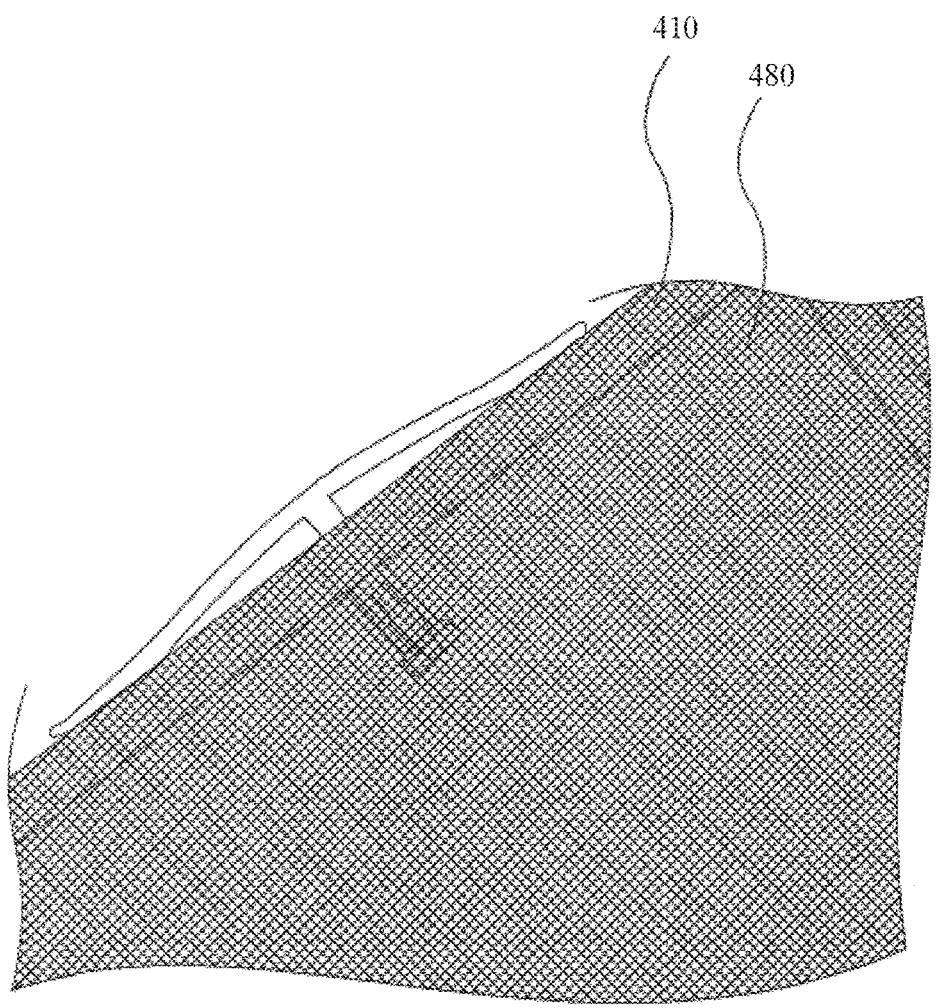
FIG. 24 illustrates the side view of FIG. 22, but is shown with mesh material applied onto the frame.
Figure 25:
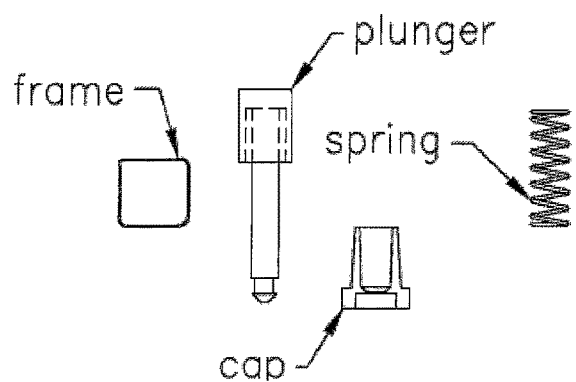
FIG. 25 is an exploded view showing the component parts for a helical spring biased plunger pin arrangement, including a frame, a plunger, a cap, and the spring.
Figure 28:
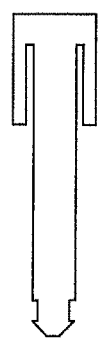
FIG. 28 is a cross-sectional view through the plunger of FIG. 26.
Figure 26:
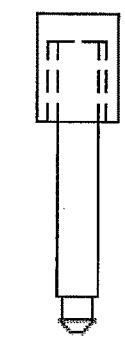
FIG. 26 is an enlarged side view of the plunger shown in FIG. 25.
Figure 27:
FIG. 27 is an end view of the plunger of FIG. 26.
Figure 30:
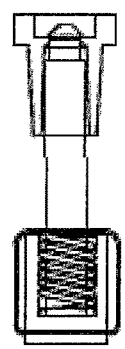
FIG. 30 is the plunger pin arrangement of FIG. 29, but is shown with the plunger pin in the extended position.
Figure 29:
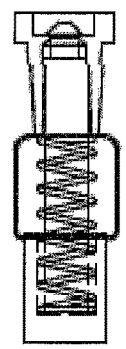
FIG. 29 shows the component parts of FIG. 25 assembled to form the plunger pin arrangement, being shown with the plunger pin in the extended position.

FIG. 22 illustrates the alternate embodiment of the leaf spring/plunger pin combination 470/460, and handle member 440 of FIG. 21, after being assembled with respect to the frame 410 of a reduced visibility screen formed in accordance with the present invention, and with the handle positioned for the leaf spring to be in an undeformed position;

FIG. 23 illustrates the side view of FIG. 22, but is shown with the handle member 440 moved to deform the leaf spring to be substantially straightened; and FIG. 24 illustrates the side view of FIG. 22, but is shown with mesh 480 material applied onto the frame 410.

Figure 36:
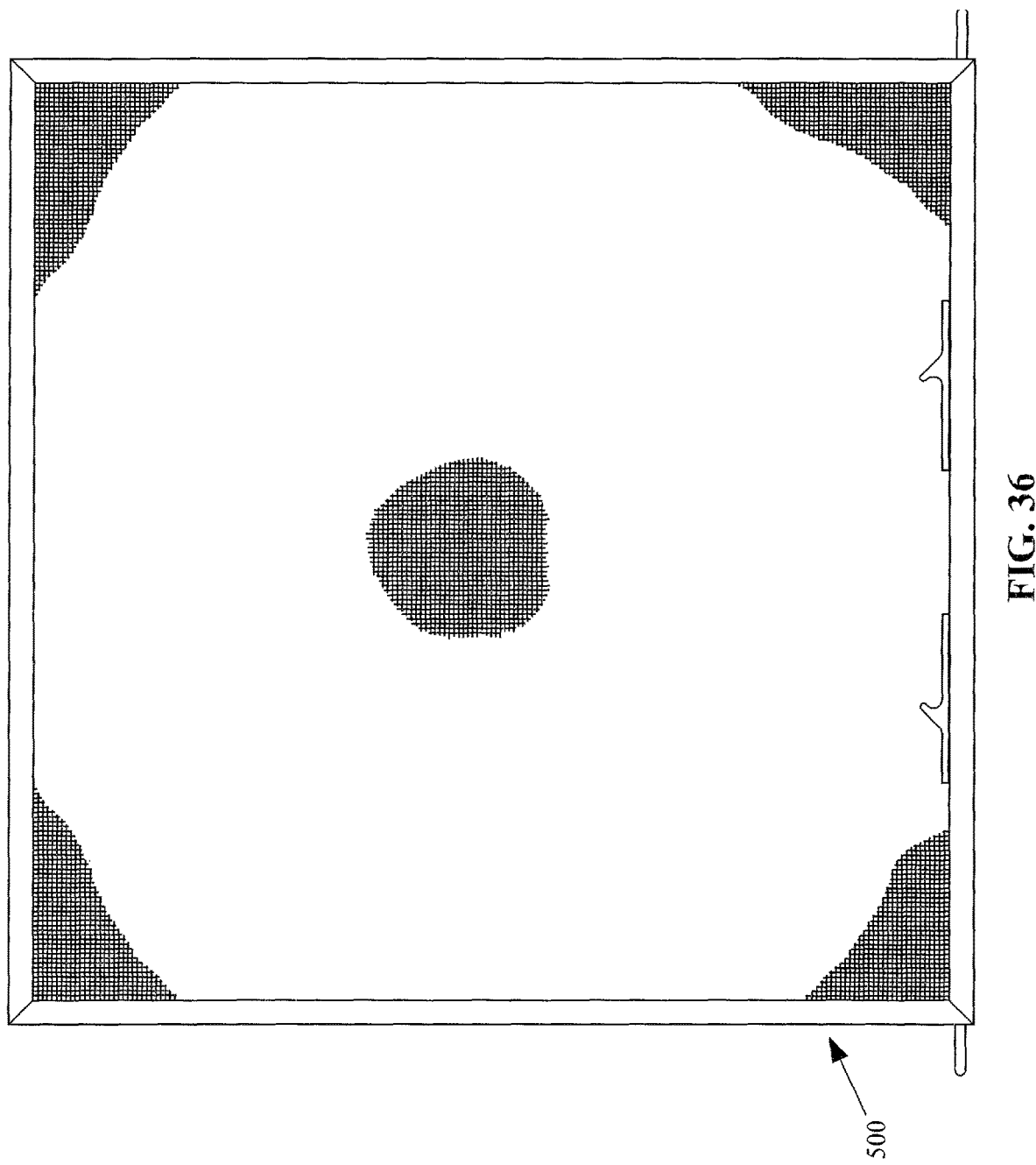
FIG. 36 is side view of a another embodiment of a reduced visibility screen and associated hardware.
Figure 37:
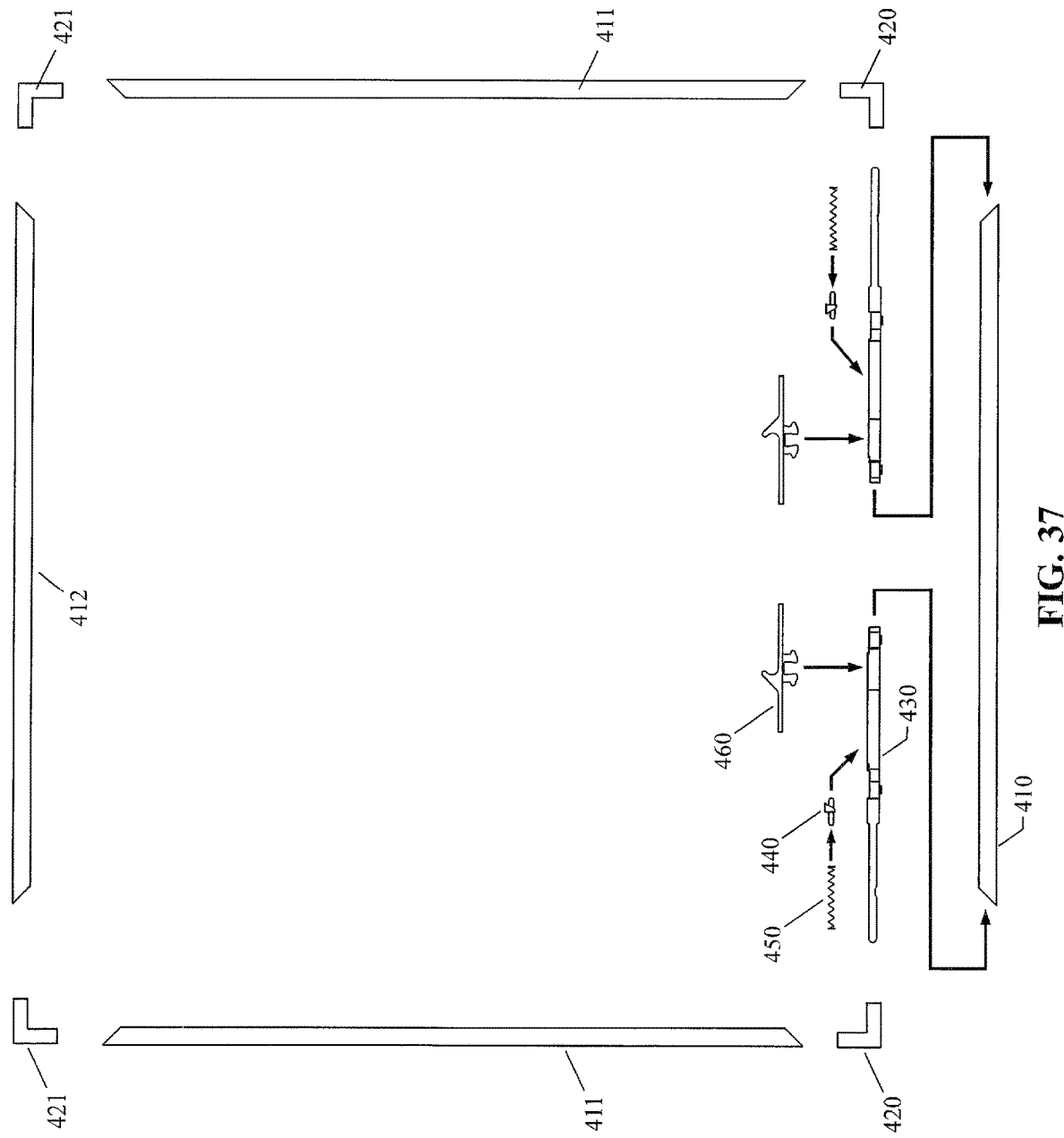
FIG. 37 is an exploded side view of the component parts used to make the reduced visibility screen of FIG. 37.

In yet another embodiment, a reduced sightline screen 500 as seen in FIG. 36 may be formed using the parts shown in the exploded view of FIG. 37. The frame of the screen 500 may be formed using a bottom frame portion 410, two side frame portions 411, and a top frame portion 412, which may be joined together using two corner connectors 420, and two corner connectors 421.

The bottom frame portion 410 is shown in detail in FIGS. 50A-50D. As seen in FIG. 50B, the bottom frame portion 410, as well as the side frame portions 411 and top frame portion 412 may each be formed to have a trapezoidal shaped profile, where the ends of each may be formed at an angle to join to the adjacent frame section, and each end may preferably be formed at a 45 degree angle. Each of the frame portions 410, 411, and 412 may be formed to include an opening at each end oriented in the axial direction 410X, to receive the leg of corner connector therein, and for ease of manufacturing, each of the frame portions may preferably be formed to have an axial through opening 410P that extends between its first end 410A and second end 410B (see FIG. 50D), making the frame portions hollow. As seen in FIG. 50A, the bottom frame portion 410 may be formed to also include a first opening 410Q on a first side 410Si of the bottom frame portion, which first opening may be interconnected with the axial through opening 410P. In one embodiment, as seen in FIG. 50A, the first opening 410Q may be formed as a cylindrical hole. The bottom frame portion 410 may be formed to also include a second opening 410R on the first side 410Si, which second opening may also be interconnected with the axial through opening 410P. The second opening 410R may be formed as an elongated rectangular opening, or in another embodiment, as seen in FIG. 50A, the second opening may be formed as a slotted hole.

FIGS. 51A-51D are a top view, a front view, a bottom view, and an end view of the side frame portion 411, which may be formed the same as the bottom frame portion 410, but without the first opening 410Q and second opening 410R, and may instead be formed to include a hole 411H proximate to one of its ends, and being through a second side 411Sii (see FIG. 51D). FIGS. 51E-51H are a top view, a front view, a bottom view, and an end view of the top frame portion 412, which may be formed the same as the side frame portion 411, but without the hole 411H. It is noted that to reduce the total number of different parts, the side frame portion 411 may be used in place of the top frame portion 412, as the hole would just not be utilized, and it may not even be visible if the color of the corner connector(s) match the color of the side frame portion 411.

One embodiment of the corner connector 420 is shown in detail in FIGS. 54A-54E. As seen therein, the corner connector 420 may be formed with a first leg 420A, and a second leg 420B, which legs may be at a ninety degree angle to each other. Each of the first leg 420 and second leg 420B may be formed to have a generally rectangular cross-sectional shape. The first leg 420 may be formed with a through hole 420H that may be oriented along an axial direction 420Ax of the first leg. The ends of each of the legs 420A/420B may be tapered to facilitate initial installation in the frame portion. Also, each of the legs 420A/420B may have pockets to reduce the material used and reduce the overall weight of the frame.

Figure 38:
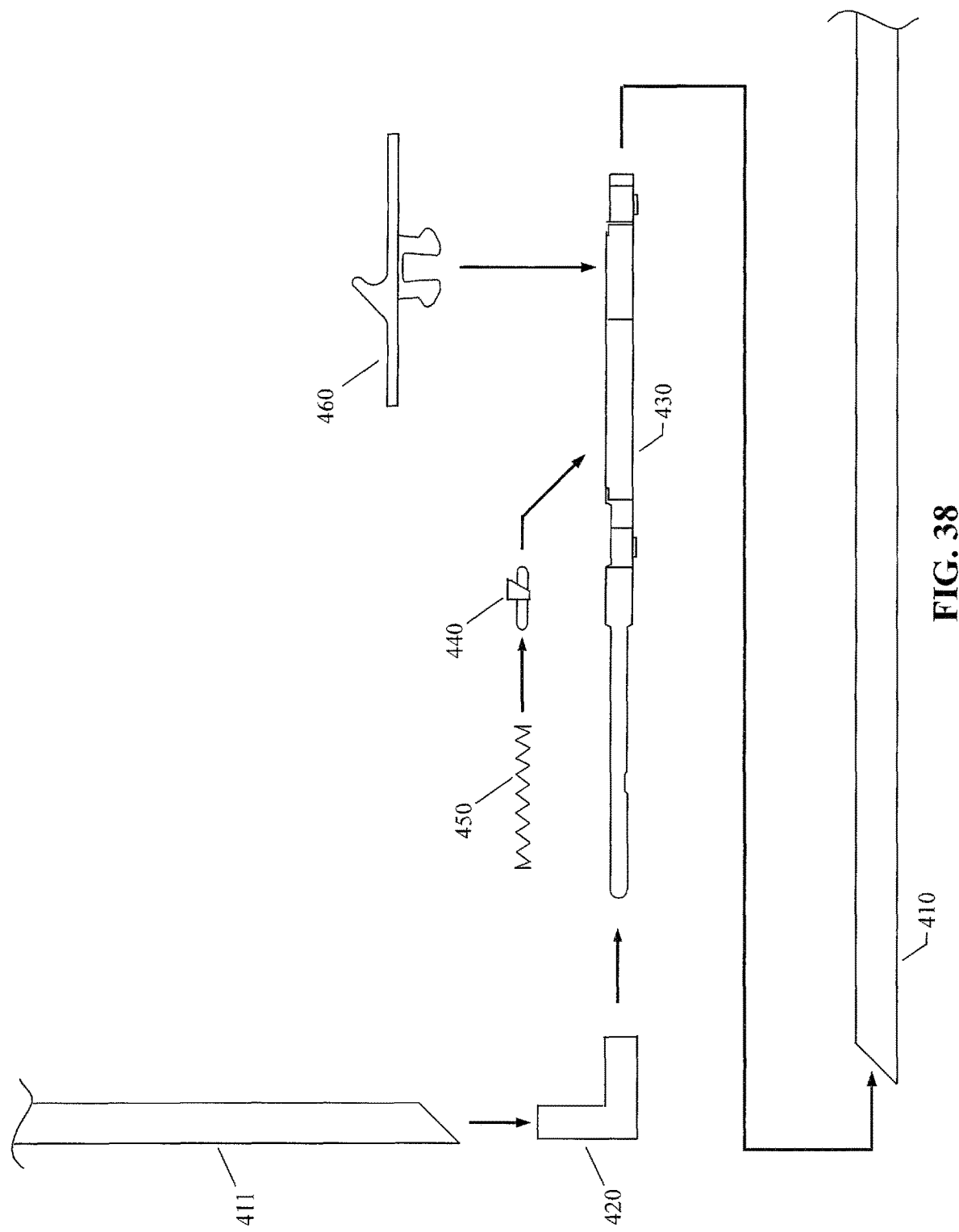
FIG. 38 is a view of a portion of the component parts shown in the exploded side view of FIG. 37 that are usable for the plunger assembly on the left side of the screen.
Figure 43:
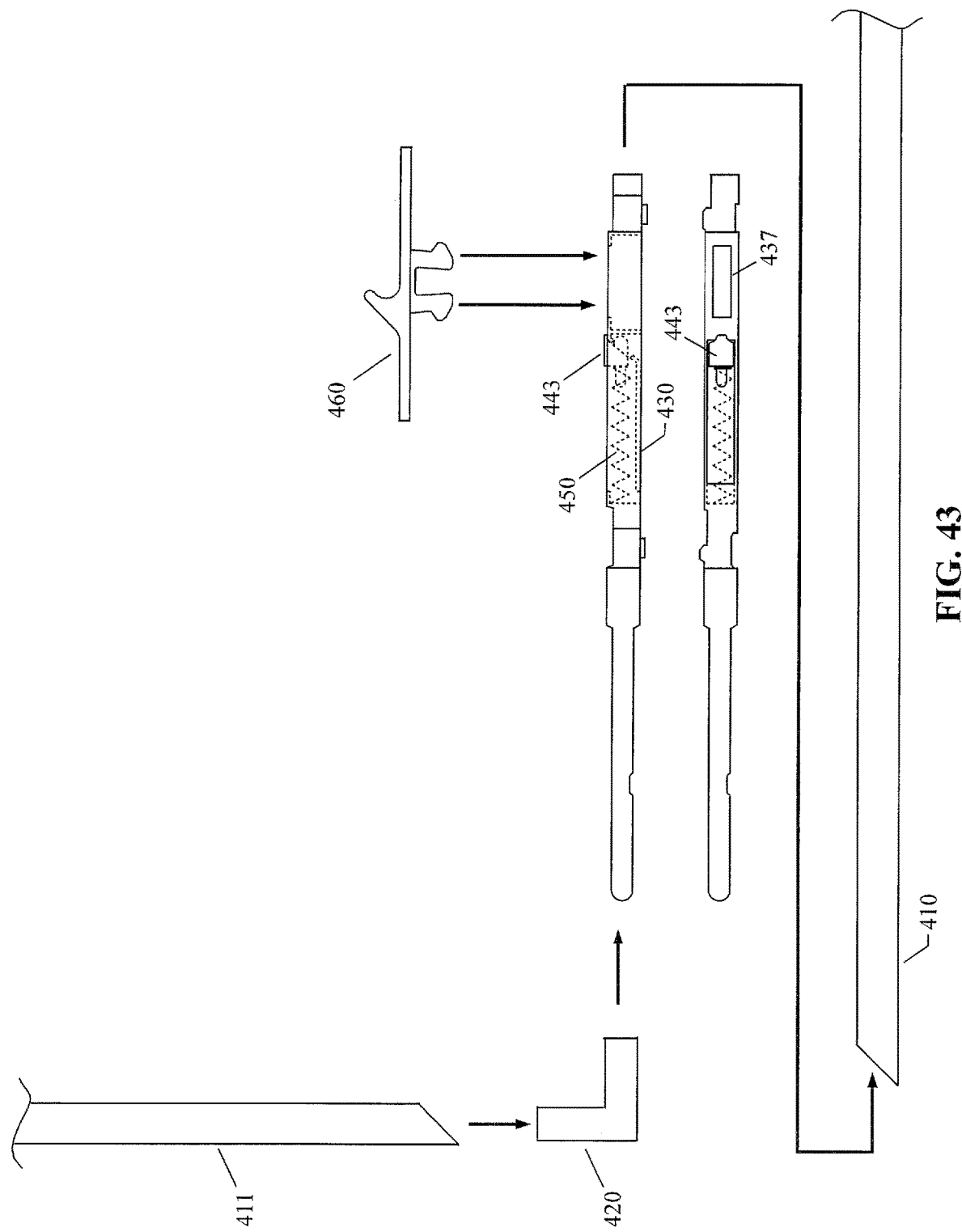
FIG. 43 is the view of FIG. 38, but is shown after the joined helical compression spring and holder member are inserted within the plunger housing.

As seen in FIG. 38, prior to assembling of the frame, which may be in a particular sequence shown in FIGS. 39-49A, the parts of the plunger assembly may be assembled, and which may include a plunger housing 430, a holder member 440, and a compression spring 450.

Figure 52E:
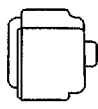
FIGS. 52A-52E are a top view, a front view, a bottom view, a rear view, and an end view of the plunger housing shown in FIGS. 36-37.
Figure 52D:
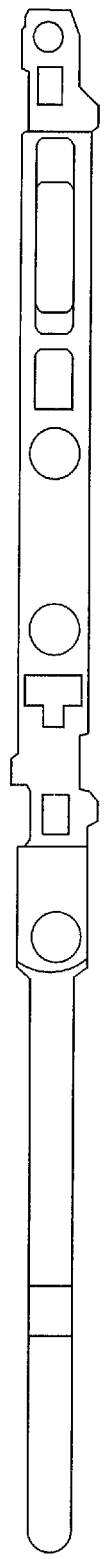
Figure 52C:
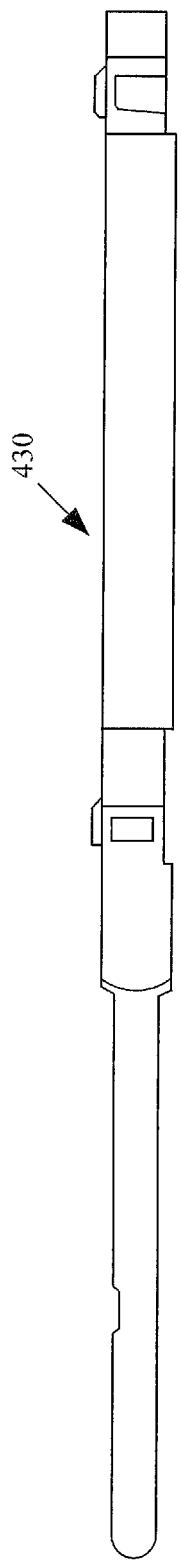
Figure 52A:
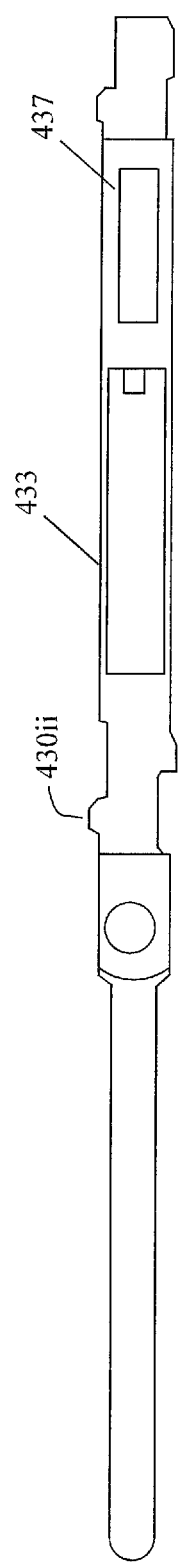
Figure 52B:
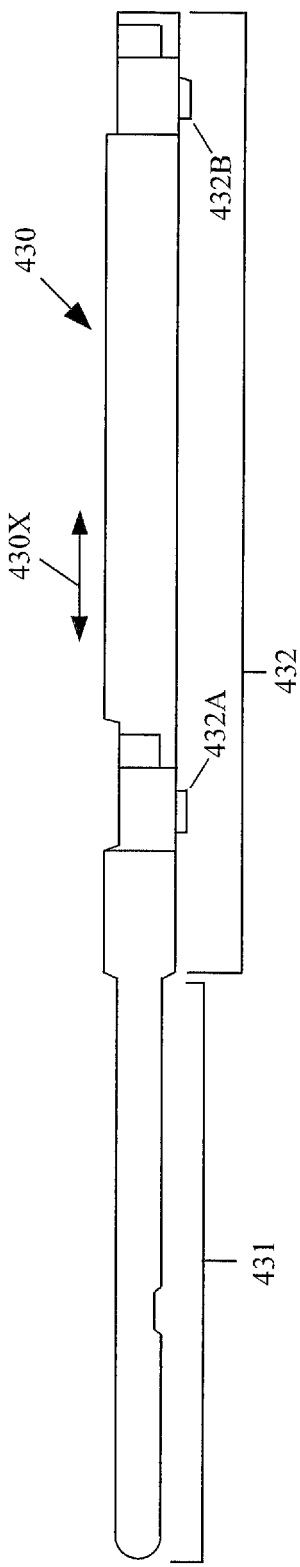
Figure 52F:
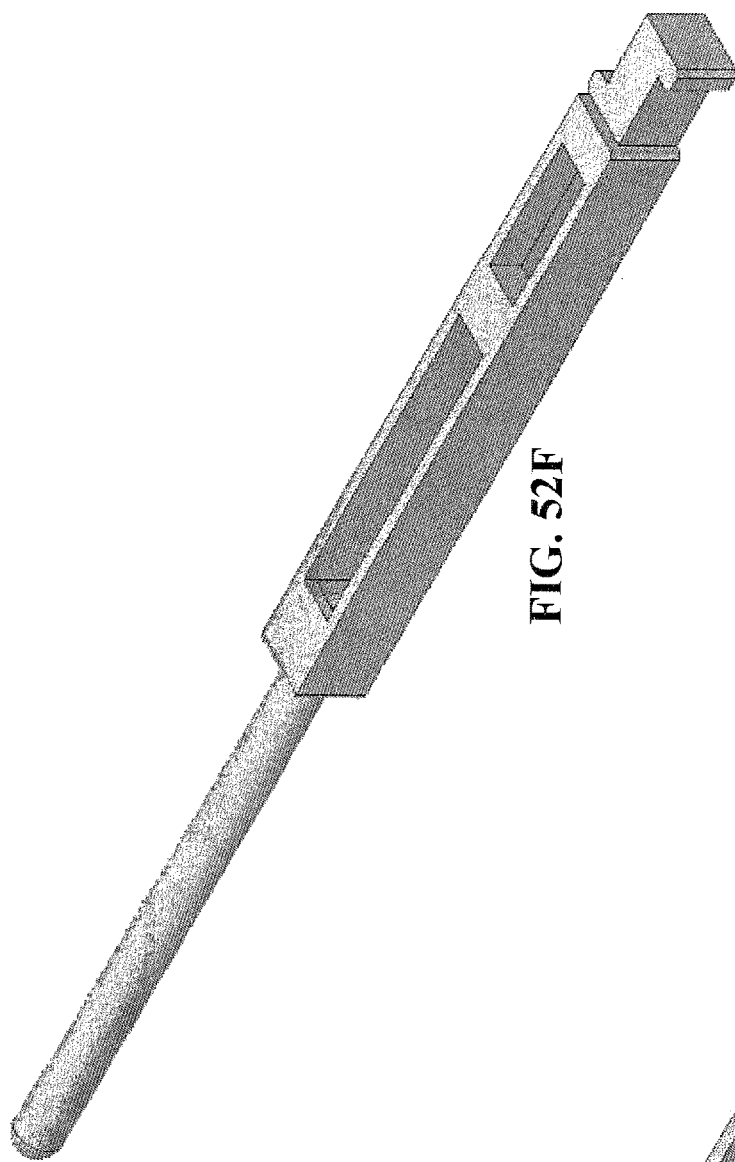
FIG. 52F is an alternate embodiment of the plunger housing.
Figure 52G:
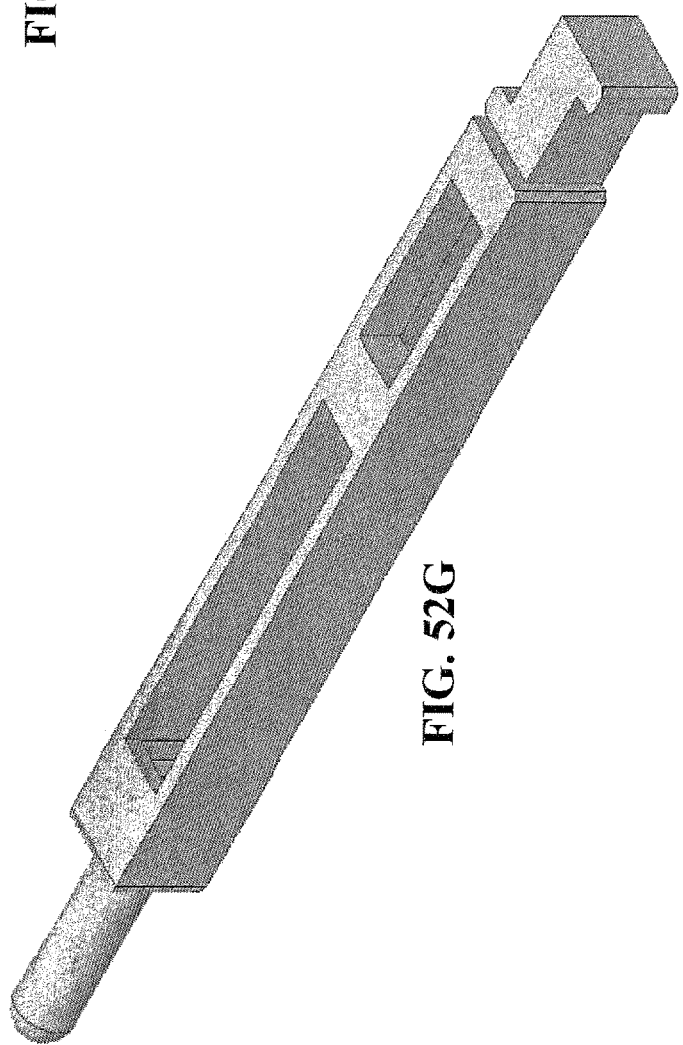
FIG. 52G is another alternate embodiment of the plunger housing.
Figure 53:
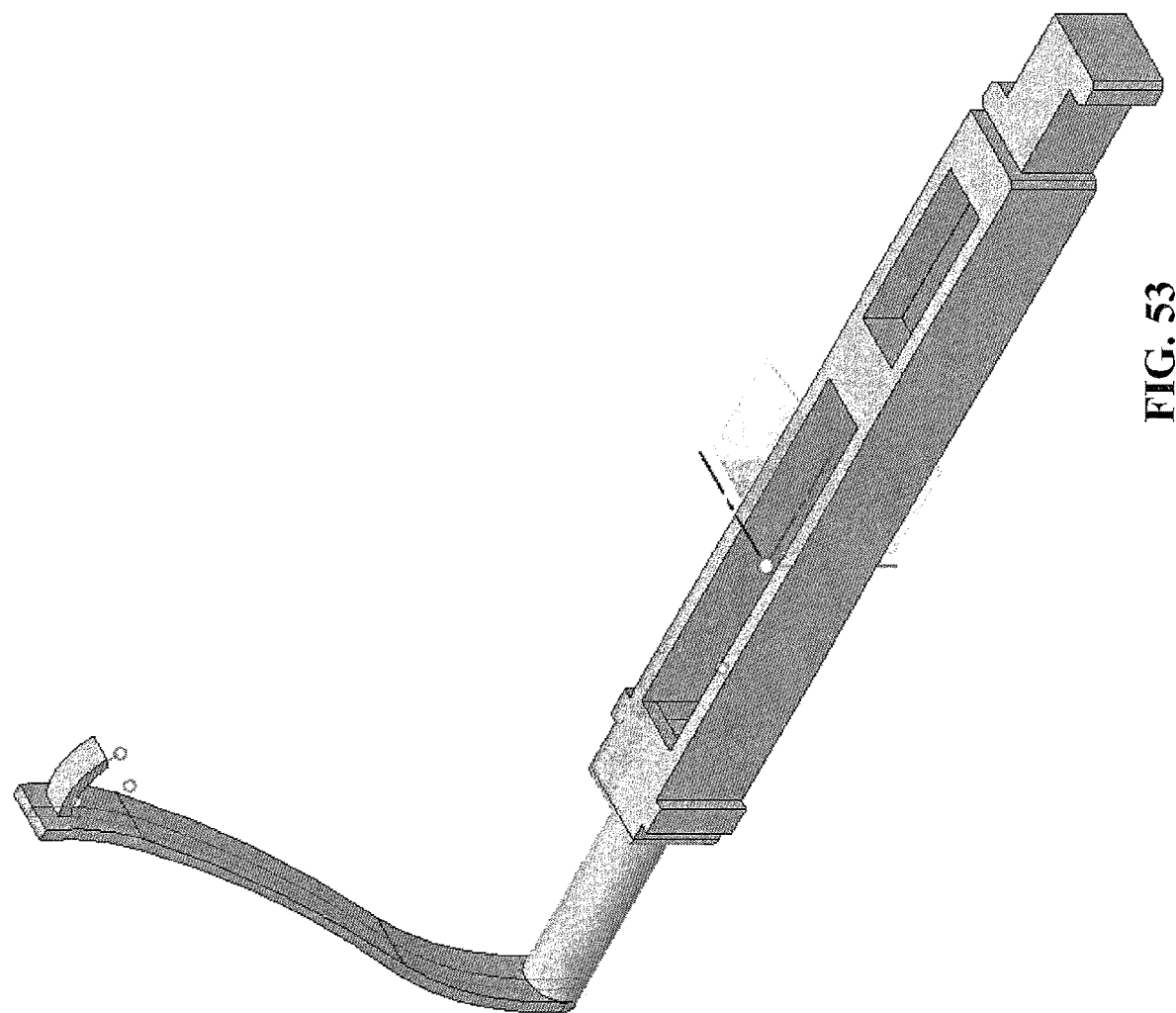
FIG. 53 is yet another embodiment of the plunger housing.
Figure 54A:
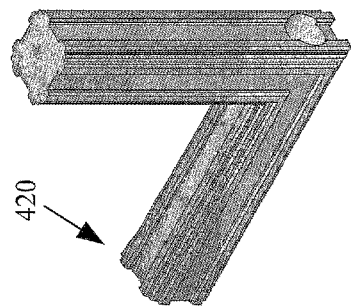
FIGS. 54A-54E are a perspective view, a front view, a top view, a left side view, and a right side view of the corner key that may be used to join at least the bottom frame portion with the side frame portions to make the screen assembly of FIG. 49A.
Figure 54D:
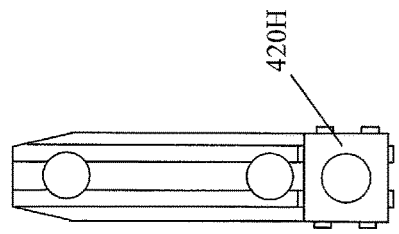
Figure 54E:
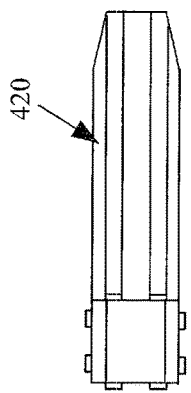
Figure 54B:
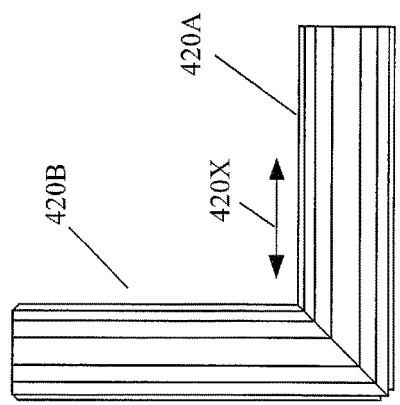
Figure 54F:
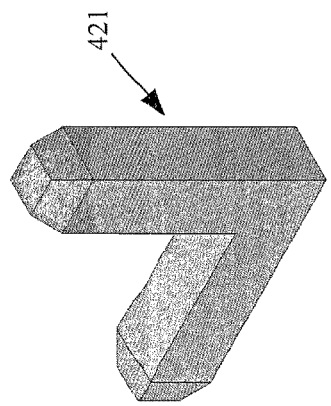
FIG. 54F is a perspective view of an alternate embodiment of a corner key that may be used for joining of the side frame portions to the upper frame portion.
Figure 54C:
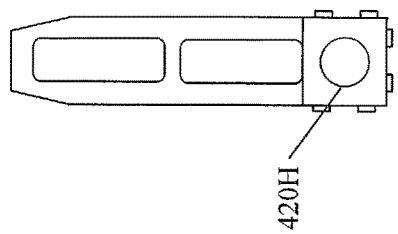

The plunger housing 430 is shown in detail within the top, front, bottom, rear, and end views of FIGS. 52A-52E. The plunger housing 430 may be formed to include a pin 431 that may extend away from a shaft 432 in the axial direction 430X. The cross-sectional shape of the shaft 432 may be formed to correspond to (i.e., be keyed to match) the cross-sectional shape of the hollow interior of the bottom frame portion 410 (see e.g., FIG. 50D). The shaft 432 may therefore be generally formed with any suitable corresponding cross-sectional shape, including, but not limited to a circular cross-sectional shape, a rectangular cross-sectional shape, etc. In one embodiment, the main body of the shaft 432 may be made to be smaller than the hollow interior of the frame portions, and may have a series of protrusions (e.g., protrusions 430*i* and 430*ii* seen in FIG. 52A) that may protrude from opposite sides of the shaft a particular distance so as to be configured to contact the sides of the hollow interior of the frame portion in a slight interference fit, or may instead be received therein in a slight clearance fit. As seen in FIG. 52B, the main body of the shaft 432 may also include protrusions 430A and 430B, which may be spaced apart roughly equally from on end of the opening 433. This arrangement for the plunger housing 430 may serve to reduce the amount of material used and reduce the weight of the plunger housing, and may also serve to provide for better engagement within the hollow interior of the frame portion.

The plunger housing 430 may also be formed to include a first opening 433 that is configured to receive therein the holder member 440 and compression spring 450. The protrusions 430A and 430B may be spaced apart roughly equally from one end of the opening 430, the significance of which is discussed hereinafter. As seen in FIG. 40, the first opening 433 may define a cavity that may extend from a first surface 430A to a second surface 430B. The cavity formed by the first opening 433 may be interrupted by a wall 430C that may be slanted with respect to the axial direction 430X of the shaft, as seen in FIG. 40, and which slanted wall may have a centrally positioned slotted opening 430Cs.

Figure 58:
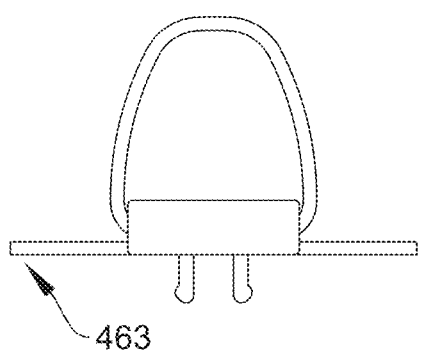
FIG. 58 is a side view of a fourth embodiment of a pull tab that provides for greater area that may be grasped by a user.
Figure 57:
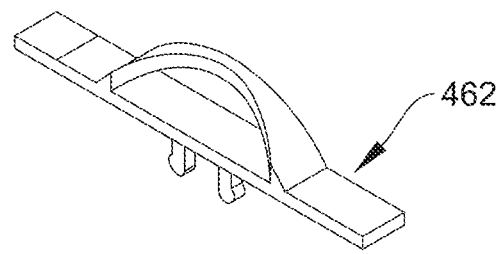
FIGS. 57-57A are a perspective view and a side view of a third embodiment of a pull tab usable for the reduced visibility window screen disclosed herein.
Figure 57A:
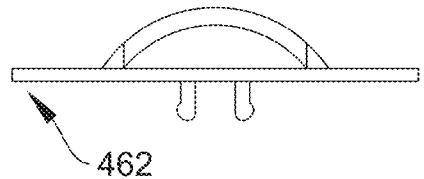
Figure 56:
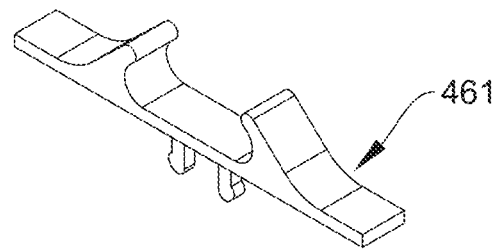
FIGS. 56-56A are a perspective view and a side view of a second embodiment of a pull tab usable for the reduced visibility window screen disclosed herein.
Figure 56A:
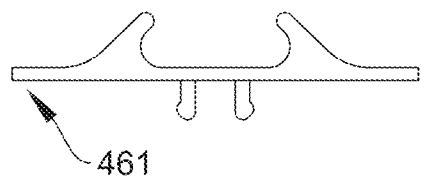
Figure 55:
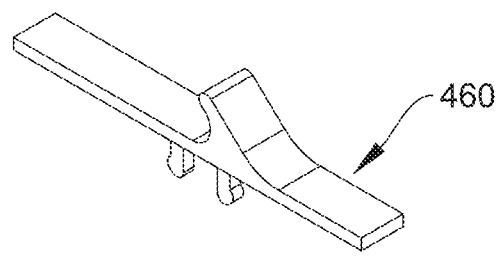
FIGS. 55-55A are a perspective view and a side view of a first embodiment of a pull tab usable for the reduced visibility window screen as disclosed herein.
Figure 55A:
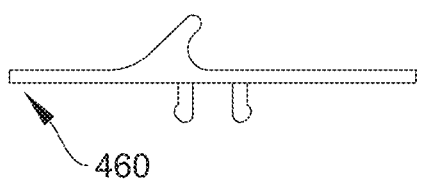

The plunger housing 430 may also be formed to include a second opening 437 that is configured for coupling of a pull tab thereto (e.g., pull tab 460). The second opening 437 may create a cavity that may form a first lip 437A and a second lip 437B, which lips may be engaged by a pair of protrusions 460A and 460B of the pull tab 460 (see FIGS. 40, 48, and 49A). A very low profile is exhibited by pull tab 460. Pull tabs 461 and 462 shown in FIGS. 56-56A and FIGS. 57-57A also are formed to exhibit a very low profile. Pull tab 463 shown in FIGS. 58-58A, and pull tab 464 shown in FIGS. 59A-59D each offer a larger member for grasping by the user's fingers to actuate the plunger, but exhibit a larger and more visible profile than pull tabs 460, 461, and 462.

The compression spring 450 and the holder member 440 are shown in FIG. 39 prior to being joined together, and are shown joined together in FIG. 40. The holder member 440 may be formed to have a body portion 440B, with a first protrusion 441 protruding in a first direction from a front wall, which first protrusion may be cylindrical, and a second protrusion 442 protruding in the opposite direction from a rear wall 440R, which second protrusion may also be cylindrical and may be coaxial with the first protrusion. The rear wall 440R may be slanted with respect to the axial direction of the first and second protrusions. The top 443 of the body portion 440B may be formed with a periphery and thickness that is configured to be received in the first opening 410Q on a first side 410Si of the bottom frame portion 410, as discussed hereinafter. The top 443 of the body portion 440B may be formed to be substantially parallel to the axial direction of the first and second protrusions.

As seen in FIG. 40, a first end of the helical compression spring 450 may be received upon, and engaged by, the first protrusion 441 of the holder member 440, which assembly may then be inserted through the opening 433 of the shaft 432 of the plunger 430. As seen in FIG. 42, the second end of the compression spring 450 may contact the first surface 430A within the cavity of the plunger housing, and the biasing force provided by the spring biases the second protrusion 442 through the slotted opening 430Cs in the slanted wall 430C of the plunger housing 430. Also, the compression spring 450 may bias the slanted rear wall 440R of the body 440B into contact with the slanted wall 430C of the plunger housing 430, and such biased slanted contact may cause the top 443 of the holder member 440 to move toward the first opening 433 of the shaft 432 of the plunger 430, as indicated by the arrows in FIG. 41. The biased movement of the holder member 440 along the slanted wall 430C of the plunger housing 430 may be limited by contact of the second protrusion 442 with the top of the slotted opening 430Cs (see FIG. 41), and may be particularly limited such that the top 443 of the body 440B of the holder member 440 may protrude out from the opening 433 of the shaft 432.

The plunger assembly shown in FIG. 41 may be aligned with the bottom frame portion 410, as shown in FIG. 44, and may be inserted through the axial through opening of the bottom frame portion. As the plunger assembly is inserted, contact of the top 443 of the body 440B of the holder member 440 may oppose the biasing provided by the compression spring 450, and may force the top of the holder member to be flush with the shaft of the plunger housing.

However, the top 443 of the body 440B of the holder member 440 may again be biased outwardly upon reaching the first opening 410Q on the side of the bottom frame portion, and the biased top may be received therein to secure the holder member to the bottom frame portion (see FIG. 45). In addition, as the plunger assembly is inserted into the bottom frame portion 410, the length of the housing 430 between the spaced apart protrusions 430A and 430B may also flex to permit the installation of the housing therein.

Figure 47:
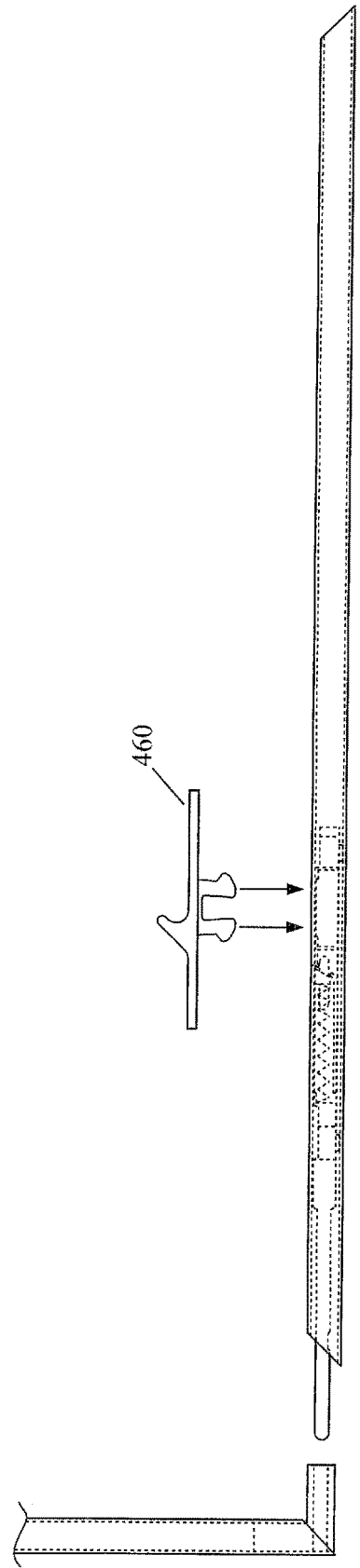
FIG. 47 is the side view of FIG. 47, but is shown after the left side frame portion has been coupled to the corner key.
Figure 48:
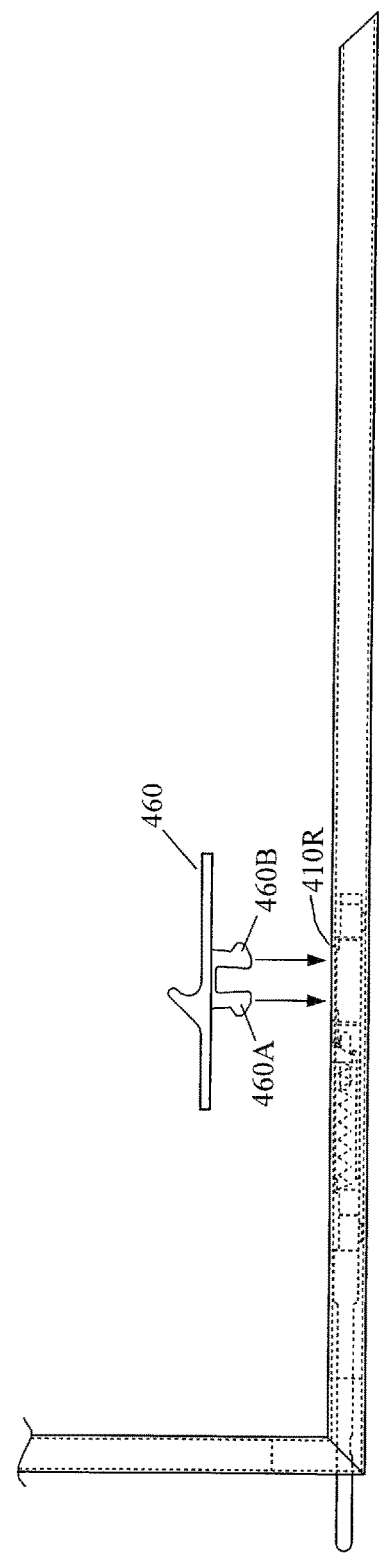
FIG. 48 is the side view of FIG. 47, but is shown after the coupled left side frame portion and corner key are joined with the bottom frame portion, with the pin portion of the plunger protruding laterally from the left side frame portion.

Next, as shown in FIG. 46, the side frame portion 411 may be aligned with and coupled to the second leg 420B of the corner connector 420, with the hole 411H of the side frame portion being aligned with the hole 420H of the corner connector (see FIG. 47). The first leg 420A of the corner connector 420 may then be received through the axial through opening at the first end of the bottom frame portion 410, with the pin 431 of the plunger housing 430 being received through the hole 420H in the first leg 420A of the corner connector (see FIG. 48). The protrusions 460A and 460B of the low profile pull tab 460 may then be inserted through the opening 410R of the bottom housing portion 410, and be received through the second opening 437 of the plunger housing 430 and into engagement with the first lip 437A and second lip 437B, as seen in FIG. 49A.

Figure 49B:
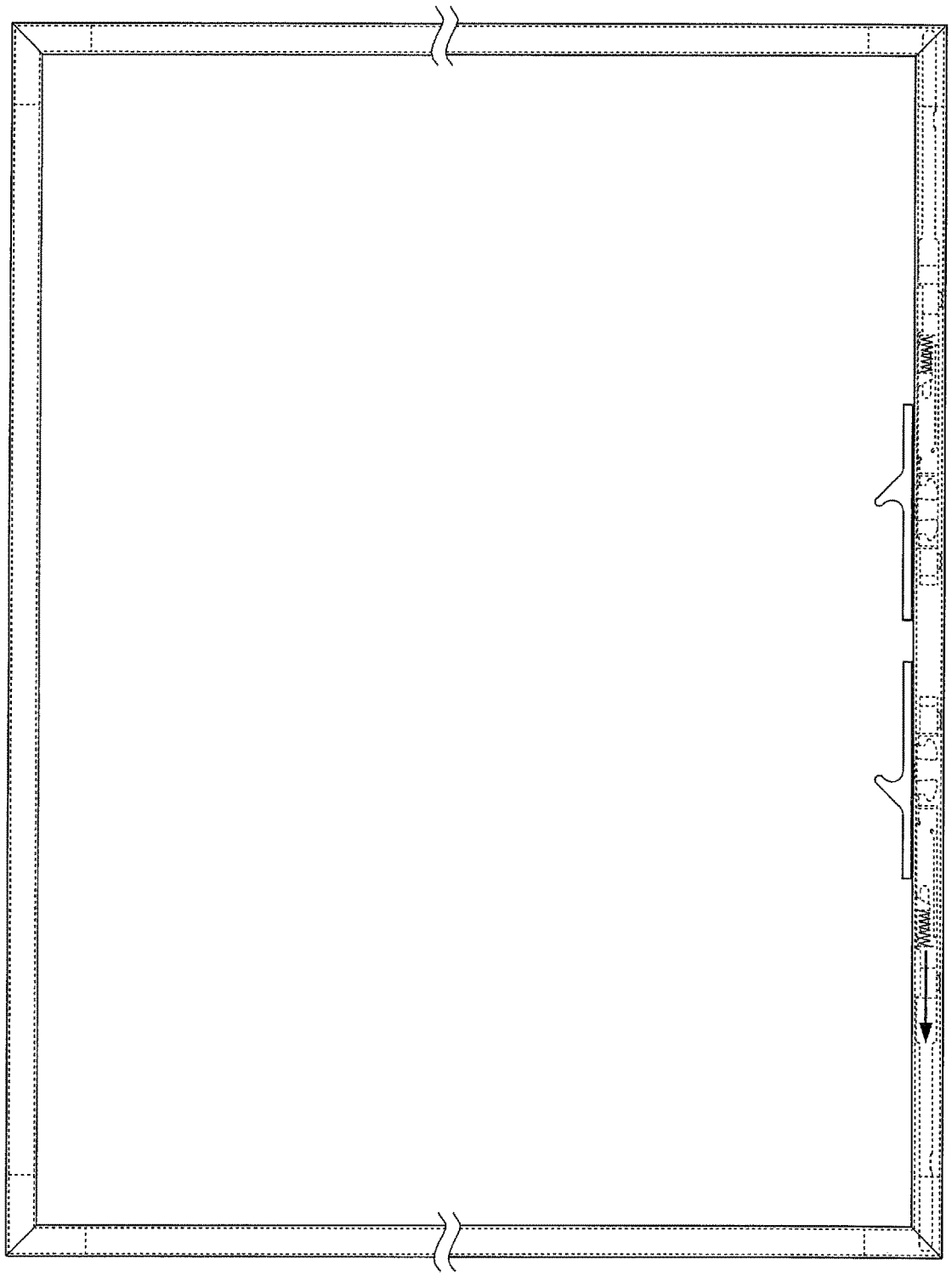
FIG. 49B is the side view of FIG. 49A, but is shown after a force indicated by the arrows in FIG. 49A has been applied to each of the pull tabs to retract the respective plunger pin portions of the left and right plunger assemblies to facilitate installation or removal of the window screen within the corresponding window or door.
Figure 49C:
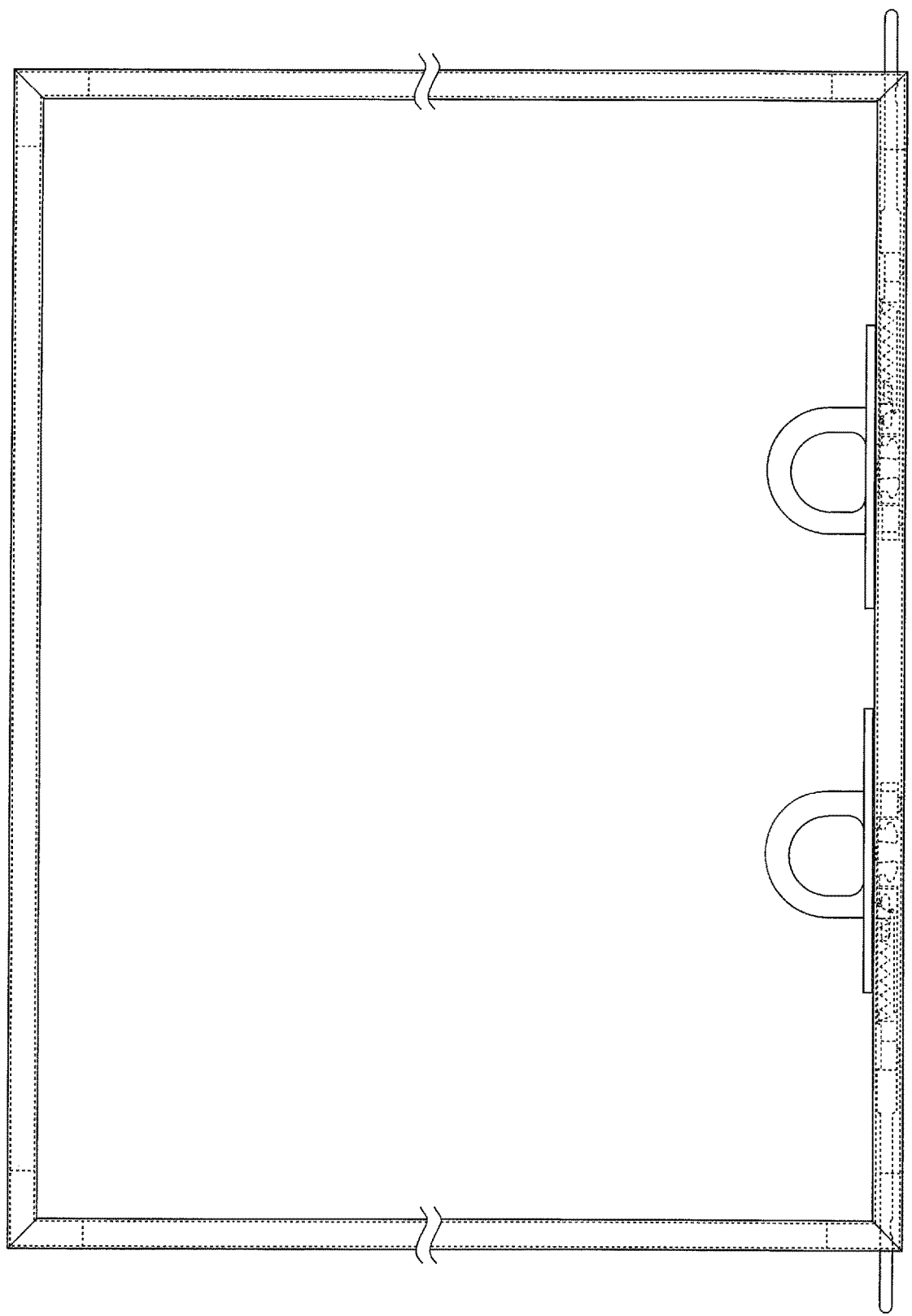
FIG. 49C is the side view of FIG. 49A, but is shown with a different pull tab having been inserted into each of the left and right plunger assemblies.

FIG. 49A shows the screen frame fully assembled, with pull tabs and plunger assemblies installed on both sides of the frame. With this arrangement the compression spring 450 performs dual biasing, as it biases the holder member 440 with respect to the plunger housing 430, and once the plunger assembly is seated within the bottom frame portion the compression spring 450 also biases the plunger housing 430 with respect to the bottom frame portion. When a force is applied to the pull tab, as shown by the arrows in FIG. 49A, it may cause the pin 431 of the plunger housing 430 to retract within the bottom frame portion 410, as seen in FIG. 49B; however, once the force is removed, the compression spring 450 biases the pin to its fully extended position.

Mesh material may be then be added to the screen frame with internal hardware that is shown in FIG. 49A. A machine 600 for accomplishing automated joining of mesh to a plurality of such frames in an assembly line process is shown in FIGS. 60-66.

Figure 60:
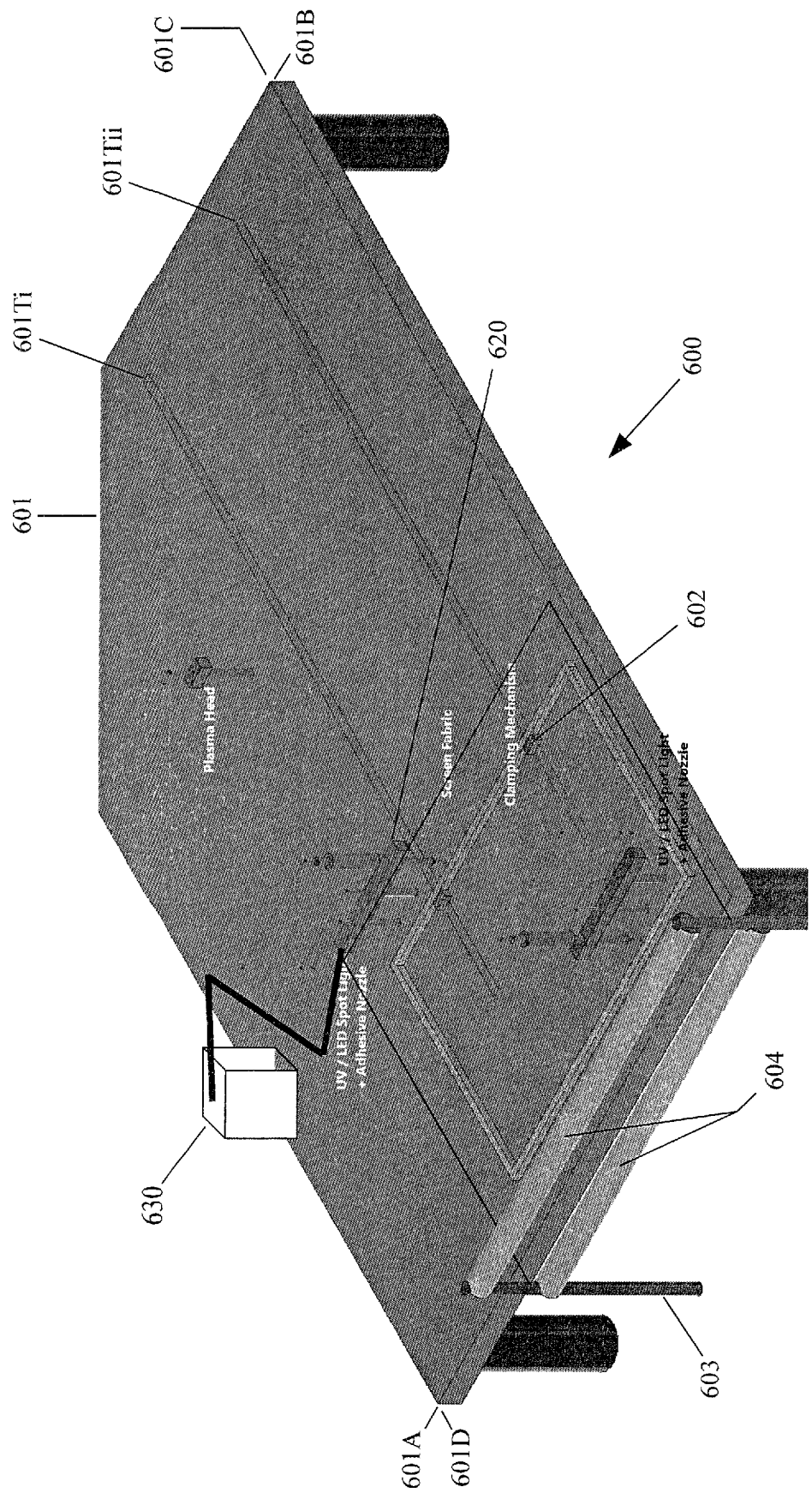
FIG. 60 is a perspective view of a machine configured to manufacture the first stage of a plurality of reduced visibility screen assemblies as disclosed herein.
Figure 66:
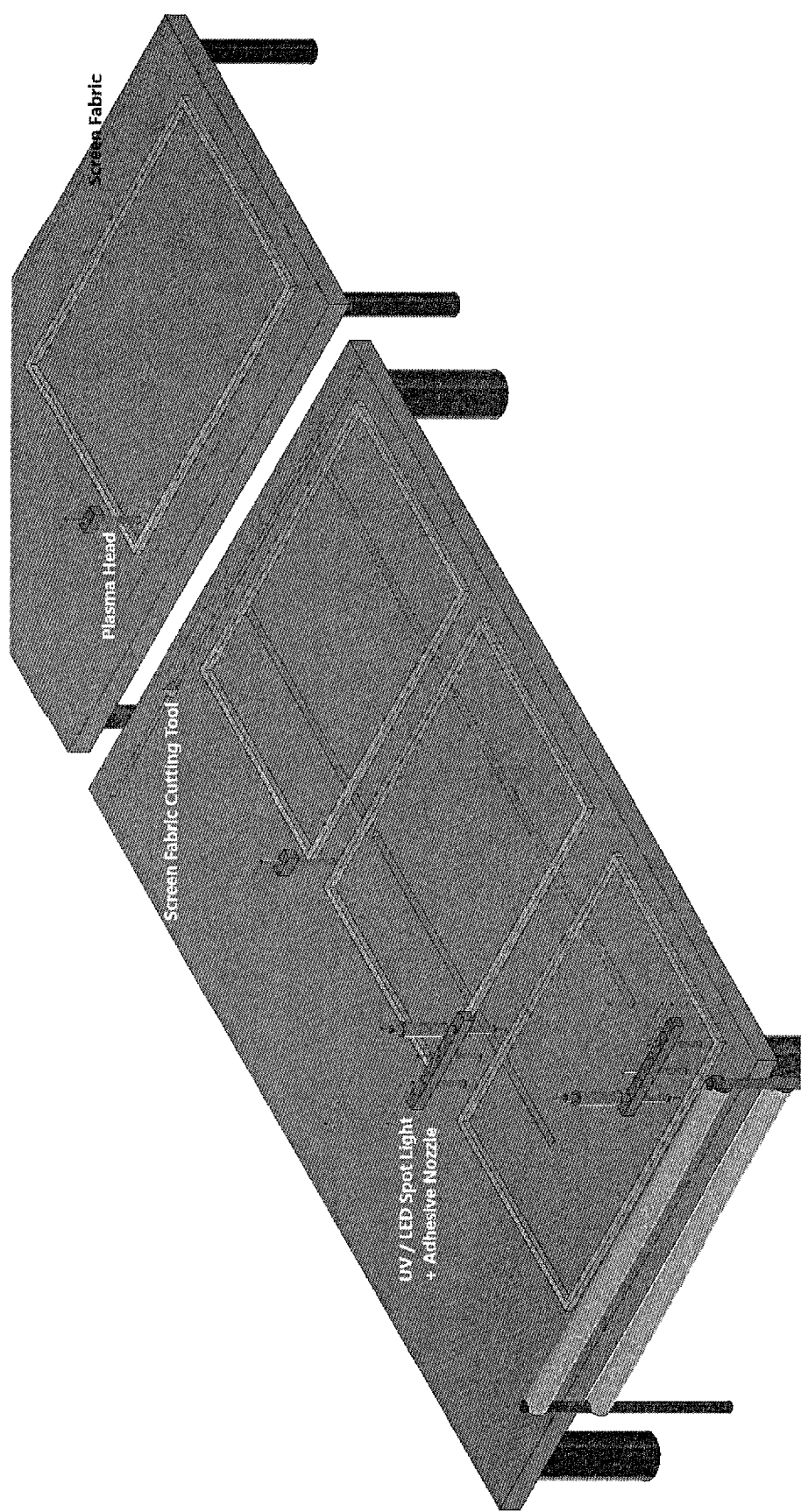
FIG. 66 is a perspective view of the machine of FIG. 60, being configured to manufacture at least a third stage of a plurality of reduced visibility screen assemblies as disclosed herein.

The screen assembly machine 600 shown in FIG. 60 may include a table 601 having a first end 601A, a second end 601B, a first side 601C, and a second side 601D. The table 601 may have at least one track formed in a top surface thereof, and in a one embodiment may have both a first track 601Ti and a second track 601Tii formed therein. A pair of clamping mechanisms 602 (see e.g., U.S. Pat. No. 4,968,239 to Inaba) may be configured to respectively slide within the tracks 601Ti and 601Tii. Each clamping mechanism may be configured to grasp a portion of one side of the frame shown in FIG. 49A, and may be driven to incrementally progress along the track using a linear actuator (see e.g., U.S. Pat. No. 4,697,164 to Eilertsen) between at least a first stage/process station (FIG. 60) and a second process station (FIG. 65), and also between the second process station and third and fourth process stations (FIG. 66).

The machine 600 may also include a support member 603 configured to releasably support one or more rolls of mesh material 604 proximate to the first process station of the table 601.

The machine 600 may also include an adhesive system 620 that may use a urethane based ultraviolet light (UV) curable adhesive or an acrylic based UV curable adhesive, which light may be emitted by LEDs. The adhesive system 620 may include an adhesive reservoir 621; an adhesive nozzle 622 in fluid communication with the adhesive reservoir; an adhesive pump 623 configured to pump adhesive from the adhesive reservoir through the adhesive nozzle; and at least one ultraviolet spotlight 624 (e.g., light emitting diodes, a mercury vapor lamp, etc.), which may have a shield to prevent an operator from looking directly upon harmful UV LED light, and to also prevent the LED light from curing adhesive on the adjacent nozzle. The machine 600 may also include an actuation system 630 with a manipulator arm 631 (3-axis or more degrees of freedom—see U.S. Pat. No. 4,348,142 to Figour) that is configured to move the adhesive system relative to the table 601 to sequentially track along each of four sides of a periphery of the frame. The adhesive pump 623, which may be a direct metering pump, may be configured to pump adhesive through the nozzle 622 for sequential application onto each of the four sides of the frame when in proximity thereto (which proximity may be determined using a proximity sensor—see e.g., U.S. Pat. No. 6,348,862 to McDonnell), while the at least one ultraviolet LED spotlight is configured to at least partially cure the applied adhesive to generally pin the mesh to the frame at the first processing station. In another embodiment, instead of, or in conjunction with, determining proximity of the nozzle 622 to the four sides of the frame, the manipulator arm 631 may be preprogrammed using a processor to follow a particular path for dispensing of adhesive, based upon the size of the screen frame, and its proper positioning when being held by the clamps at that station. The processor may signal the pump 623 to start the pumping of adhesive through the nozzle 622 until each of the sides of the frame of the screen have received an application of adhesive, and may then signal the pump to cease pumping adhesive (i.e., the processor may coordinate the pumping of adhesive by the pump 623 with movement of the manipulator arm). Note that rather than using the nozzle for application of adhesive, a felt/foam tip or brush may be used, and also a spray coat or roll coat mechanism may alternatively be used.

Figure 62:
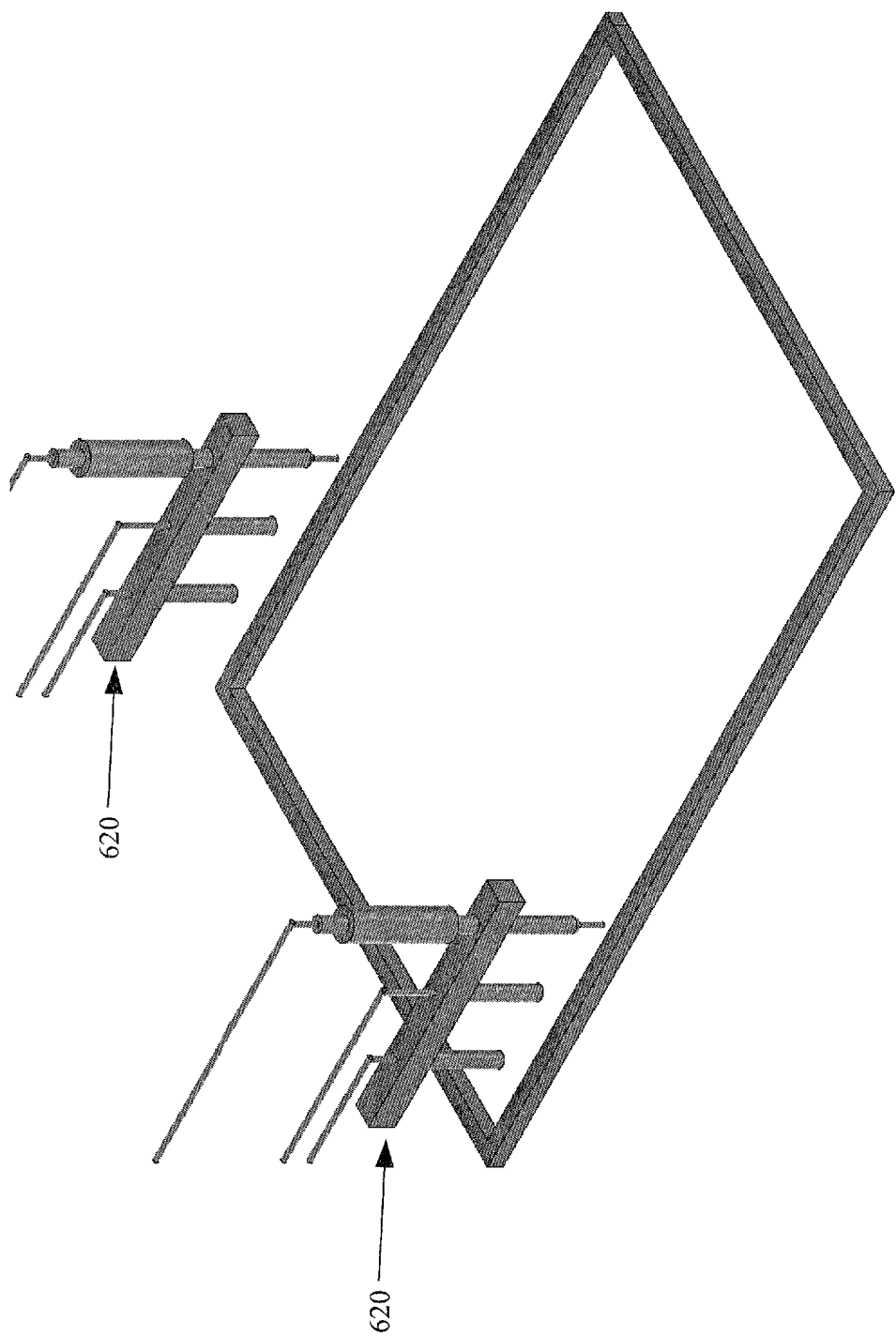
FIG. 62 is an enlarged perspective view of both of the fixtures shown in FIG. 60, as they move along the frame of the window screen assembly positioned on the manufacturing table.
Figure 63:
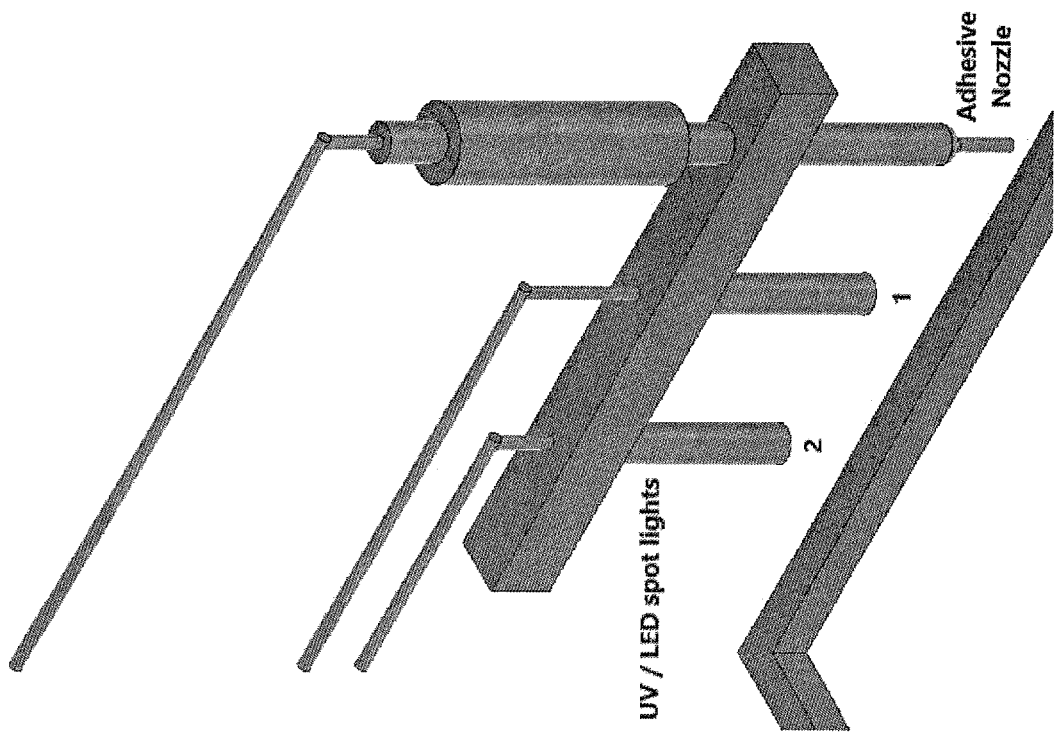
FIG. 63 is an enlarged perspective view of the adhesive nozzle and LED spot light fixture of FIG. 61.
Figure 64:
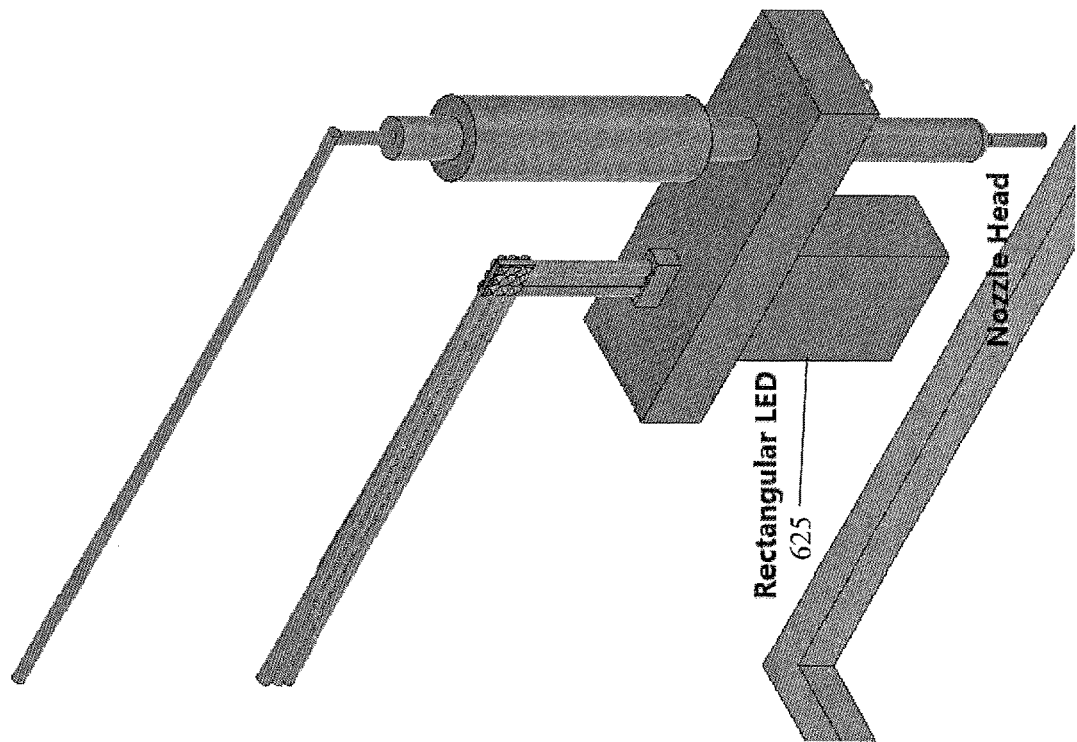
FIG. 64 is an enlarged perspective view of an alternate embodiment of an adhesive nozzle and LED spot light fixture usable for applying and curing of the glue that secures the screen mesh material to the screen frame.
Figure 65:
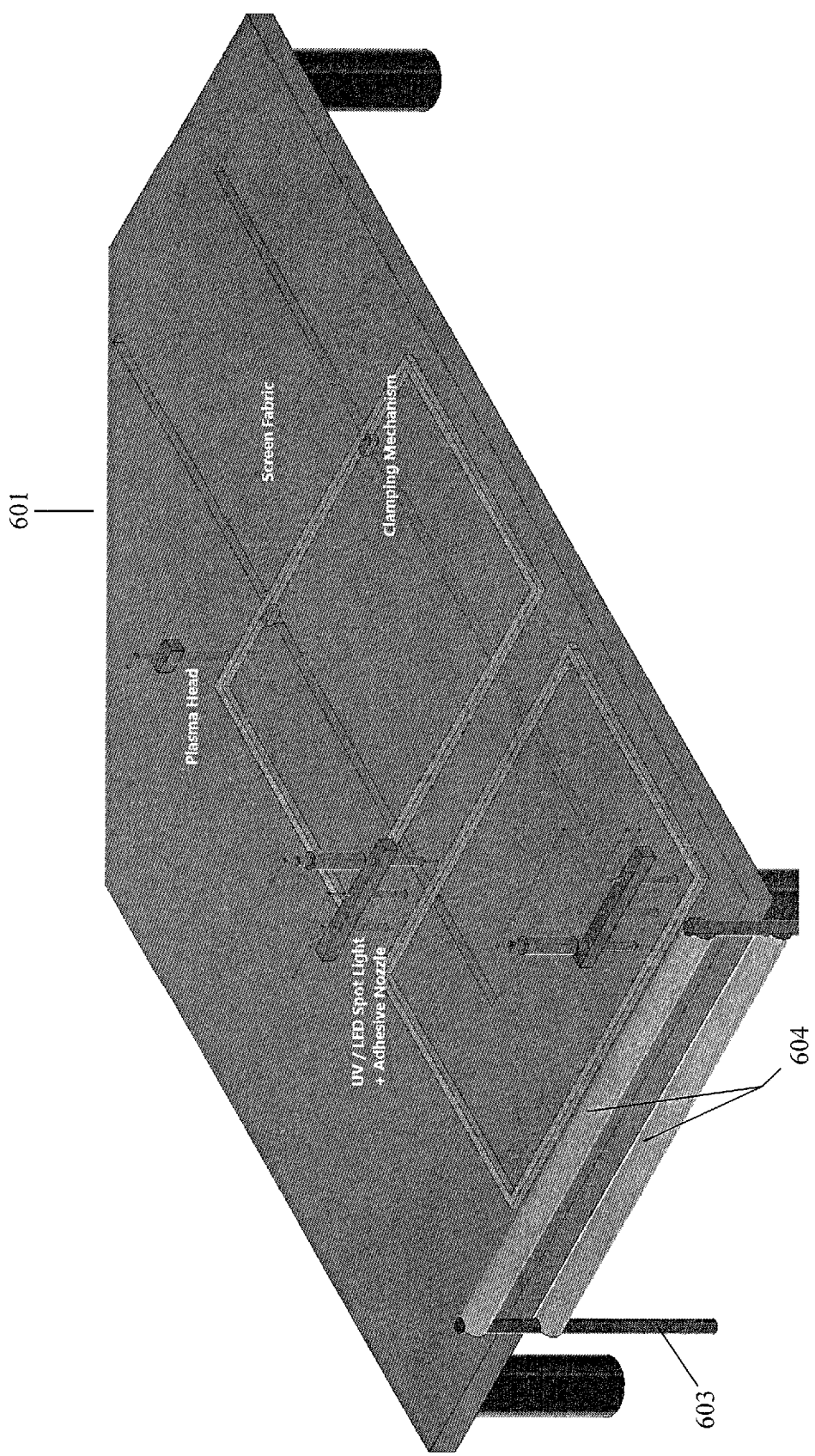
FIG. 65 is a perspective view of the machine of FIG. 60, being configured to manufacture the second stage of a plurality of reduced visibility screen assemblies as disclosed herein.

Only one such adhesive system 620 may be used, as shown in FIG. 61. Alternatively two adhesive systems 620 may be used, as shown in FIG. 62, or in other embodiments, three or four such adhesive systems may be utilized (i.e., one for each of the four sides of the frame). In one embodiment, the adhesive system 620 may include a powerful UV light 625 that may emit multiple wavelengths, which may be rectangular, to completely cure the adhesive and provide the required strength, which may occur as a secondary operation at the second processing station where adhesive is not being applied. Each of the adhesive systems utilized are particularly configured to optimally cure the applied adhesive according to certain factors, including but not limited to: a focal length of the LED light (i.e., the distance between adhesive and light source); the power/intensity of the UV LED Light; the wavelength of UV/LED light, which is based on the particular adhesive used; the run speed of the UV/LED light; and the curing speed of the particular adhesive.

The adhesive system disclosed herein may be configured to generally have adhesive application speeds in the (horizontal) X-Y direction of the table of between 1 inch to 3 inches per second in one embodiment, or between 3 inches to 12 inches per second in another embodiments, of between 12 inches to 24 inches per second in yet another embodiment, or a combination of such speed ranges (e.g., 3"-24"/sec), or other speed ranges may be used in other embodiments.

Although adhesives commonly have a viscosity of 200 cps to over 1,000,000 cps, to accommodate the above-described flow of the adhesive, particularly when accomplished by the herein described machine, a viscosity similar to that of water at room temperature is used, i.e., a viscosity of about 1 cps.

The adhesive application used may be approximately % gram to 3 grams of adhesive material per foot, based upon an approximate weight of 8 lbs. per gallon of adhesive, on a frame that is approximately 0.25" to 0.300" wide and where the height of the screen mesh/fabric is 0.0125" thick with approximately 80% to 90% adhesive and approximately 10% to 20% of area coverage combined per square inch or lineal measurement in area.

Figure 67:
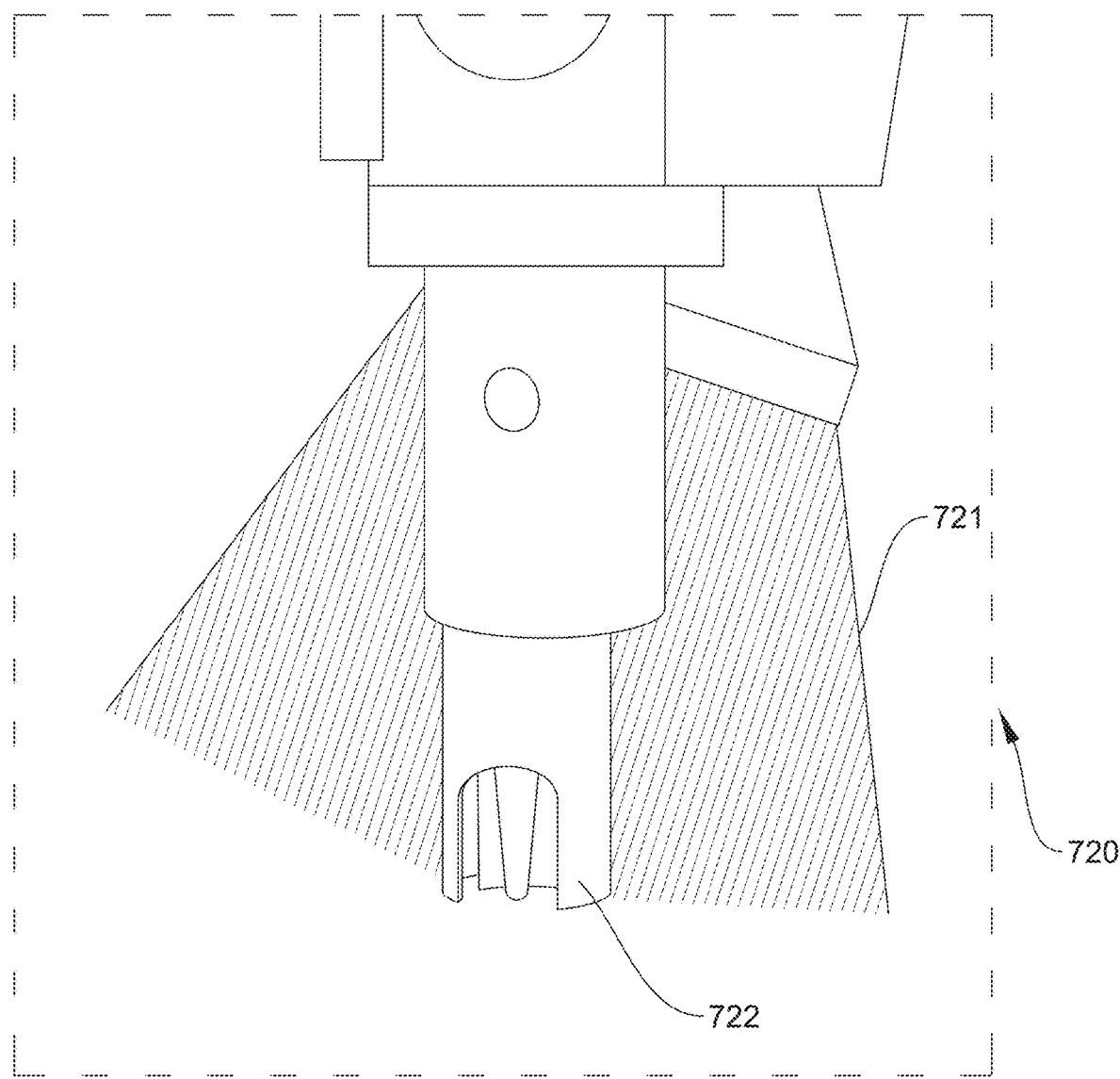
FIG. 67 is a perspective view illustrating another embodiment of an adhesive delivery system usable on the screen assembly machine of FIG. 60.

FIG. 67 is a perspective view illustrating a portion of another embodiment of an adhesive delivery system 720 that is usable on the screen assembly machine of FIG. 60.

To accommodate the adhesive applications described herein, the adhesive system 720 may utilize a specialized dispensing nozzle assembly 722. This nozzle assembly 722 serves to apply adhesive in such a fashion where it is "swept" or "wet out" by the new tip design so as to spread out the adhesive and aid in fabric-to-frame structural integrity, assisting adhesive flow into and onto all surfaces while minimizing adhesive build up above the finished fabric/mesh surface. The resulting application of adhesive may be as shown in FIG. 4C (e.g., when using a less viscous adhesive) and FIG. 4D (e.g., when using a more viscous adhesive).

Figure 68:
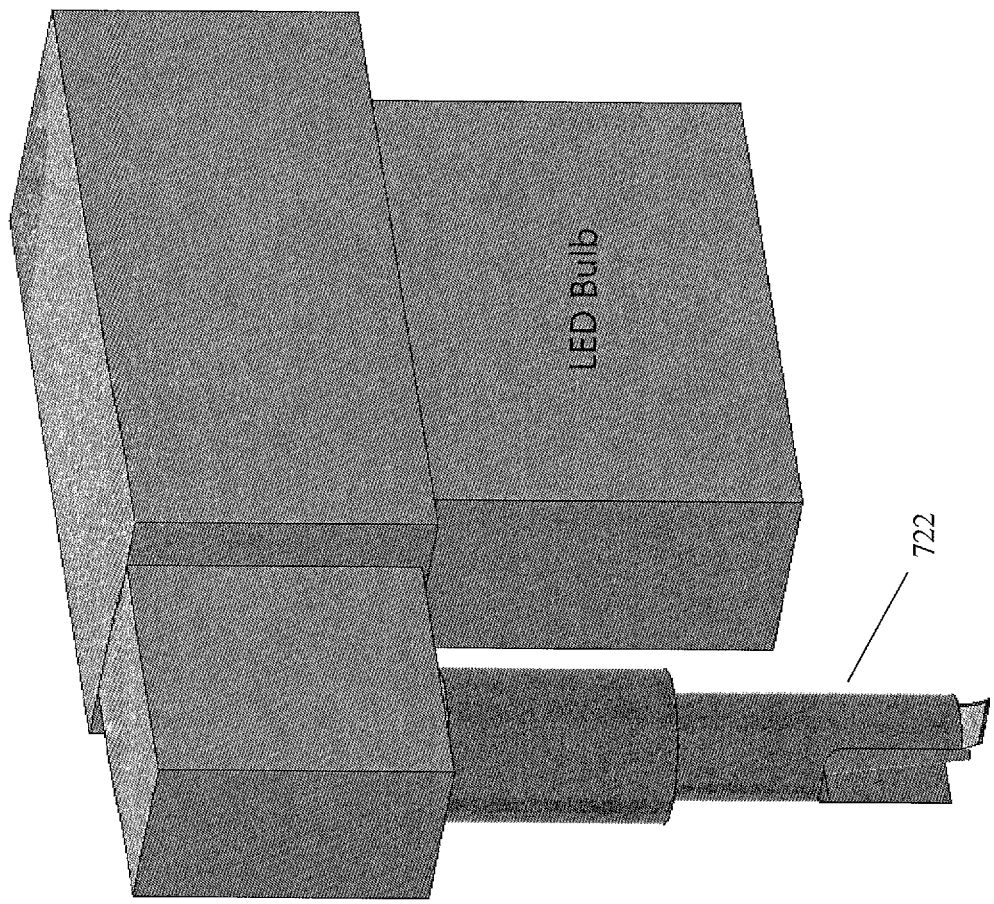
FIG. 68 is the adhesive delivery system of FIG. 67, shown by itself, and without the bristles seen in FIG. 67.
Figure 71A:
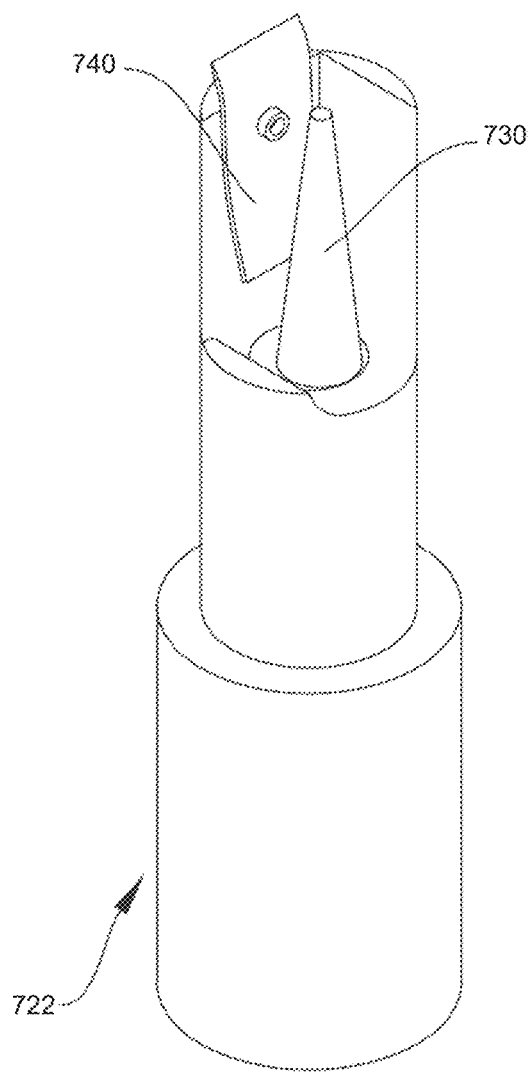
FIG. 71A is yet another bottom perspective view of the nozzle assembly of FIG. 67, but is shown with a portion of the side wall cut away to expose the sweep member mounted therein.
Figure 71B:
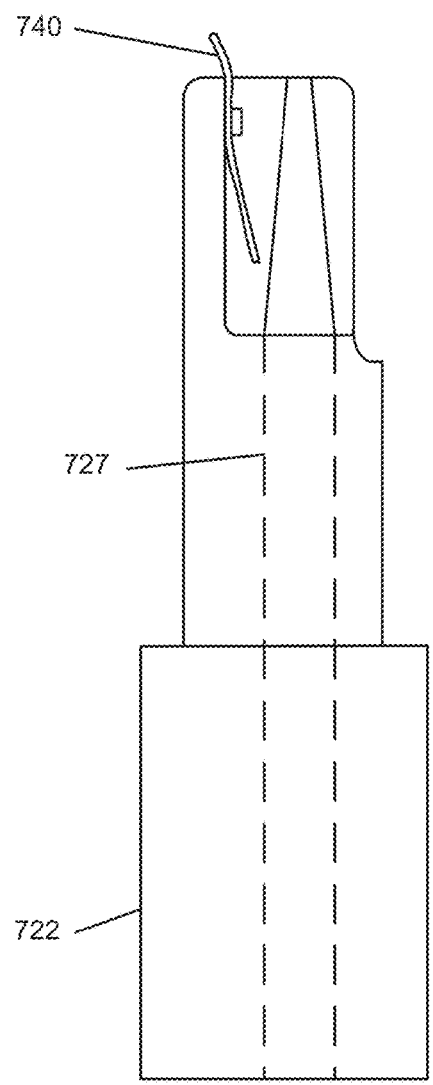
FIG. 71B is a side view nozzle assembly shown in FIG. 71A.
Figure 72:
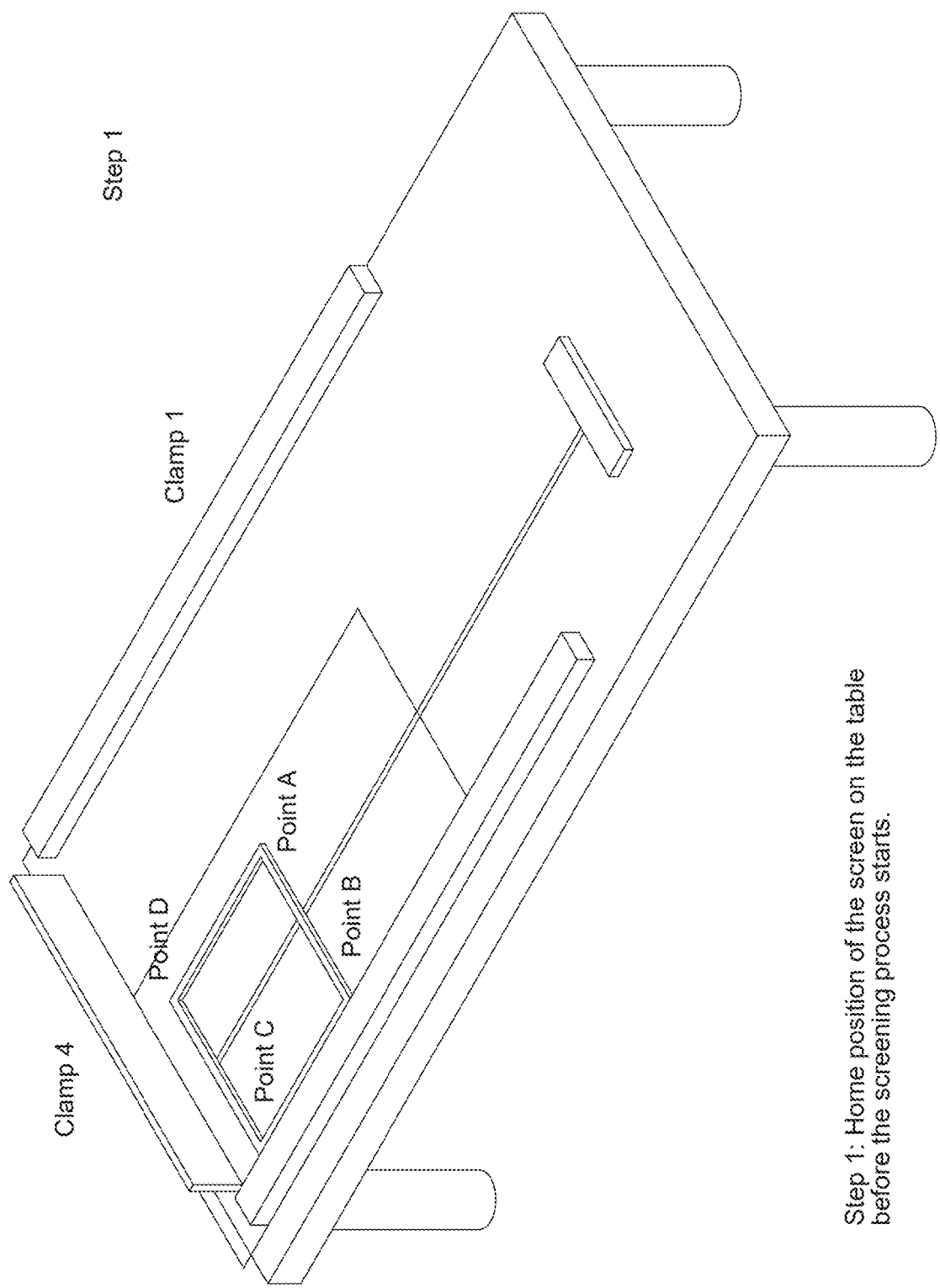
FIG. 72-79 show a sequence of steps using a screen assembly machine as disclosed herein.
Figure 73:
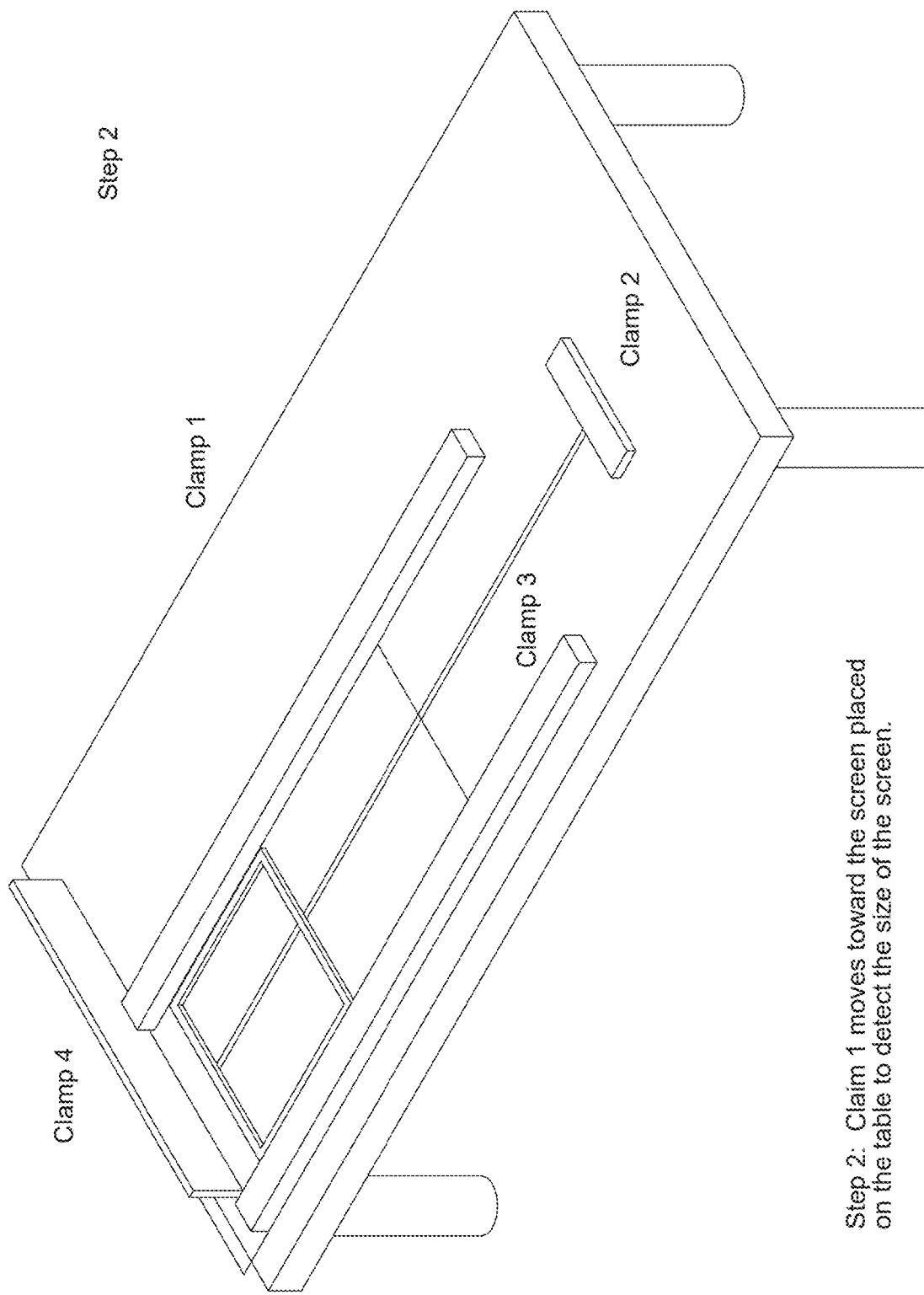
Figure 74:
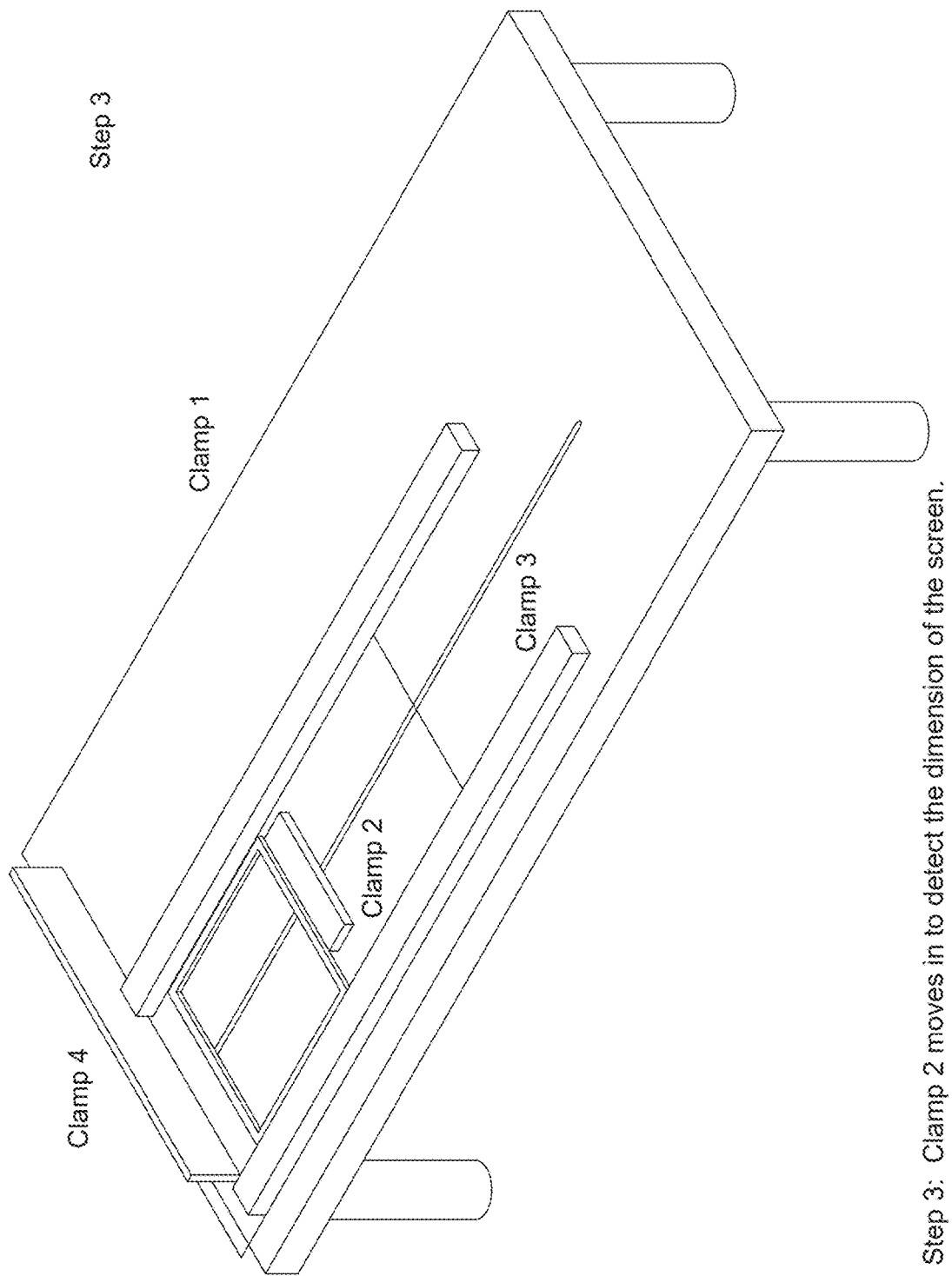

To accomplish this functionality, the nozzle assembly 722, which is shown in FIG. 68 without the light shield 721, and in detail in FIGS. 69A-71, may be constructed to include a housing 723. The housing 723 may be formed with a first cylindrical portion 724 having a first diameter, which may be used to mount the nozzle assembly 722 of the adhesive system 720 to the machine of FIG. 60. The first cylindrical portion 724 of housing 723 may neck down to a second cylindrical portion 725 having a second diameter. The second cylindrical portion 725 may be have an opening 726 formed in its side and end, as seen in FIGS. 70 and 71, which may form a portion of a bathtub-shaped interior surface. The housing 723 may have an opening 727 formed in the axial direction, which may interconnect with the opening 726, as seen in FIG. 69B. The opening 727 may be sized to accommodate a nozzle 730, which may be conical at least at its tip, a portion of which may be exposed, as shown in FIG. 70. The nozzle 730 may be formed to be integral with the housing 723 in one embodiment, and may be a separate part in another embodiment, which may be a replaceable nozzle. The tip of the nozzle 730 may be proximate to the distal end of the second cylindrical portion 725. The second cylindrical portion 725 may also have a groove and/or other surface features formed therein to accommodate receiving and fixedly supporting a sweep member 740 therein. The sweep member 740 may be formed of any suitable material, and is preferably flexible. In one embodiment, the sweep member 740 is made of Teflon, which may serve to smoothly glide along the top of the mesh material without great resistance, due to a low coefficient of friction, and without causing damage to (i.e., scraping of) the mesh material. The sweep member 740 may protrude a distance beyond the end of the second cylindrical portion 725, as seen in FIG. 71B. For many screen configurations, it may be suitable if the sweep member protrudes about 0.06 inches beyond the end of the second cylindrical portion 725; however, in other embodiments it may protrude a different amount as required. In one embodiment, the sweep member 740 may be formed to have a width 740W that may be as wide as the width of the screen frame, to ensure that the adhesive is directed (e.g., squeegeed) across the entire width of the frame of the screen that contacts the mesh, In another embodiment, the width may be slightly larger than the width of the screen frame to accommodate a small amount of mismatch, particularly with respect to the path of travel created by actuation of the adhesive delivery system 720, and in yet another embodiment, the width may be slightly smaller than the width of the screen frame.

The nozzle assembly 722 may be positioned in the adhesive delivery system 720 such that movement of the delivery system proceeds with the nozzle 730 first traversing along the mesh as it lies atop the screen frame, with adhesive being dispensed out from the tip of the nozzle 730. As described hereinabove, the sweep member 740 serves to drive the line of adhesive delivered from the tip of the nozzle into and onto all surfaces of the mesh that lies above the screen frame, and onto the screen frame as well. The force of being swept, if sufficiently large, may cause a small thin layer of adhesive to also flow between the mesh and screen frame, as seen in FIG. 4A.

As seen in FIG. 67, the adhesive system 720 may also utilize a light shield 721 to prevent an operator from looking directly upon harmful UV LED light, and to also prevent the LED light from curing adhesive on the adjacent nozzle or of the adhesive immediately after it exits from the nozzle before it has been swept. The light shield 721 of the adhesive system 720 may be formed of a plurality of bristles. The bristles may be made of any suitable material, each of which is preferably flexible. In one embodiment, the bristles are made of nylon.

A cutter may be positioned at the second or third process stations to trim the excess mesh material applied onto the frame that may extend beyond the frame. The cutter may be a plasma head, or a laser cutter.

The machine 600 may include the following features and/or parameters:
Equipment Dimension Capacity:
  Maximum Unit Size: +−40"×80"
  Minimum Unit Size: +−8"×10"
Concept Modular Design with Focus on Adhesive Application Module
  (Auto in-feed module and exit convey/trimming module as integral and optional)
Target Cycle Time (2'×3' Unit @10 Tin. Perimeter Ft. Per Unit):
  Standard Sizes in "Batch-Run" Lots: 10 seconds per unit
  Custom Sizes in "One-Off" Order Sequence: 15 to 25 seconds per unit
Machine Functionality Design Guidelines:
  Ability to handle Shadow and traditional frame substrates (auto/operator select)
  Adjust adhesive bead per profile and screen fabric combinations
  User friendly data entry, retrieval, monitoring, and storage of multi set-ups
  Standard and custom size solutions
  Auto and operator intervention adjust of adhesive and light cure modules
  Multiple screen fabric rolls type/size staging and retrieval
  Compatible with RiteScreen order entry/sequencing/batching
  Multiple adhesive set-up capacity and data storage
Adhesive Properties:
  Satisfy or exceed screen fabric destructive peel test or peel equivalency Outdoor/sunlight UV stable, no yellowing or physical degradation No delimitation from substrate Viscosity target: =20 RPM: 200-400 mPa·s Wavelength: 365 to +400 (current optimum 395)

Cure time established by cycle time requirements+Light intensity+Focal Point

FIG. 72-79 show a sequence of steps for manufacturing a screen assembly using a screen making machine that may utilize a different clamping arrangement. The steps of the process may include the following:

Step 1 (FIG. 72): Establish the home position of the screen frame on the table.

Step 2 (FIG. 73): Clamp 1 moves toward the screen frame positioned on the table and detects the size of the screen.

Step 3 (FIG. 74): Clamp 2 moves in to detect the dimension of the screen.

Step 4 (FIG. 75): Clamps 1, 2, 3 & 4 move down to hold the screen mesh against the screening table.

Step 5 (FIG. 76): Adhesive Nozzle and LED head moves from point A to point B applying adhesive on the screen and the LED light cures the adhesive.

Step 6 (FIG. 77): Clamps 1, 3 & 4 move up to release the screen mesh and come back down on top of the screen mesh and pulls it apart to provide a sufficient amount of tension to prevent sagging of the mesh.

Step 7 (FIG. 77): Adhesive nozzle+LED light moves from Point B to Point C applying and curing the adhesive on the screen.

Step 8 (FIG. 78): Adhesive nozzle+LED light moves from Point C to Point D.

Step 9: Adhesive Nozzle+LED light moves from Point D to Point A.

Step 10: A cutting wheel cuts the screen mesh, and clamps 1, 2, 3 & 4 release the pressure on the screen.

In yet another embodiment, a machine 800 may be particularly configured to construct a screen assembly, as generally discussed hereinabove with respect to machine 600, except that it may do so by eliminating the use of an adhesive during the process of securing the mesh to the screen frame.

The machine 800 may be configured similar to machine 600, but may secure the mesh to the screen frame to produce a screen assembly by direct melt fusing of the mesh with respect to the frame. Various different arrangements, methods, and materials may be utilized to accomplish such melt fusing.

In one embodiment, the material that may be utilized for the melt fusing may be polyvinyl chloride (PVC) or chlorinated polyvinyl chloride (CPVC), with the main difference being that PVC softens (i.e., heat distortion begins) at 60° C. (140° F.), while CPVC softens at 93° C. (200° F.). Note that the melting temperature of PVC ranges from 100° C. (212° F.) to 260° C. (500° F.), and depends upon the additives used to manufacture the PVC. A number of manufacturers produce mesh using PVC material, and which mesh is also suitable for screen making. In instances where the screen mesh may be made of another material, it may be coated with PVC. Similarly, the frame itself may be made of PVC, and in cases where it is manufactured of another material, e.g., a metallic material such as aluminum, it may be coated with PVC.

The machine 800 may be configured to hot melt fuse the mesh to the screen frame through the use of any one of several different embodiments of the machine.

In one embodiment, both the frame and the mesh may be heated prior to use and joining by the machine 800, such as by being heated in an oven or other heated environment, and the machine may simply be configured to apply and position the mesh on the surface of the frame and apply pressure (e.g., using rollers) to hold the mesh in contact with the frame until sufficient cooling has occurred to produce the assembly.

Figure 80:
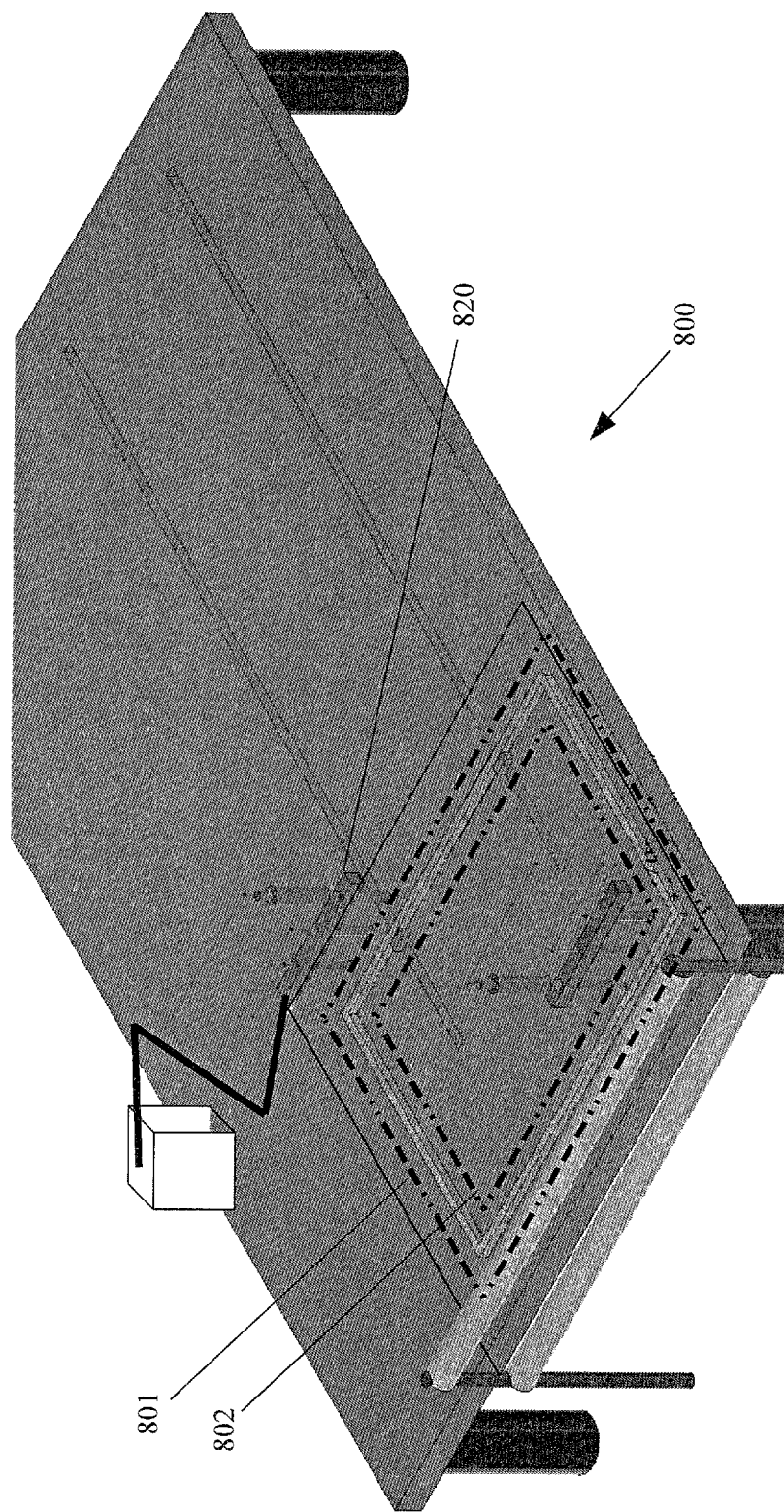
FIG. 80 is a perspective view of another machine embodiment that is configured to accomplish hot melt fusing of the mesh to the screen frame.

In another embodiment, at least the top surface of machine 800 may be heated (e.g., using heating elements, a gas flame, etc.) which may serve to heat the frame sufficiently to accomplish joining with the mesh material that may already be heated, such as by its placement in an oven. As seen in FIG. 80, the machine 800 may have a portion of its top surface made of a high heat conducting material, which portion may be the rectangular section 801 shown by the dot-dash lines. To limit the heating of the top surface of the machine, the interior region, i.e., the region bounded by the dot-dash rectangle 802, may not be heated, so that only the region of the top surface proximate to the screen frame may be heated. The material used for the portion of the top surface of the table having a high thermal conductivity, k, preferably has a thermal conductivity of at least 50 watts per meter-kelvin, and more preferably has a thermal conductivity of at least 75 watts per meter-kelvin, and most preferably has a thermal conductivity of at least 100 watts per meter-kelvin. Some suitable materials include, but is not limited to: copper (k=398 Watts/meter-kelvin), aluminum (k=247 Watts/meter-kelvin), zinc (k=116 Watts/meter-kelvin), nickel (k=106 Watts/meter-kelvin), iron (k=94 Watts/meter-kelvin), and steel-carbon, 0.5% C (k=54 Watts/meter-kelvin).

Figure 75:
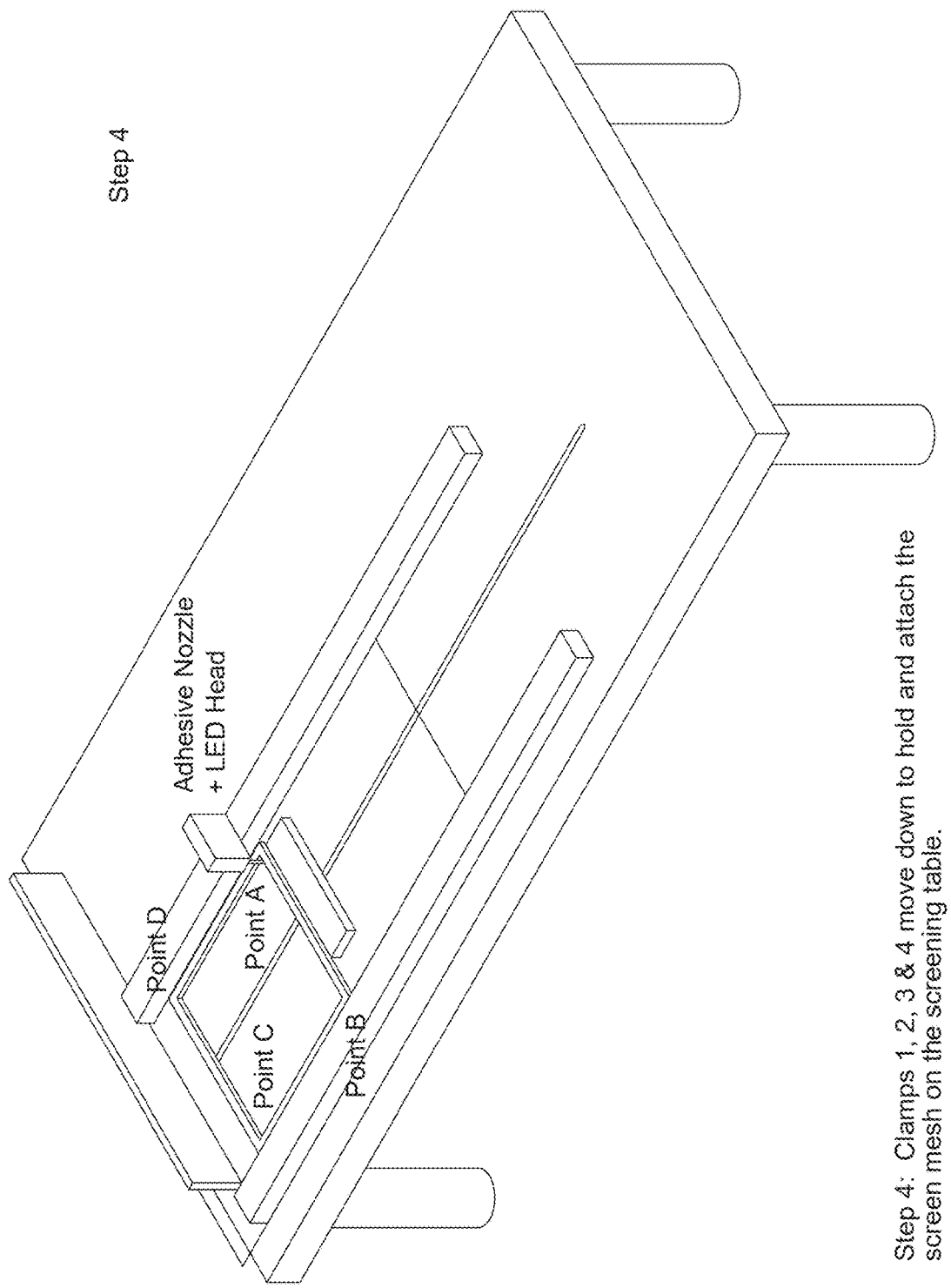
Figure 76:
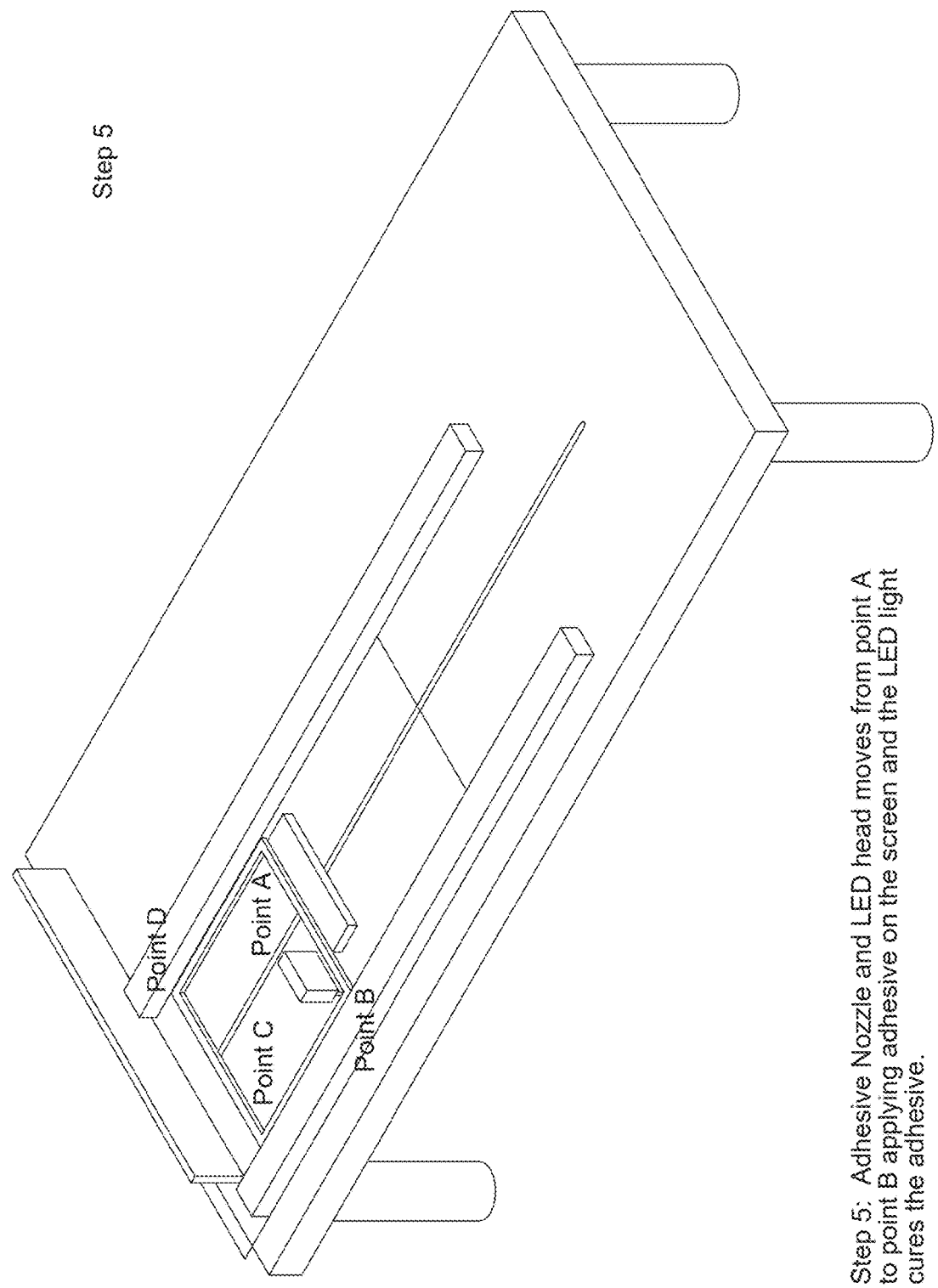
Figure 77:
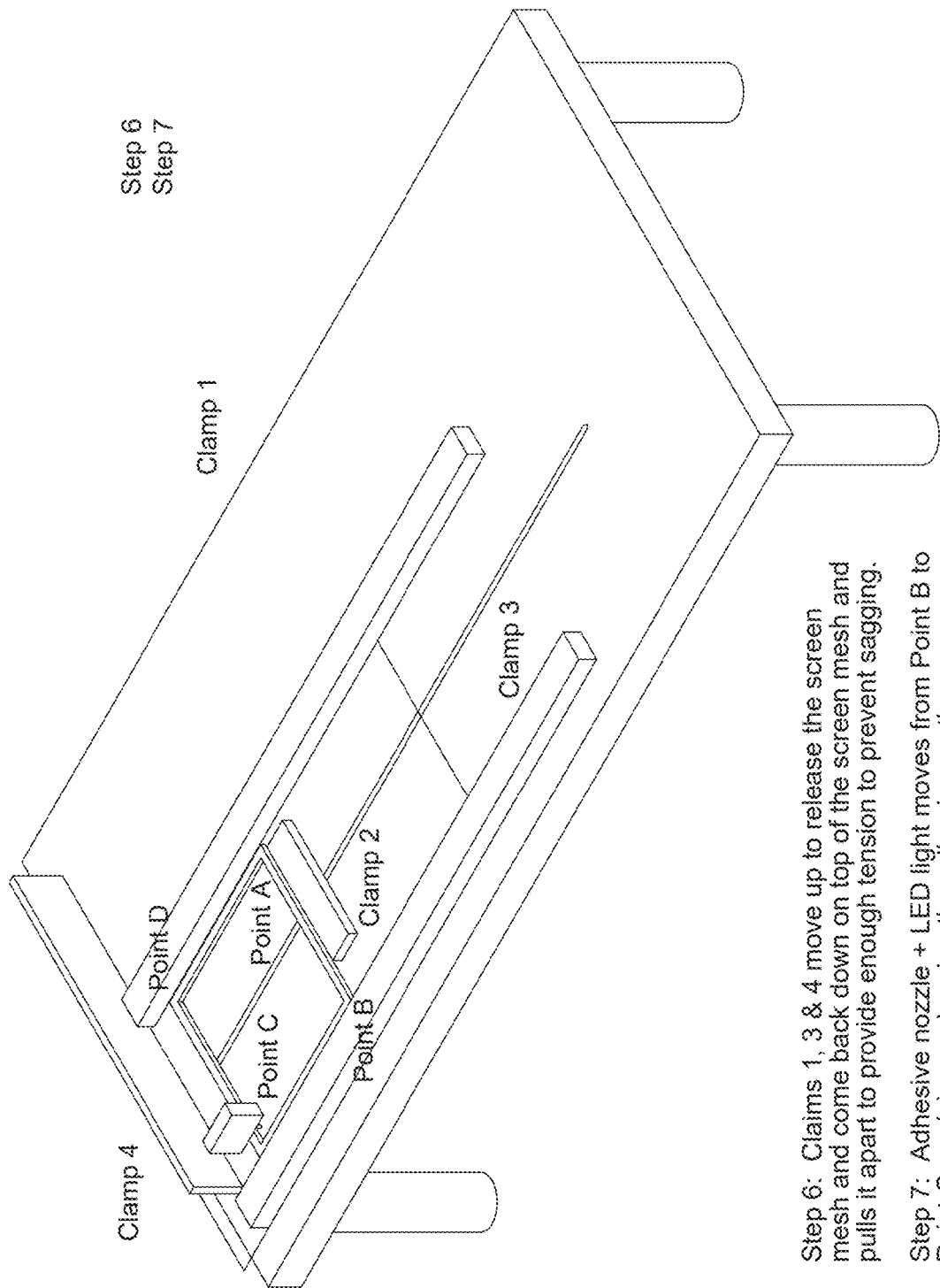
Figure 78:
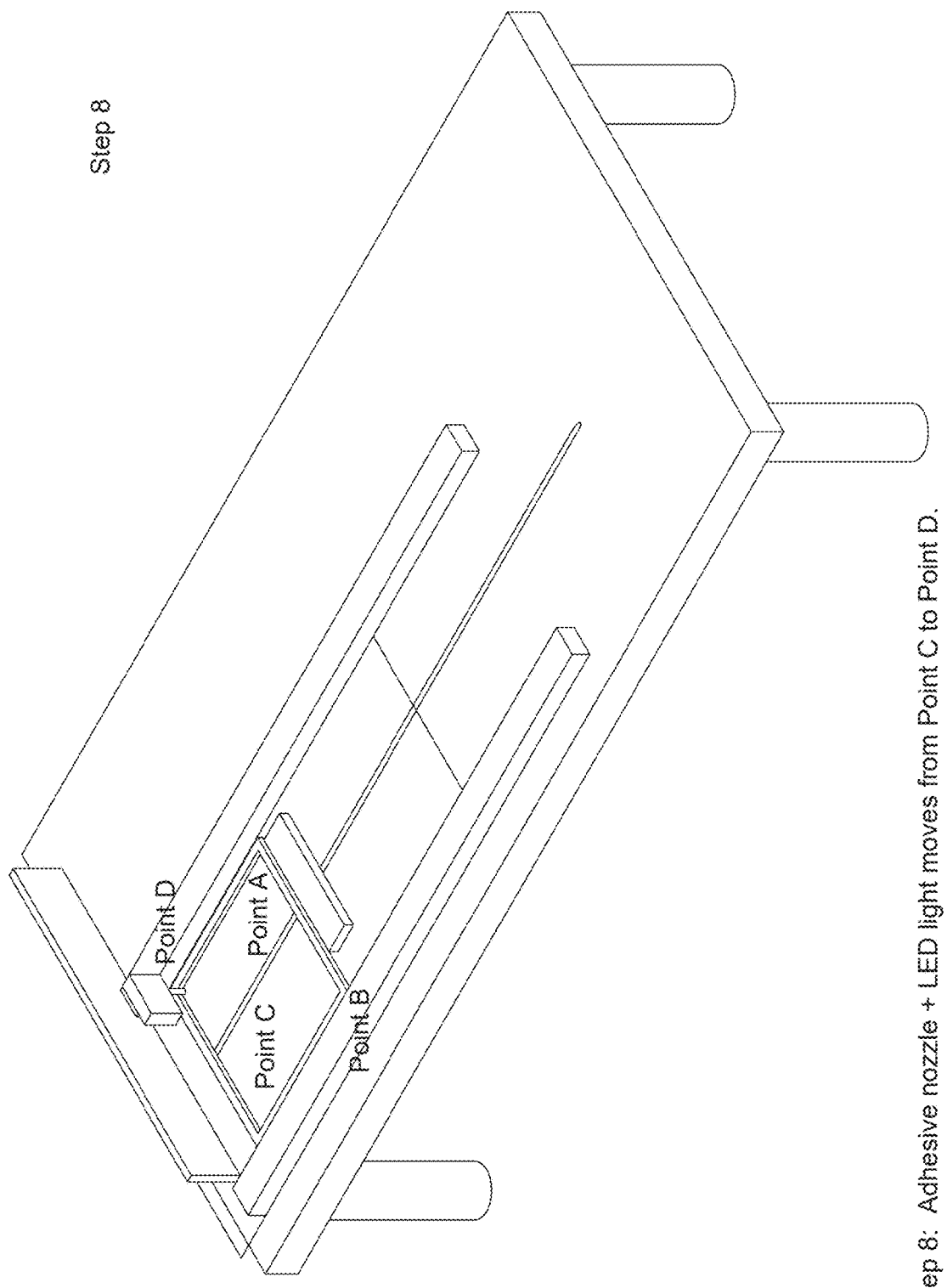
Figure 79:
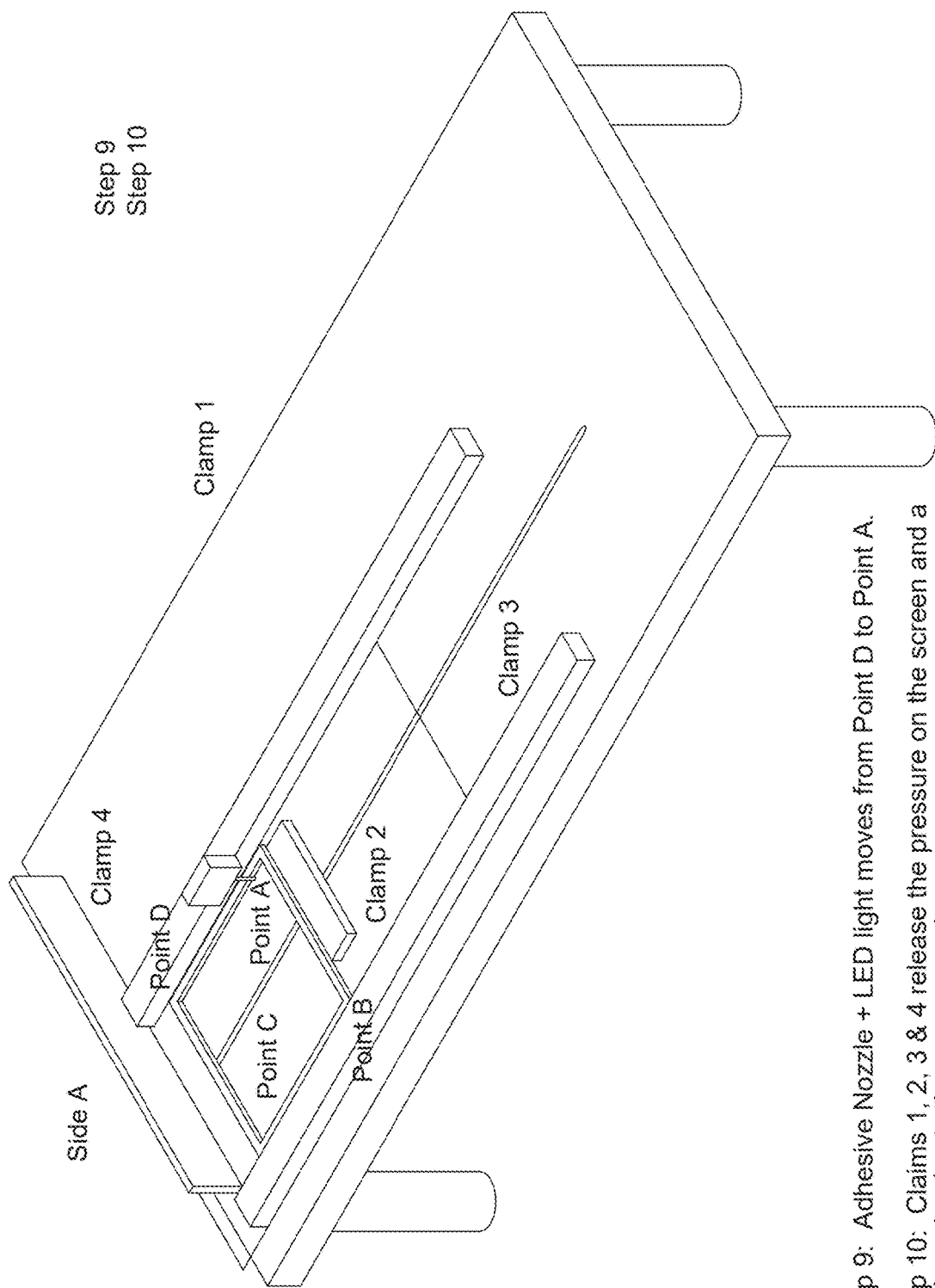

Alternatively, or in addition to the top surface of the machine 800 being heated, the clamps that may be moved into contact with and hold the screen frame may be heated, and may serve to heat the screen frame as required for the hot melt fusing (see, FIG. 75).

In yet another embodiment, the mesh may alternatively (or additionally) be heated locally using a blower assembly 820 that may use a pump (not shown) to deliver high temperature air (or some other gas) out from a nozzle 821 onto the mesh, as the mesh sits atop the screen frame that rests upon the top surface of machine 800. The mesh may be forced into contact with the screen frame by a roller 822, which preferably may follow behind the hot air nozzle 821. The contact with the roller may also serve to simultaneously cool the mesh as a result of such pressure/contact. Additionally, the roller 822 may be cooled to a particular temperature to accomplish such cooling. Alternatively, the roller 822 used to apply pressure may also be heated, and may contribute towards locally elevating the temperature of both the mesh and screen frame to accomplish the hot melt fusing. In another embodiment, a first roller may be used that may be heated or may be at room temperature or just a slightly elevated temperature, to apply pressure without noticeable cooling of the two parts being joined (mesh and frame), while a second roller may also be utilized on the assembly, which second roller may be cooled to help cool the joined parts. Also, another nozzle may follow behind the first roller (or behind the second roller where two rollers are used), which other trailing nozzle may expel cool air to help cool and more quickly and firmly secure together the two parts. In yet another embodiment, the heated air alone from the one or more nozzles may be used to locally heat both the mesh and the screen frame.

Figure 82:
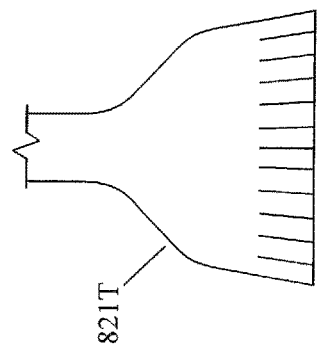
FIG. 82 is a side view of a nozzle tip usable on the blower assembly of FIG. 81 to produce a linear fan of air.
Figure 81:
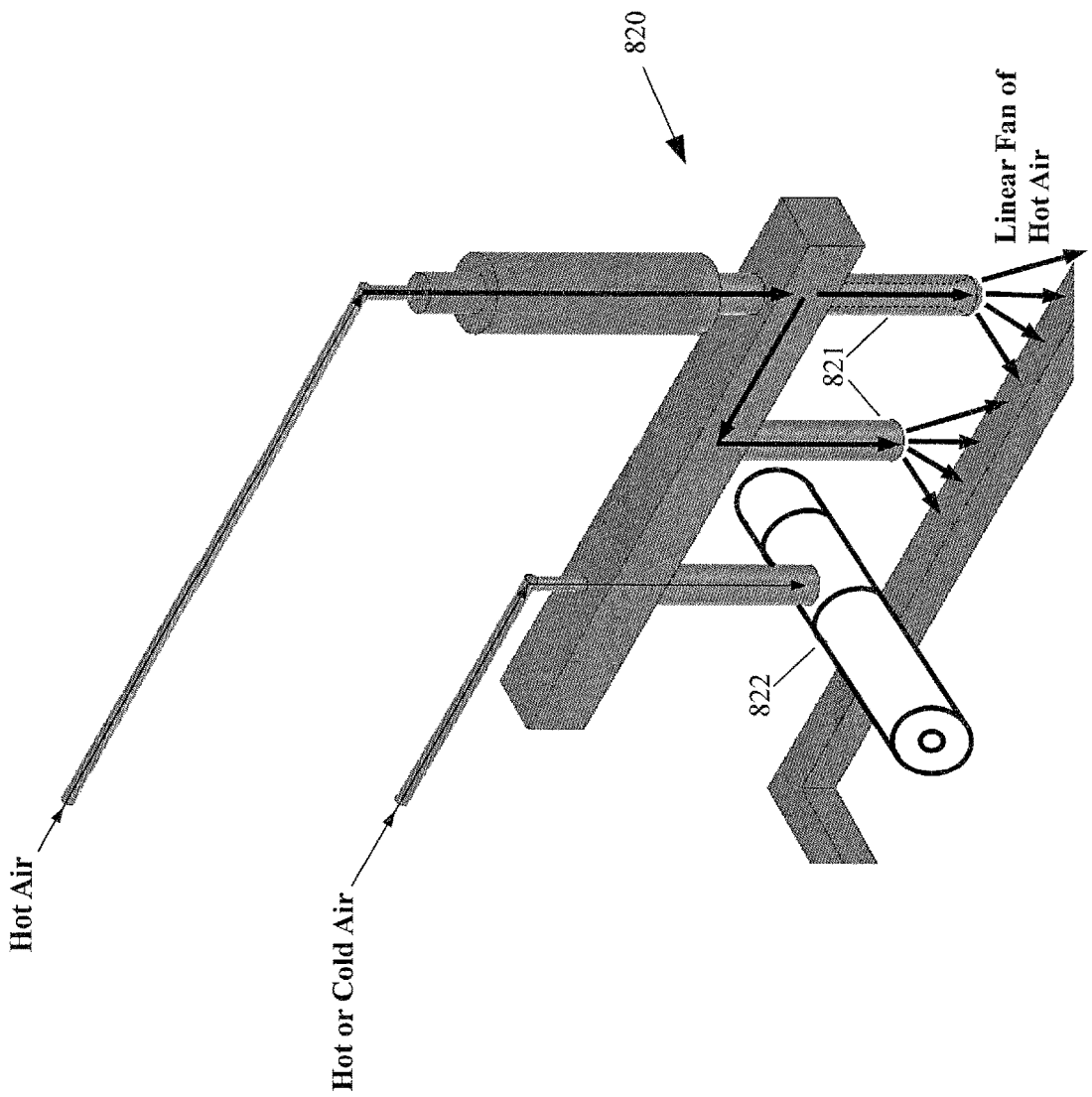
FIG. 81 is a perspective view of a blower assembly of the machine of FIG. 80.

The use of hot air two nozzles 821 spaced about three to five inches apart, as seen in FIG. 81, that provide for local heating of the mesh and frame, particularly when used in combination with the heated table top, may be highly advantageous because the use of only one hot air nozzle may dictate the need for using a much higher temperature for the air to be capable of very quickly elevating the temperature of the mesh and frame locally to accomplish the melt fusing, which may not produce optimal weld strength (a desirable feature for a screen); and because the alternative of using a lower temperature for the expelled air may adversely require the assembly 820 to progress at an unacceptably slow speed in order to satisfactorily accomplish the melt fusing. In that respect, it is also advantageous that each nozzle 821 be formed to disperse the air delivered into a flat stream (i.e., to produce a straight/linear fan of air) that may be directed only onto the frame, as shown in FIG. 81. Flat jet nozzles, including the nozzle tip 821T of FIG. 82, to produce such a linear fan of air are available from Lechler, Inc., in St. Charles, Illinois. The use of two such nozzles may together create a heated fan of air spanning across about six to ten inches of linear length of the frame, providing for a gradual and sufficient increase in temperature of the PVC mesh and frame, to cause proper melting and optimal fusing of those parts. The first hot air nozzle may thus elevates a temperature of the mesh and adjacent screen at each location on the frame's periphery to a temperature between 60° C. (140° F.) and 93° C. (200° F.) to soften the PVC, and the second hot air nozzle may elevate a temperature of the mesh and adjacent screen at each location on the periphery to a temperature between 100° C. (212° F.) and at least 260° C. (500° F.), to melt the PVC.

Also note that without any heating of the table locally, as shown in FIG. 80 by lines 801 and 802, to maintain and/or slightly elevate the temperature of the frame, both the frame and the table may serve as a heat sink that may tend to draw heat away from the mesh-to-frame joint, particularly while being heated by only one nozzle, which may tend to reduce the strength of the weld, depending upon the speed used for the assembly 820. See e.g., "Study And Empirical Modeling Relating Welding Parameters And Tensile Strength of Hot Air Welded PVC Plastic," Mahmood Alam, Dr. Shahnawaz Alam, and Kamran Rasheed, *IJISET-International Journal of Innovative Science, Engineering& Technology* 2.2, 2015; and "Experimental Analysis of Mechanical Behaviour of Poly Vinyl Chloride (PVC) Plastic Welded through the Fabricated Experimental Set-up for Hot Air Welding," Gaurav, Md Shakibul Haque, Inayat Hussain, Gaurav Agarwal, Khwaja Moeed, and Mohd Anees Siddiqui, 2016.

Although the use of PVC may be advantageous, other materials with suitable melt temperatures and other properties may alternatively be used. Other materials that may be used instead of PVC/CPVC include, but are not limited to, styrene-butadiene-rubber (SBR), styrene-butadiene-styrene (SBS), ethylene-vinyl-chloride (EVCl), poly-vinylidene-chloride (PVdC), poly-vinyl-alcohol (PVOH), ethylene-vinyl-acetate (EVA), and poly-vinyl-acetate (PVA).

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A screen making machine comprising:
   a table;
   a welder assembly, said welder assembly comprising:
   a first hot air flow nozzle;
   a second hot air flow nozzle, said second hot air flow nozzle positioned a distance away from said first hot air flow nozzle;
   an air pump, said air pump configured to pump air through each of said first and second hot air nozzles;
   wherein said first hot air nozzle is configured and oriented to deliver a first flow of heated air;
   wherein said second hot air nozzle is configured and oriented to deliver a second flow of heated air; and
   a roller, said roller positioned a distance away from a side of said second hot air flow nozzle being distal from said first hot air flow nozzle;
   an actuation system, said actuation system configured to move said welder assembly relative to said table to track linearly along each side of a periphery of the frame;
   wherein during movement of said welder assembly by said actuation system at each location along the periphery of the frame, the flow of air from said first hot air nozzle elevates a temperature of the mesh and adjacent frame at each location on the periphery to a first elevated temperature, and subsequent flow of hot air from said second hot air nozzle onto the location elevates the temperature of the mesh and adjacent frame to a second elevated temperature, said second elevated temperature being above a melt temperature of each of the surface of the mesh and the surface of the frame; and
   wherein said roller is configured to press the melted surface of the mesh against the melted surface of the first side of the frame, to melt fuse the mesh to the frame.

2. The screen making machine according to claim 1, wherein said first hot air nozzle elevates a temperature of the mesh and adjacent frame at each location on the periphery to a temperature between 60° C. (140° F.) and 93° C. (200° F.); and
   wherein said second hot air nozzle elevates a temperature of the mesh and adjacent frame at each location on the periphery to a temperature between 100° C. (212° F.) and at least 260° C. (500° F.).

3. The screen making machine according to claim 2, wherein at least a portion of a top surface of said table is made of material with a high thermal conductivity, said high thermal conductivity comprising a thermal conductivity of at least 100 watts per meter-kelvin
   wherein said screen making machine further comprises: a heating element configured to heat at least said portion of said top surface of said table to thereby heat a second side of the frame, being opposite the first side of the frame.

4. The screen making machine according to claim 3, wherein said high thermal conductivity of said portion of said table is preferably a thermal conductivity of at least 50 watts per meter-kelvin.

5. The screen making machine according to claim 4, wherein said high thermal conductivity of said portion of said table is more preferably a thermal conductivity of at least 75 watts per meter-kelvin.

6. The screen making machine according to claim 5, wherein said high thermal conductivity of said portion of said table is most preferably a thermal conductivity of at least 100 watts per meter-kelvin.

7. The screen making machine according to claim 3, wherein each of said first hot air nozzle and said second hot air nozzle are configured to deliver a linear fan of heated air.

8. The screen making machine according to claim 7,
   wherein said second hot air flow nozzle is spaced apart from said first hot air flow nozzle in the range of about three inches to five inches; and
   wherein said roller is positioned in the range of about three inches to five inches away from said second hot air flow nozzle.

9. The screen making machine according to claim 8, further comprising: a cutter, said cutter configured to trim away excess mesh material that extends beyond the frame.

10. The screen making machine according to claim 9, further comprising:
   at least one track formed in said table; and
   at least one clamp mechanism, a portion of said at least one clamp mechanism configured to travel along said at least one track to move the frame along said top surface of said table from at least the first process station to a second process station.

\* \* \* \* \*